United States Patent
Iyer et al.

(10) Patent No.: US 10,932,278 B2
(45) Date of Patent: Feb. 23, 2021

(54) SCHEDULING AND CONTROL IN NEW RADIO USING PREEMPTION INDICATION

(71) Applicant: CONVIDA WIRELESS, LLC, Wilmington, DE (US)

(72) Inventors: Lakshmi R. Iyer, King of Prussia, PA (US); Tianyi Xu, San Jose, CA (US); Qing Li, Princeton Junction, NJ (US); Pascal M. Adjakple, Great Neck, NY (US); Guodong Zhang, Woodbury, NY (US); Joseph M. Murray, Schwenksville, PA (US); Allan Y Tsai, Boonton, NJ (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 16/493,523

(22) PCT Filed: Mar. 20, 2018

(86) PCT No.: PCT/US2018/023334
§ 371 (c)(1),
(2) Date: Sep. 12, 2019

(87) PCT Pub. No.: WO2018/175420
PCT Pub. Date: Sep. 27, 2018

(65) Prior Publication Data
US 2020/0008216 A1    Jan. 2, 2020

Related U.S. Application Data

(60) Provisional application No. 62/501,345, filed on May 4, 2017, provisional application No. 62/473,715, filed on Mar. 20, 2017.

(51) Int. Cl.
*H04W 72/10* (2009.01)
*H04W 72/12* (2009.01)
(Continued)

(52) U.S. Cl.
CPC ......... *H04W 72/10* (2013.01); *H04W 72/042* (2013.01); *H04W 72/1242* (2013.01);
(Continued)

(58) Field of Classification Search
CPC ........................... H04W 72/10; H04W 72/042
See application file for complete search history.

(56) References Cited

U.S. PATENT DOCUMENTS

2010/0290358 A1    11/2010  Karunakaran et al.
2018/0270800 A1*    9/2018  Park .................... H04W 72/042
(Continued)

FOREIGN PATENT DOCUMENTS

WO    2016/119530 A1    8/2016

OTHER PUBLICATIONS

3GPP TR 38.913 V0.2.0, "Technical Specification Group Radio Access Network, Study on Scenarios and Requirements for Next Generation Access Technologies (Relase14)", Feb. 2016.
(Continued)

*Primary Examiner* — Hoon J Chung
(74) *Attorney, Agent, or Firm* — BakerHostetler

(57) ABSTRACT

It is recognized herein that, in some cases, URLLC transmissions may preempt a scheduled eMBB transmission. Thus, in accordance with one embodiment, resources are allocated for URLLC data transmission in a manner that minimally impacts eMBB data transmissions. In an example code block groups are configured for efficient multi-bit A/N feedback. Multi-bit A/N methods are disclosed with and without explicit resource allocation. Various preemption mechanisms are also described herein including, for example, puncturing, dropping the tail end of a transport block, and increasing rate matching.

15 Claims, 81 Drawing Sheets

(51) Int. Cl.
*H04W 72/04* (2009.01)
*H04L 1/18* (2006.01)

(52) U.S. Cl.
CPC ....... *H04W 72/1273* (2013.01); *H04L 1/1812* (2013.01); *H04W 72/0446* (2013.01); *H04W 72/0453* (2013.01)

(56) References Cited

U.S. PATENT DOCUMENTS

2019/0327748 A1* 10/2019 Yang ................. H04W 72/10
2020/0021419 A1* 1/2020 Taherzadeh Boroujeni ................ H04L 5/0091

OTHER PUBLICATIONS

3GPP TSG RAN WG1 #85 R1-164013, Samsung, "Framework for Beamformed Access", May 2016, 4 pages.
3GPP TSG RAN Wg1 Meeting #88 R1-1701553, "final Report of 3GPP TSG RAN WG1 #AH1NR v1.0.0", Feb. 2017, 106 pages.
3GPP TSG RAN WG1 Meeting #88 R1-1701715, Huawei, HiSilicon, "Beam Diversity for Data and Control Channels", Feb. 2017, 6 pages.
3GPP TSG RAN WG1 Meeting #88, R1-1702809, NTT DOCOMO, Inc. "Search Space Design for NR-PDCCH" Feb. 2017, 5 pages.
3GPP TSG RAN WG1 Meeting #88, R1-1702817, NTT DOCOMO, Inc., "On Dynamic Multiplexing of eMBB and URLLC for Downlink", Feb. 2017, 4 pages.
3GPP TSG RAN WG1 meeting #88bis R1-1704172, "final Report of 3GPP TSG RAN WG1 #88 v1.0.0", Feb. 2017, 152 pages.
3GPP TSG-RAN WG1 Meeting #88, R1-1701920, Fujitsu, "Discussion on Preemption Indicator for Multiplexing eMBB and URLLC in Downlink" Feb. 2017, 9 pages.

* cited by examiner

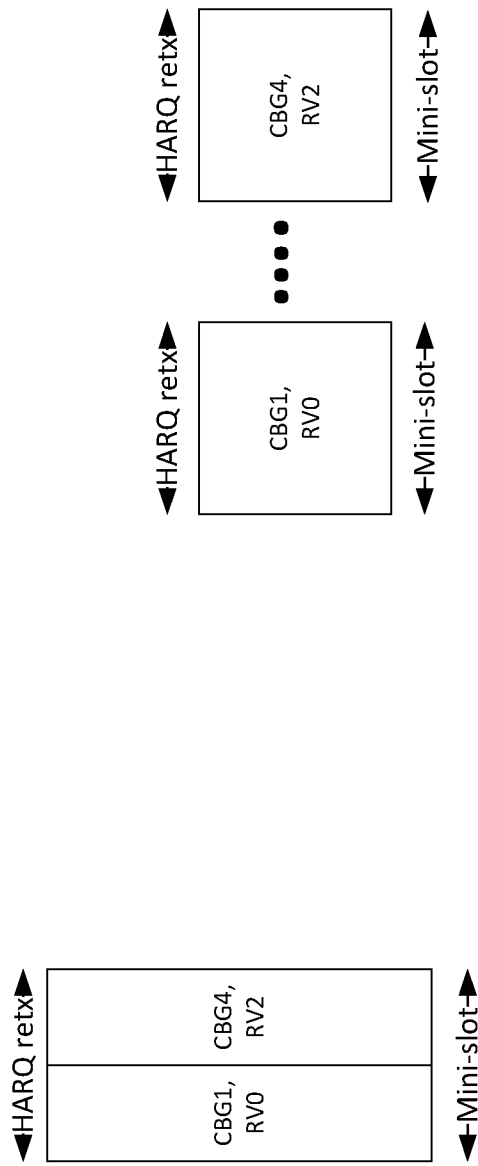

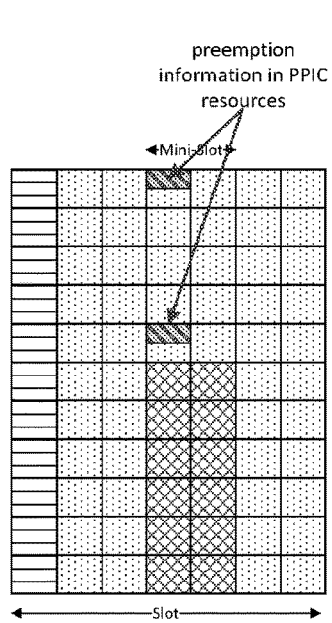
FIG. 15A
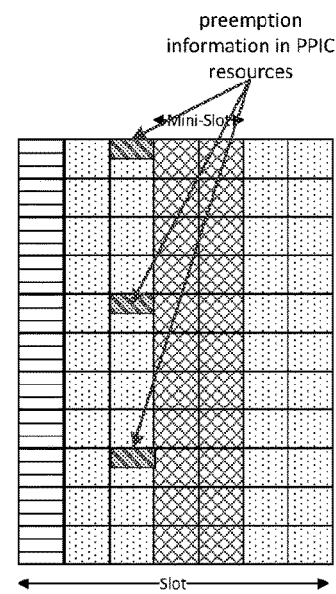
FIG. 15B
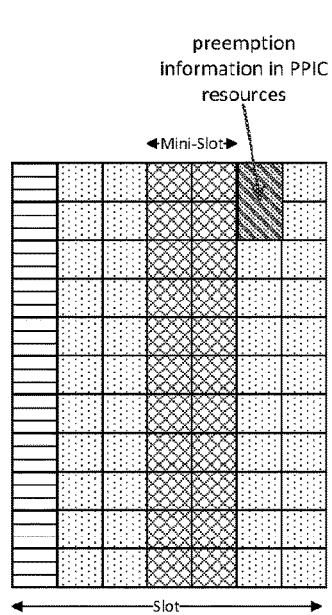
FIG. 15C
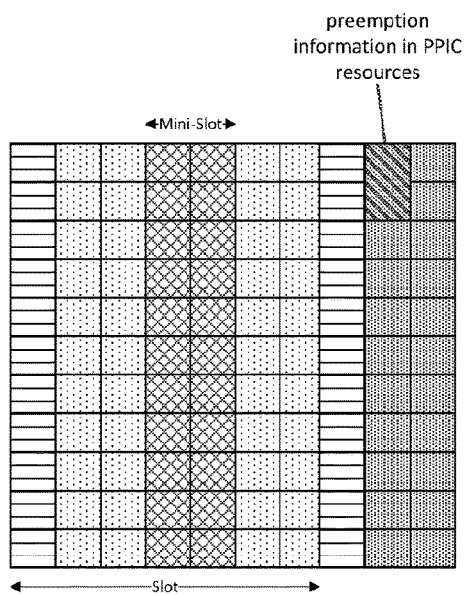
FIG. 15D
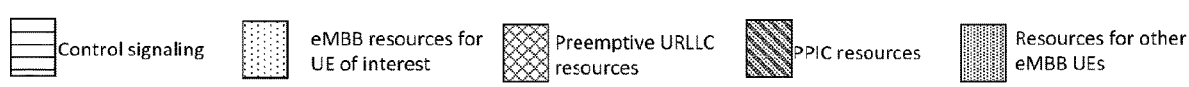

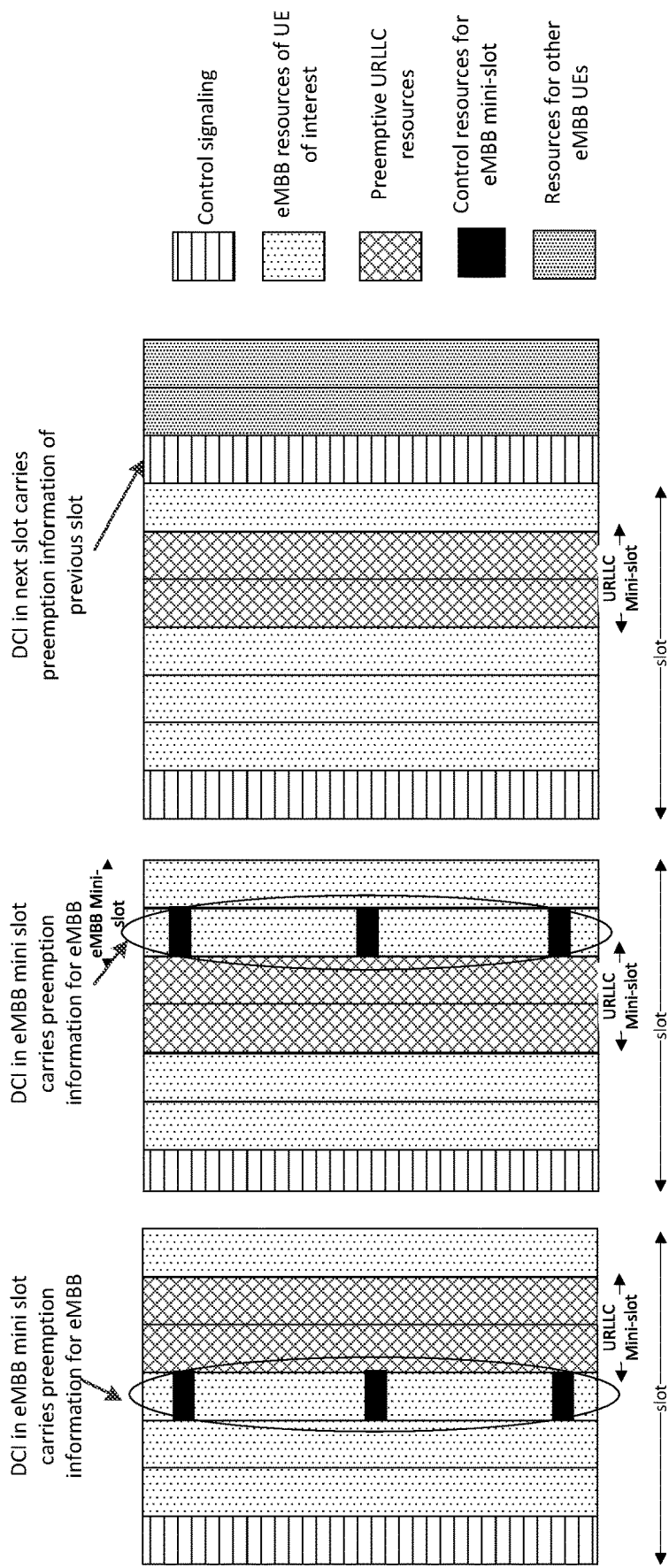

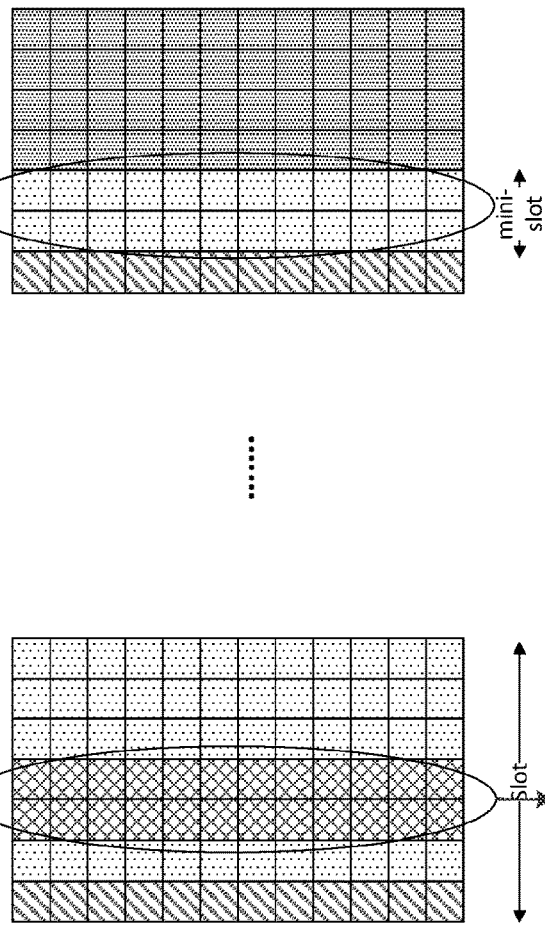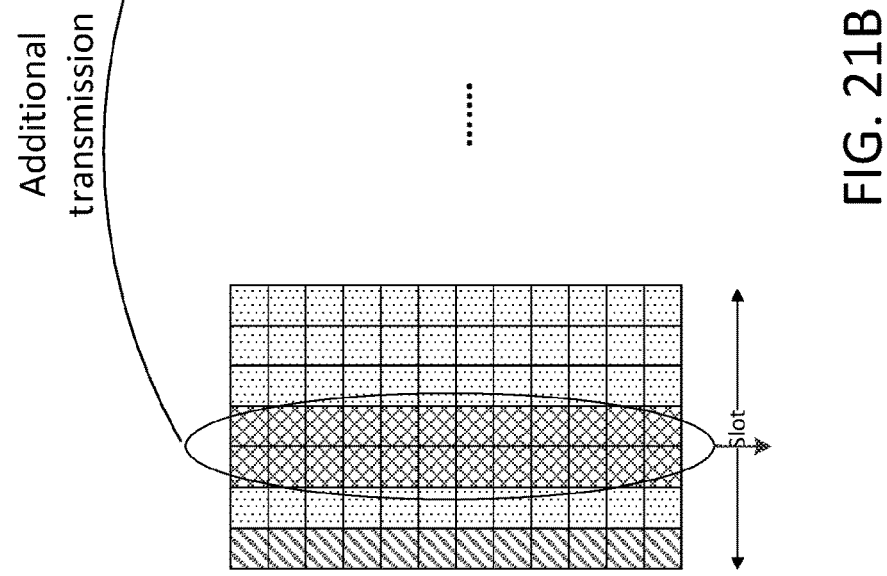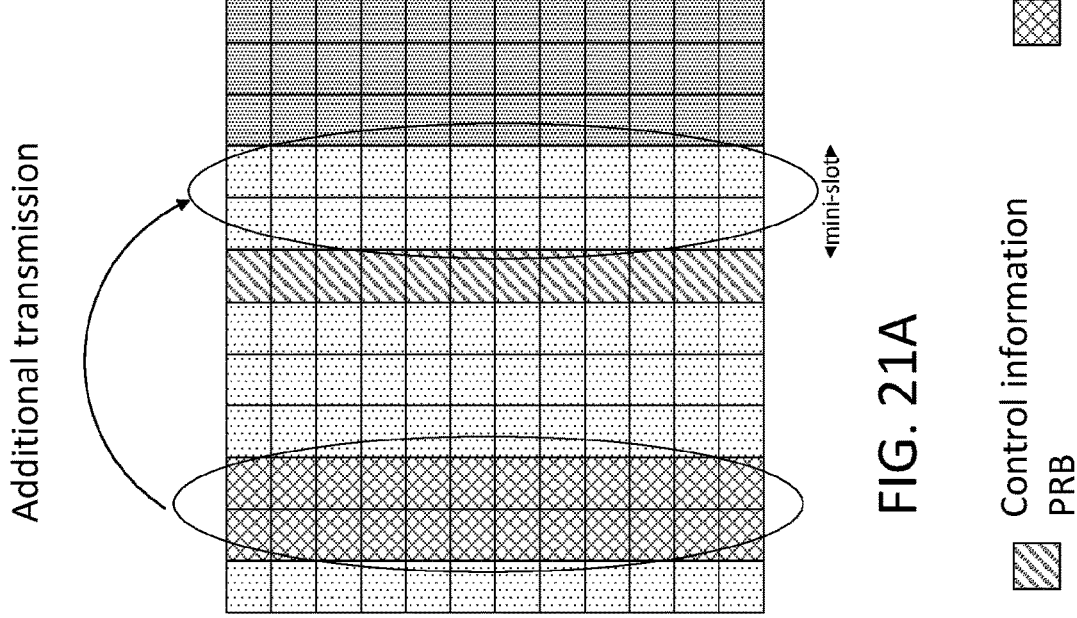
FIG. 21A
FIG. 21B

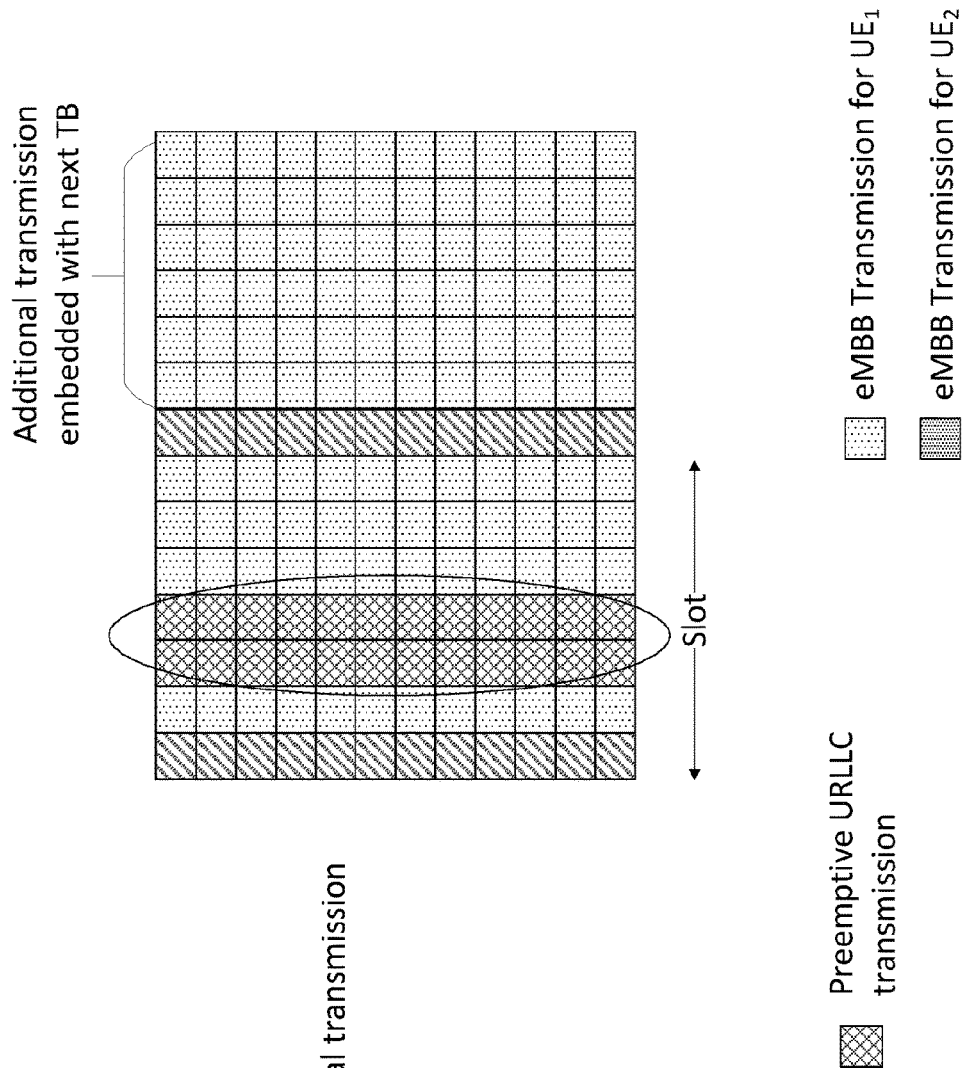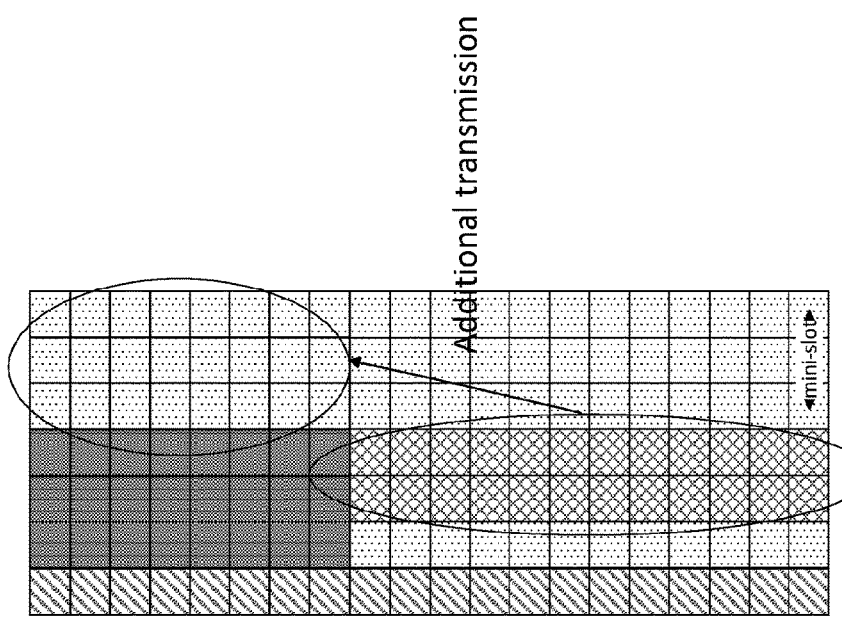

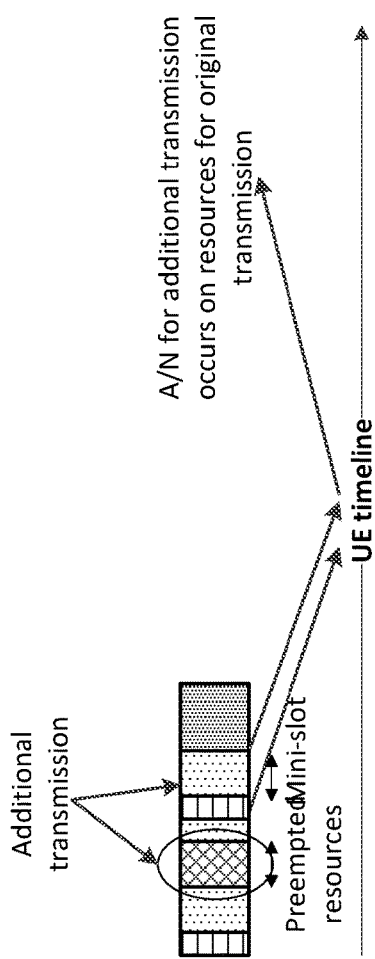
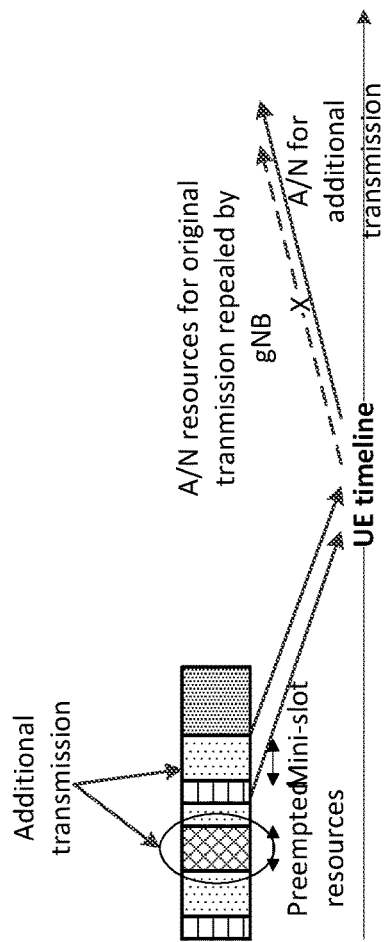
FIG. 22A
FIG. 22B

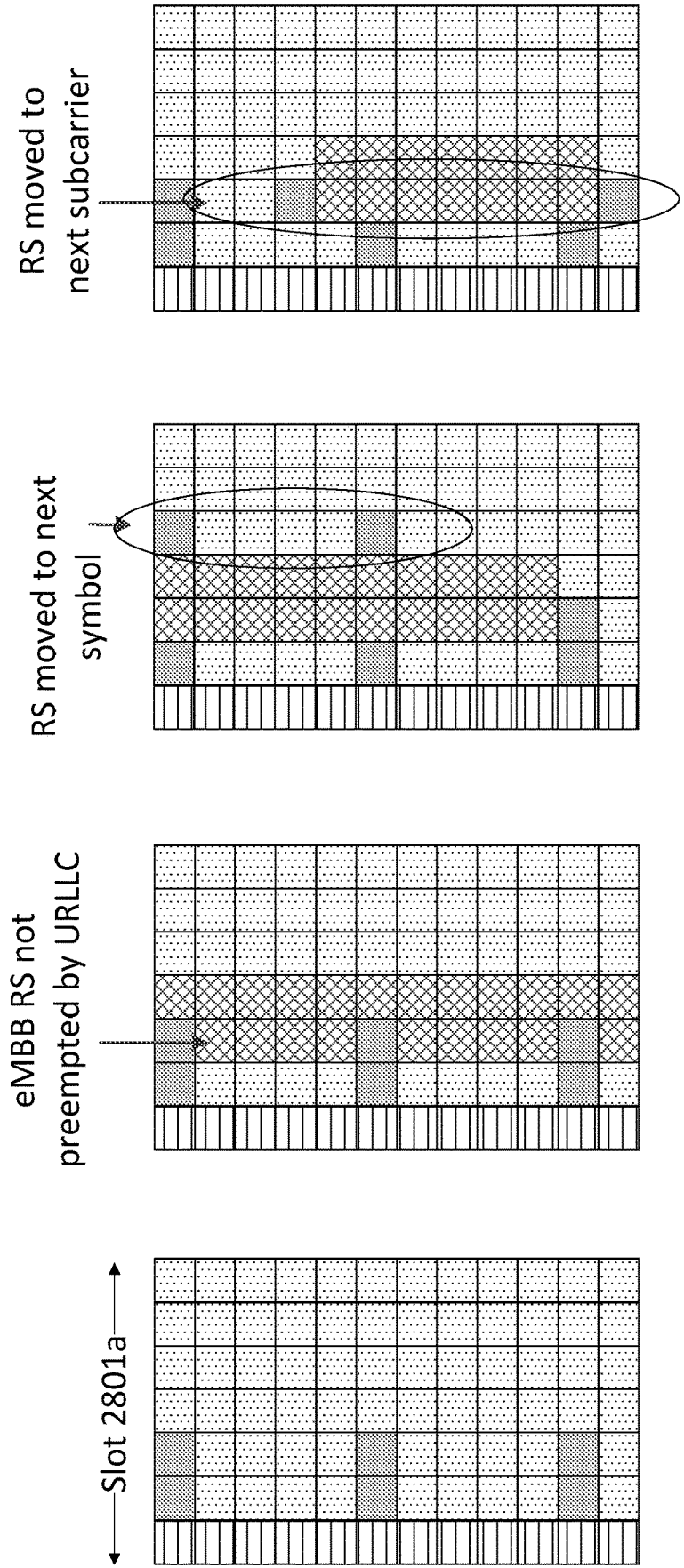

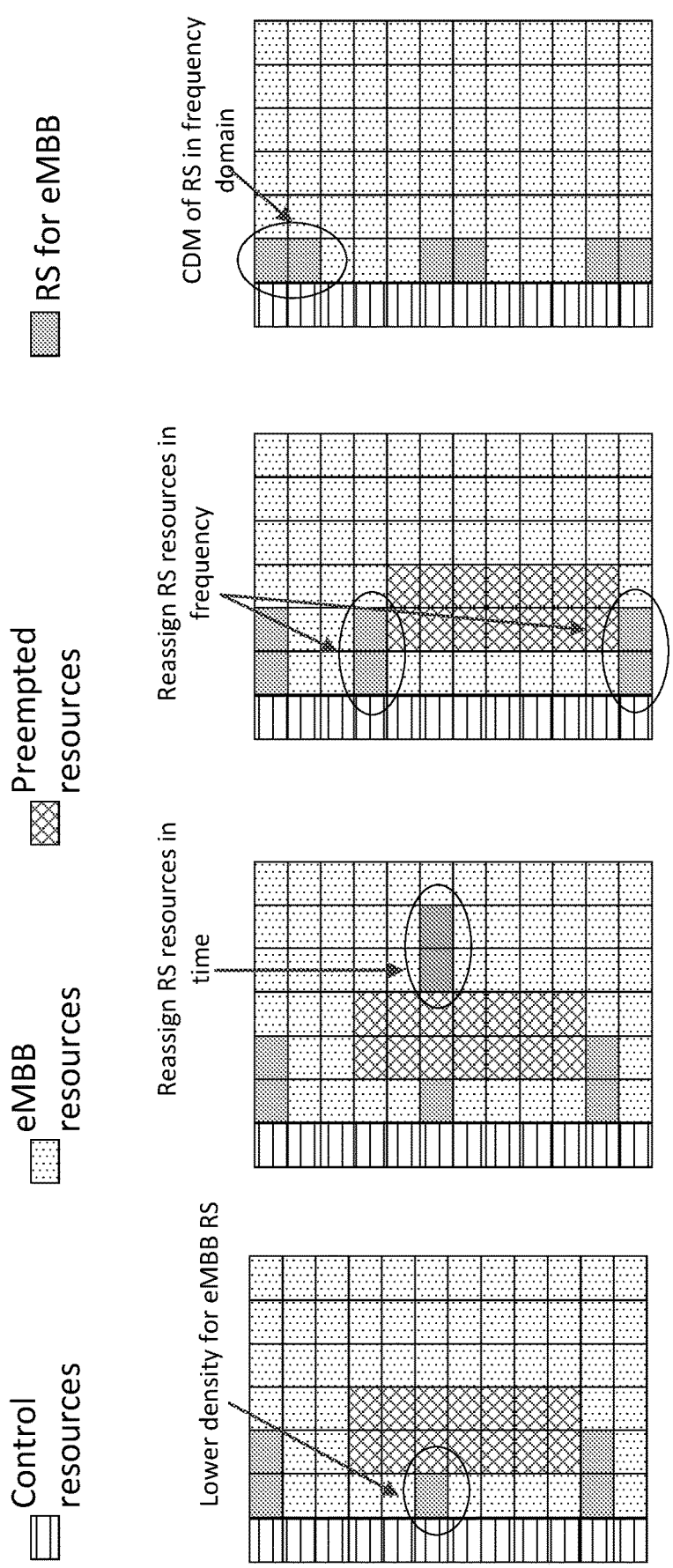

| SFN | N | | | | | | | | | | | N+1 | | | | | | | | | | | N+2 | | | | | | | | | |
|---|---|---|---|---|---|---|---|---|---|---|---|---|---|---|---|---|---|---|---|---|---|---|---|---|---|---|---|---|---|---|---|---|
| Subframe | 0 | 1 | 2 | 3 | 4 | 5 | 6 | 7 | 8 | 9 | | 0 | 1 | 2 | 3 | 4 | 5 | 6 | 7 | 8 | 9 | | 0 | 1 | 2 | 3 | 4 | 5 | 6 | 7 | 8 | 9 |
| GC PDCCH | ▓ | | | | | ▓ | | | | | | ▓ | | | | | ▓ | | | | | | ▓ | | | | | ▓ | | | | |
| PDCCH | | | | | | | | | | | | | | ▓ | | | | | | | | | | | ▓ | | | | | | | |
| DRX Inactivity Timer | | ▓ | ▓ | ▓ | ▓ | | ▓ | ▓ | | | | | | | | | | | | | | | | ▓ | ▓ | ▓ | ▓ | | ▓ | ▓ | | |
| OnDuration Timer | | | | | | | | | | | | ▓ | ▓ | | | | | | | | | | ▓ | ▓ | | | | | | | | |

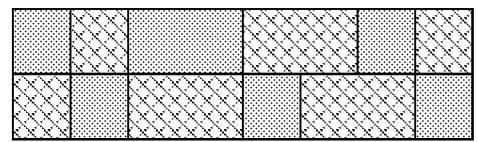
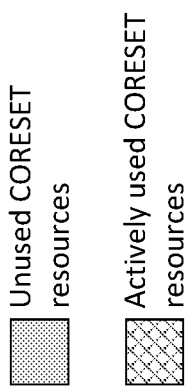
FIG. 77C
FIG. 77B
FIG. 77A

SCHEDULING AND CONTROL IN NEW RADIO USING PREEMPTION INDICATION

CROSS-REFERENCE TO RELATED APPLICATIONS

This application is the National Stage Application of International Patent Application No. PCT/US2018/023334 filed Mar. 20, 2018 which claims the benefit of U.S. Provisional Application Ser. No. 62/473,715 filed Mar. 20, 2017 and U.S. Provisional Patent Application Ser. No. 62/501,345 filed May 4, 2017, the disclosures of which are hereby incorporated by reference as if set forth in their entirety herein.

BACKGROUND

3GPP TR 38.913, "Study on Scenarios and Requirements for Next Generation Access Technologies" (Release 14, V0.2.0), defines scenarios and requirements for New Radio (NR) technologies. The Key Performance Indicators (KPIs) for enhanced Mobile Broadband (eMBB), Ultra-Reliable Low Latency Communication (URLLC), and massive Machine-Type Communication (mMTC) devices are summarized in Table 1, by way of example.

TABLE 1

| \multicolumn{4}{c}{KPIs for eMBB, URLLC, and mMTC Devices} |
| Device | KPI | Description | Requirement |
|---|---|---|---|
| eMBB | Peak data rate | Peak data rate is the highest theoretical data rate which is the received data bits assuming error-free conditions assignable to a single mobile station, when all assignable radio resources for the corresponding link direction are utilized (i.e., excluding radio resources that are used for physical layer synchronization, reference signals or pilots, guard bands and guard times). | 20 Gbps for downlink and 10 Gbps for uplink |
| | Mobility interruption time | Mobility interruption time means the shortest time duration supported by the system during which a user terminal cannot exchange user plane packets with any base station during transitions. | 0 ms for intrasystem mobility |
| | Data Plane Latency | For eMBB value, the evaluation needs to consider all typical delays associated with the transfer of the data packets in an efficient way (e.g. applicable procedural delay when resources are not pre-allocated, averaged HARQ retransmission delay, impacts of network architecture). | 4 ms for UL, and 4 ms for DL |
| | Control Plane Latency | Control plane latency refers to the time to move from a battery efficient state (e.g., IDLE) to start of continuous data transfer (e.g., ACTIVE). | 10 ms |
| URLLC | Data Plane Latency | For URLLC the target for user plane latency for UL and DL. Furthermore, if possible, the latency should also be low enough to support the use of the next generation access technologies as a wireless transport technology that can be used within the next generation access architecture. | 0.5 ms |
| | Reliability | Reliability can be evaluated by the success probability of transmitting X bytes (1) within 1 ms, which is the time it takes to deliver a small data packet from the radio protocol layer 2/3 SDU ingress point to the radio protocol layer 2/3 SDU point of the radio interface, at a certain channel quality (e.g., coverage-edge). | 1-10-5 within 1 ms. |
| mMTC | Coverage | "Maximum coupling loss" (MCL) in uplink and downlink between device and Base Station site (antenna connector(s)) for a data rate of [X bps], where the data rate is observed at the egress/ingress point of the radio protocol stack in uplink and downlink. | 164 dB |
| | UE Battery Life | User Equipment (UE) battery life can be evaluated by the battery life of the UE without recharge. For mMTC, UE battery life in extreme coverage shall be based on the activity of mobile originated data transfer consisting of [200 bytes] Uplink (UL) per day followed by [20 bytes] Downlink (DL) from Maximum Coupling Loss (MCL) of [tbd] dB, assuming a stored energy capacity of [5 Wh]. | 15 years |
| | Connection Density | Connection density refers to total number of devices fulfilling specific Quality of Service (QoS) per unit area (per km2). QoS definition should take into account the amount of data or access request generated within a time t_gen that can be sent or received within a given time, t_sendrx, with x % probability. | 106 devices/km2 |

Current approaches to scheduling and control in new radio (NR) lack capabilities. For example, current approaches to URLLC multiplexing with eMBB devices, beamformed access, and downlink control channels, lack capabilities.

SUMMARY

It is recognized herein that, in some cases, URLLC transmissions may preempt a scheduled eMBB transmission. Thus, in accordance with one embodiment, resources are allocated for URLLC data transmission in a manner that minimally impacts eMBB data transmissions. In an example code block groups are configured for efficient multi-bit A/N feedback. Multi-bit A/N methods are disclosed with and without explicit resource allocation. Various preemption mechanisms are also described herein including, for example, puncturing, dropping the tail end of a transport block, and increasing rate matching.

Other embodiments described herein are directed to group common physical downlink control channels (PDCCH) and UE-specific PDCCH designs. Still other embodiments disclosed herein are directed to wake up durations for a UE to cooperate with group common PDCCH transmissions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended to only to be illustrative.

FIGS. 12A and 12B illustrate example CBG retransmissions with different redundancy versions (RVs).

FIG. 15A illustrates an example physical preemption indication channel (PPIC) in a monitoring case, wherein the preemption information is indicated to the eMBB UE, and the PPIC signaling overlaps in time with the URLLC signal.

FIG. 15B shows an example where the PPIC resources occur prior to the preemption.

FIG. 15C shows an example PPIC transmission after the URLLC preemption, but within the duration of the scheduled eMBB resource.

FIG. 15D shows an example delayed PPIC transmission occurring after the scheduled eMBB transmission.

FIG. 16A shows an example indication of preemption to eMBB UE through DCI in NR-PDCCH, wherein the DCI occurs prior to preemption.

FIG. 16B shows an example indication of preemption to eMBB UE through DCI in NR-PDCCH, wherein the DCI occurs in mini-slot after preemption but within the scheduled TTI of eMBB.

FIG. 16C shows an example indication of preemption to eMBB UE through DCI in NR-PDCCH, wherein the DCI occurs in the slot following the eMBB UE's scheduled resources.

FIG. 21A shows an example additional transmission of preempted eMBB resources in implicitly reserved resources following the first transmission, without waiting for A/N.

FIG. 21B shows an example additional transmission of preempted eMBB resources in resources following the first transmission after receiving a Nack.

FIG. 21C shows an example additional transmission of preempted eMBB resources in resources overlapping with the original transmission.

FIG. 21D shows an example additional transmission of preempted eMBB resources along with another scheduled transmission.

FIG. 22A depicts an example A/N resource assignment when additional transmission occurs, wherein A/N resources are reused for the additional transmission.

FIG. 22B depicts an example A/N resource assignment when additional transmission occurs, wherein original A/N resources are rescinded and new resources are assigned for the additional transmission.

FIG. 28A shows an example of RS handling in eMBB without preemption.

FIG. 28B shows an example of RS handling in eMBB in which the URLLC does not puncture eMBB RS.

FIG. 28C shows an example of RS handling in eMBB in which the eMBB RS is moved to the next available resource in time.

FIG. 28D shows an example of RS handling in eMBB in which the eMBB RS is moved to the next available RE in frequency.

FIG. 28E shows an example of RS handling in eMBB in which the eMBB operates with lower density of RS.

FIG. 28F shows an example of RS handling in eMBB in which the eMBB RS is repeated.

FIG. 28G shows an example of RS handling in eMBB in which reassigned RS resources preserve a CDM pair.

FIG. 28H shows an example of RS handling in eMBB in which RS resources in a CDM pair occur in frequency.

FIG. 44 depicts an example DRX that is cooperated with periodic group common PDCCH.

FIG. 45 depicts an example DRX cooperated with aperiodic group common PDCCH.

FIGS. 77A-C illustrates example unused resources in a CORESET.

DETAILED DESCRIPTION OF ILLUSTRATIVE EMBODIMENTS

Figure 1A:
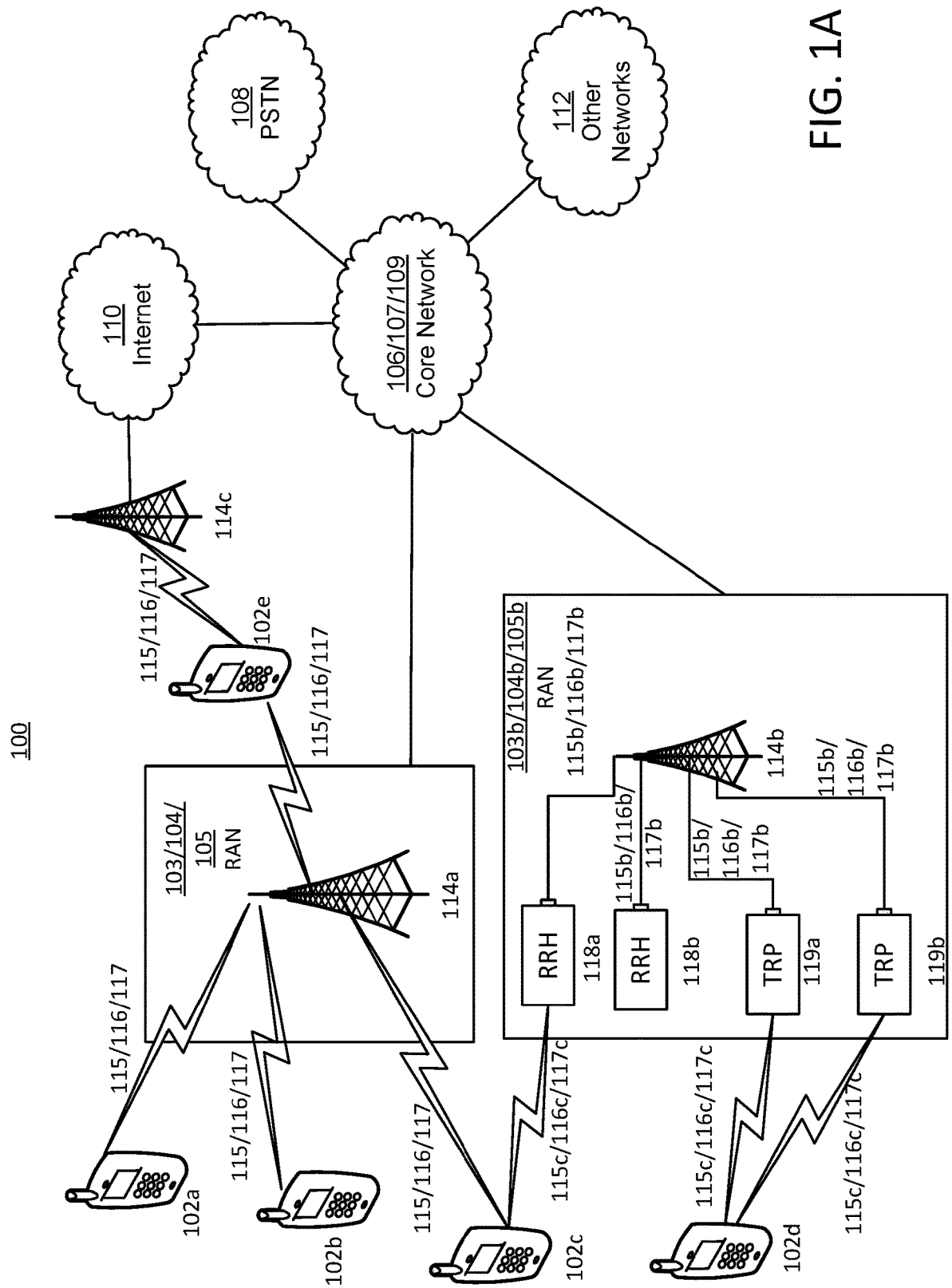
FIG. 1A illustrates one embodiment of an example communications system in which the methods and apparatuses described and claimed herein may be embodied.

As an initial matter, with respect to Ultra-Reliable Low Latency Communication (URLLC) devices that multiplex with enhanced mobile broadband devices, URLLC may be preemptively scheduled over an ongoing eMBB transmission. An indication can be dynamically signaled to a user equipment (UE), which has assigned downlink resources have partially been preempted by another downlink transmission. The indication may increase the likelihood of successful demodulation and decoding of the transport blocks (TBs) transmitted within the above mentioned assigned resource. The indication may be used to increase the likelihood of successful demodulation and decoding of the transport block (TB) based on the preempted transmission and/or subsequent (re)-transmissions of the same TB.

With respect to new radio (NR) beamformed access, in some cases, the characteristics of the wireless channel at higher frequencies are significantly different from the sub-6 GHz channel that LTE is currently deployed on. It is recognized herein that a challenge of designing the new Radio Access Technology (RAT) for higher frequencies is overcoming the larger path-loss at higher frequency bands. In addition to this larger path-loss, the higher frequencies are subject to unfavorable scattering environment due to blockage caused by poor diffraction. Therefore, it is recognized herein that MIMO/beamforming may be essential to guarantee sufficient signal level at the receiver end.

With respect to an NR Downlink (DL) Control Channel, to further enhance the reliability of DL control channels with multiple beams, repeated control messages can be transmitted with different beams or in different search spaces. Multiple Input, Multiple Output (MIMO) transmission for control channel usually utilizes transmit diversity since the control channel prioritizes robust reception. Space frequency block coding (SFBC) and open loop diversity transmission schemes such as precoder cycling are two main candidates for control channel transmission scheme. SFBC generally performs better than precoder cycling when the coding rate is high or aggregation level is low. These two transmission schemes may achieve similar block error rate (BLER) performance when the coding rate is lower. However, SFBC requires at two antenna ports or reference signals (RSs) to transmit one codeword, while precoder cycling may need only one antenna port. Another example advantage of precoder cycling is that it may be transparent to the UE when the precoders used for the demodulation reference signal (DM-RS) and control channel are the same.

Group common physical downlink control channel (PDCCH) may be used to indicate at least the slot type (e.g., DL or UL) when flexible duplex operation is applied. Other content carried by group common PDCCH may be information such as the end of control resource sets or the start of data region in a slot, which may reduce UE's blind decoding effort. In an example, a given UE may be able to detect PDCCH no matter whether the group common PDCCH is received or not.

In NR, a control resource set is defined as a set of resource element groups (REGs) under a given numerology. A search space in NR may associated with a single control resource set, and the search spaces in different control resources sets may be defined independently. Multiple UE-specific search spaces may be configured to a UE, and it may be desired that different search spaces can be independently configured with different resource mappings, different control subband bandwidths, etc. The search spaces for UE-specific PDCCH and group common PDCCH can also be configured independently such as periodicity.

Considering the time critical nature of URLLC applications and the related extreme reliability requirement, it is further recognized herein that URLCC transmissions may preempt eMBB transmissions. Thus, in some cases, resources should be allocated to URLLC data transmission with minimum impact to already scheduled eMBB data or eMBB data in the process of transmission. Further, in some cases, it is recognized herein that transmission of URLLC data may impact the design of eMBB code blocks (CBs), eMBB and URLLC resources scheduling, and eMBB hybrid automatic repeat request (HARQ) processes. Various example issues are identified herein that can be addressed in support of the co-existence of eMBB and URLLC data transmissions in 3GPP NR.

For example, multi-bit acknowledgment/negative acknowledgement (ack/nack or A/N) can be implemented. In some cases, code block groups (CBGs) can efficiently be used for retransmissions of eMBB data impacted (e.g., preempted) by URLLC transmissions. It is recognized herein that the CBGs and HARQ procedures for such operations should be defined. With respect to how the eMBB resources may be preempted by URLLC, it is recognized herein that redemption indication techniques and resources may be defined for proper operation of eMBB. Preemption may also preserve critical functions such as, for example, control information decoding, RS based channel estimation, and channel quality estimation. Data reliability requirements for URLLC is higher than that for eMBB. The eMBB is typically targeted to operate at $10^{-1}$ BLER per transmission. URLLC may be required to operate at $10^{-3}$ or lower BLER. In this case, it is recognized herein that typical CQI reports based on a $10^{-1}$ operating point may be inadequate. Downlink control information (DCI) for URLLC may also have a lower BLER operating point requirement than eMBB. URLLC PDCCH might use larger aggregation levels compared to eMBB. Thus, URLLC PDCCH might occupy significant resources. This may increase the blocking probability.

It is also recognized herein that group common PDCCH in NR might carry information such as the slot structure, and might be associated to a common radio network temporary identifier (RNTI) for a group of UEs. Since there is no "always on" common RS for demodulation of a group common PDCCH, a mechanism to setup DMRS for group common PDCCH may be defined. In addition, when group common PDCCH is operated at multi-beams, then the BPL for group common PDCCH transmission may be different from the BPLs for UE-specific PDCCH of individual UEs in the group. Therefore, issues related to beam pairing and beam monitoring for group common PDCCH may be addressed.

With respect to UE-specific PDCCH designs, in LTE, PDCCH is based on search space design and blind decoding. It is recognized herein, however, that in some cases, a large number of blind decoding attempts may consume too much power, which might not be affordable for NR UEs. In NR, beamforming based transmission may be applied to PDCCH. Thus, it is recognized herein that the NR search space design may desired to adapt to beamforming while reducing the number of blind decoding attempts.

With respect to DRX Cooperated with Group Common PDCCH, in LTE, if UE is in a discontinuous reception (DRX) OFF state when data arrives at the eNB, the eNB may have to wait until the UE wakes up. For group common PDCCH, the UE group may contain some UEs in DRX mode and others in nonDRX mode simultaneously. It is recognized herein that a design of DRX wake up durations might work with group common PDCCH transmissions in order to save the UE's power.

With respect to HARQ scheduling, described now are example embodiments for code block (CB) configurations and code block group (CBG) configurations to support multi-bit A/N feedback. In some cases, the following disclosed embodiments may apply to both DL and UL communications.

Figure 2:
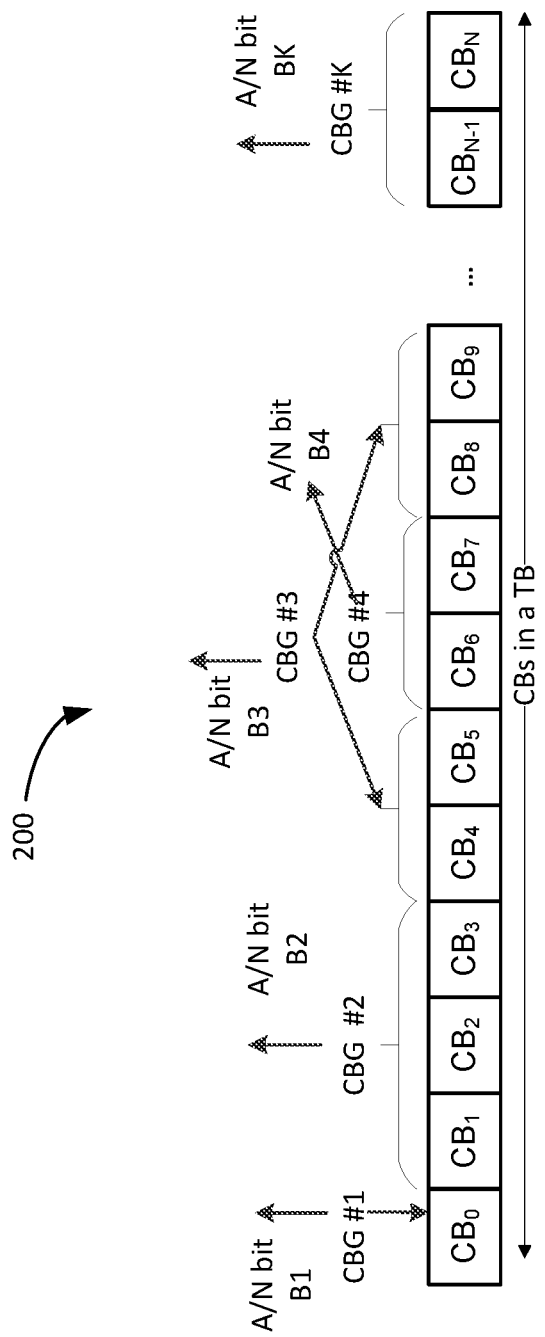
FIG. 2 shows example code block groups (CBGs) for multi-bit Ack/Nack (A/N) feedback, wherein the CBGs may contain discontiguous code blocks (CBs) or a different number of CBs.

In an example embodiment, CBGs in a TB may be configured to have the same number or a different number of CBs to facilitate use cases, such as URLLC based preemption for example. Referring now to FIG. 2, an example transport block 200 is shown, which consists of a plurality of code block groups (CBGs) that each include at least one code block (CB). The CBs in a given CBG may be contiguous or noncontiguous. A CBG that is contiguous only includes CBs that are in direct sequential order with each other and have no intervening CBs from another CBG. A CBG that is noncontiguous (or discontinuous) includes a groups of CBs, wherein at least one of the CBs in not in direct sequential order with the other CBs in the group. Thus, in a noncontiguous CBG, at least one CB from a different CBG is in between two CBs of the noncontiguous CBG. For example, as shown, CBG #3 is a noncontiguous CBS, as it includes $CB_4$, $CB_5$, $CB_8$ and $CB_9$, and $CB_6$ and $CB_7$ are 1) part of CBG #4; and 2) in between $CB_5$ and $CB_8$. FIG. 2 also shows an example where the CBGs are configured with one (1) A/N bit assigned to each CBG, and each CGB may include a different number of CBs. For example, as shown, $CB_0$ includes one CBG (CBG #1), and CBG #2 includes three (3) CBs ($CB_1$, $CB_2$, and $CB_3$). An example grouping of noncontiguous of blocks in one CBG is one where the starting and end CBs of a TB are grouped within the CBG. In some cases, the likelihood of preemption is higher in the middle symbols of a slot. Thus, CBGs that include CBs other than the starting and end CBs of a TB may have a higher likelihood of being punctured. Preemption at the start of a TB may be avoided though scheduling in DCI at the start of the slot. Preemption at the end of TB may be avoided by scheduling in the next slot.

In an example, multi-codeword transmission a CBG may consist of CBs from multiple codewords transmitted in a single transmission time interval (TTI), for example through spatial multiplexing. A single A/N bit may be assigned to a CBG consisting of CBs from different codewords. In another example, the CBG configuration, such as the number of CBs and the size of each CB, for multi-bit A/N may be set up through radio resource control (RRC) signaling, medium access control (MAC) control elements (CE), or dynamic indication through downlink control information (DCI) messages. It will be appreciated that the example transport block 200 is simplified to facilitate description of the disclosed subject matter and is not intended to limit the scope of this disclosure. Other configurations may be used to implement the embodiments disclosed herein in addition to, or instead of, a configuration such as the configuration shown in FIG. 2, and all such embodiments are contemplated as within the scope of the present disclosure.

Figure 3A:
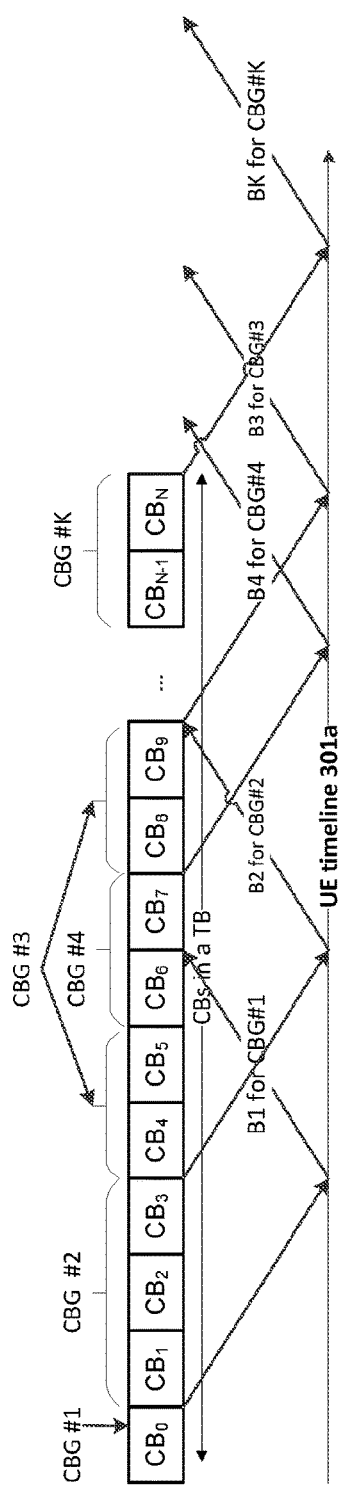
FIG. 3A shows an example time line for CBGs in which separate resources are assigned to A/Ns for the different CBGs.
Figure 3B:
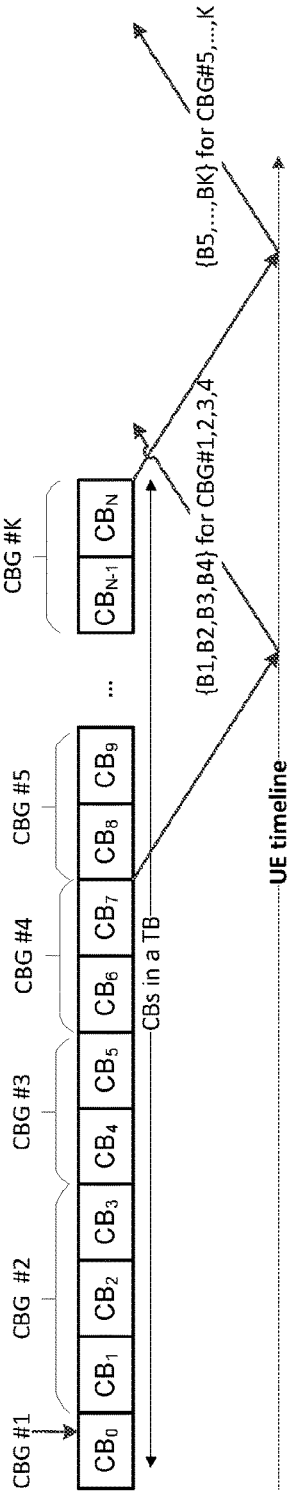
FIG. 3B shows an example time line for CBGs in which A/N resources are aggregated for a number of CBGs.
Figure 3C:
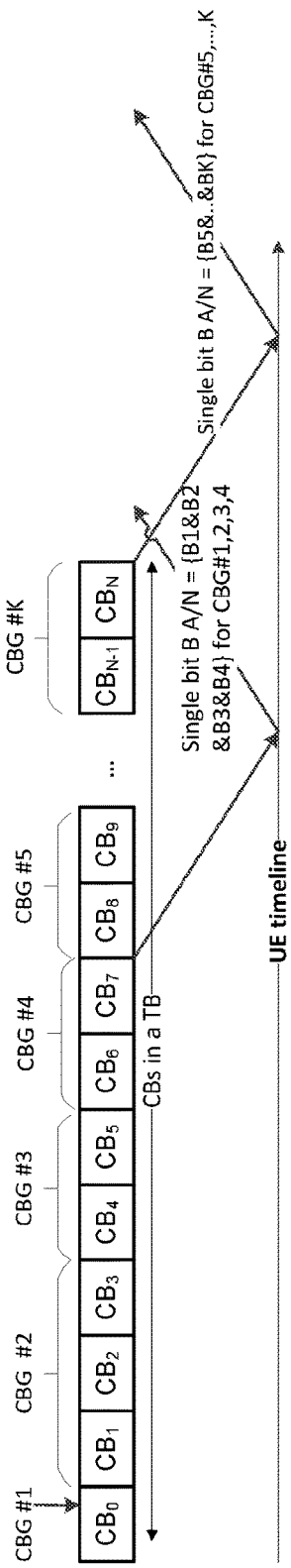
FIG. 3C shows an example time line for CBGs in which the A/N for multiple CBGs are bundled together into a single bit.

Referring to FIGS. 3A-C, in accordance with various embodiments, an A/N message may be configured to be transmitted in various ways. Referring in particular to FIG. 3A, for example, an A/N bit may be sent by a UE separately with respect to time, as shown by a UE timeline 301a, for each CBG. As shown, an A/N bit is sent for each CBG. In particular, A/N B1 is sent in response to CBG #1, A/N B2 is sent in response to CBG #2, A/N B3 is sent in response to CBG #3, and A/N B4 is sent in response to CBG #4. The A/N resource for each CBG may be assigned by the DCI in the DL grant for the UE. It will be understood that the DL grant may be sent to the UE by a network node, such as a gNB for example.

In another example, with reference to FIG. 3B, A/N bits are sent in an aggregated manner after the last CBG is received. The last CBG refers to the CBG that is transmitted last in the buffer with respect to time. In particular, in accordance with the example, after CBG #4 is received, the UE sends A/N bits B1, B2, B3, and B4, which correspond to CBG #1, CBG #2, CBG #3, and CBG #4, respectively. In some cases, the A/N bits may be jointly encoded and a single TB may require multiple aggregated A/N signaling occasions to fully provide feedback for the CBGs in it. In another example, with reference to FIG. 3C, A/N bits are sent in a bundled manner after the last CBG in the bundling. For example, a single bit may be used to indicate the A/N across multiple CBGs. To illustrate, a single bit A/N B (which corresponds to CBG #1, CBG #2, CBG #3, and CBG #4) is sent by the UE in FIG. 3C.

Thus, with general reference to FIGS. 2 to 3C, a node (e.g., UE) may receive a transport block comprising a plurality of code block groups, and a first code block group of the plurality of code block groups can have a different number of code blocks as compared to a second code block group of the plurality of code bock groups. The node may decode the plurality of code bock groups. In response to decoding the plurality of code block groups, the node may sending an ack/nack message that indicates whether the decoding was successful with respect to each code block group. The ack/nack message may include a plurality of bits and may correspond to the transport block. In an example, as described herein, the ack/nack message may include a first ack/nack message and a second ack/nack message, and the second ack/nack message may be sent in response to receiving a request for additional information concerning the first ack/nack message. In another example, as described above with reference to FIG. 3A, the ac/nack message may include a plurality of ack/nack messages sent at different times with respect to each other, and each of the plurality of ack/nack messages may be sent after the code block group to which they apply is decoded.

Figure 4:
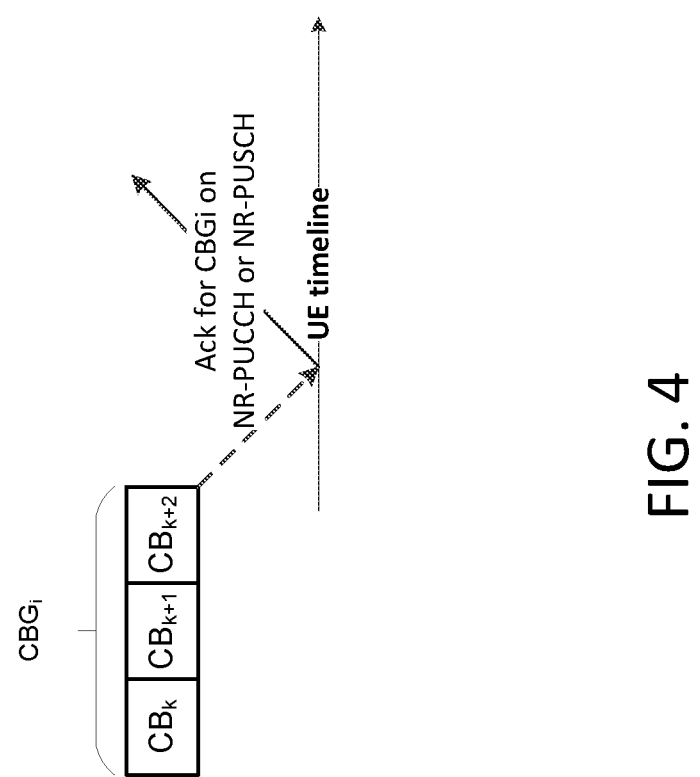
FIG. 4 shows an example user equipment (UE) response with a 1-bit acknowledgement (Ack) for a CBG.

Turning now to HARQ enhancements for retransmissions, in an example embodiment, a flexible number of A/N bits may be sent by the UE within the originally allocated resources for A/N for a given CBG. For example, if a given CBG is correctly decoded, a 1-bit Ack may be sent by the UE for that CBG on the new radio physical uplink control channel (NR-PUCCH) resource or on the new radio physical uplink shared channel (NR-PUSCH). This is illustrated in FIG. 4, wherein an Ack message in response to a CBG consisting of three (3) CBs. It will be understood that the number of CBs that correspond to the Ack message may vary as desired.

If a given UE fails to decode a given CBG, the UE may respond in various ways in accordance with various embodiments. For example, the UE may send a Nack in its NR-PUCCH or NR-PUSCH resource. The UE may also, or alternatively, send a multi-bit A/N for CBs/CBGs (within the CBG that corresponds to the Nack) at a finer granularity on the NR-PUSCH, for example, along with the Nack bit or in a subsequent NR-PUSCH transmission. The resources for this multi-bit A/N message may be obtained by puncturing the new radio physical downlink shared channel (NR-PDSCH) or backing off the NR-PUSCH resources through rate matching. In some cases, when the eNB decodes a 1-bit Nack, it looks for the multi-bit A/N in the appropriate NR-PUSCH resource. The CB configuration for the fine multi-bit A/N can be configured through higher layer signaling.

Figure 5B:
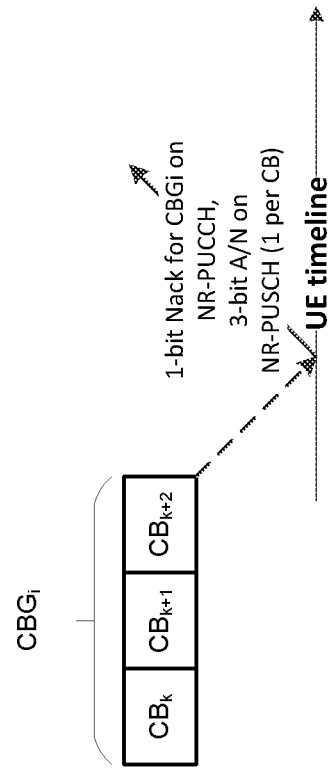
FIG. 5B shows an example UE response to observing a Nack, wherein successive NR physical shared channels (PSCH) carry the 1-bit Nack for CBG and the 3-bit A/N for the CBs.
Figure 5D:
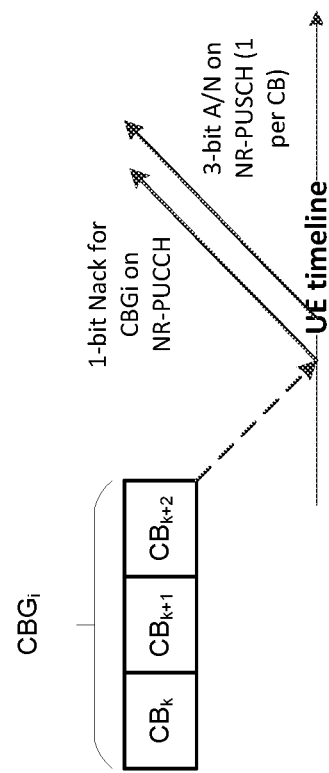
FIG. 5D shows an example UE response to observing a Nack, wherein a NR physical uplink control channel (PUCCH) carries the Nack for CBG and the 3-bit A/N is sent on the following NR-PUSCH.
Figure 5A:
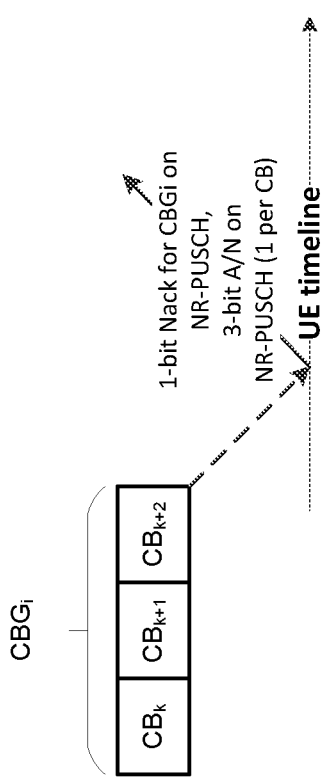
FIG. 5A shows an example UE response to observing a Nack, wherein a new radio (NR) physical downlink shared data channel (PDSCH) carries both a 1-bit Nack for CBG and a 3-bit A/N for the CBs.
Figures 6A, 6B:
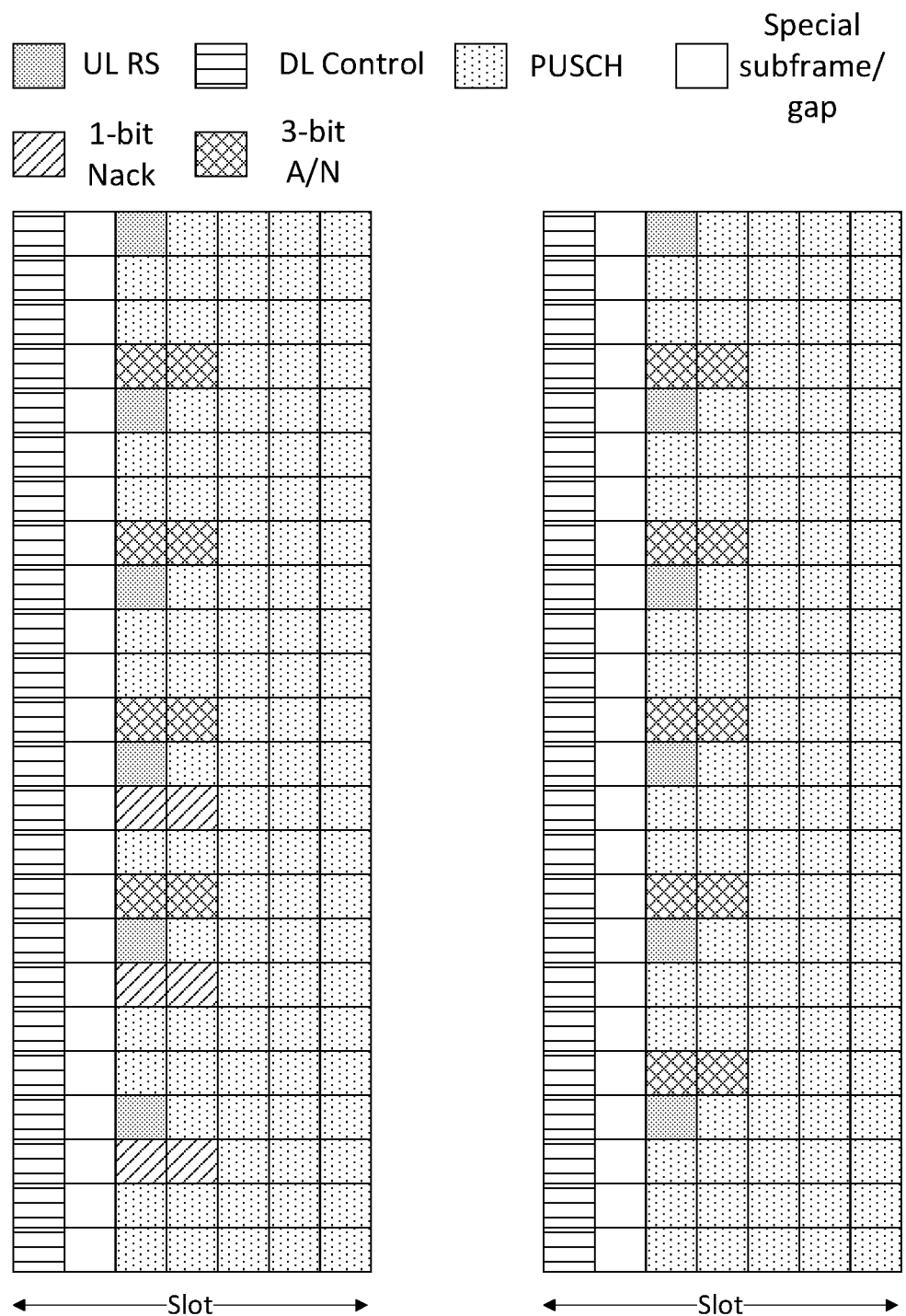
FIG. 6A depicts example resources for A/N on NR-PUSCH, which includes resources for 1-bit A/N for CBG and 3-bit A/N for the CBs in $CBG_i$.
FIG. 6B depicts example resources for A/N on NR-PUSCH, which includes resources 3-bit A/N for the CBs in $CBG_i$.

Referring now to FIG. 5A and FIG. 5B, an example A/N response to CBG, which consists of 3 CBs, is shown. In FIG. 5A, a 1-bit Nack is transmitted on the NR-PUSCH, followed by a 3-bit A/N on the NR-PUSCH. In FIG. 5B, a 1-bit Nack is transmitted on the NR-PUCCH, followed by a 3-bit A/N on the NR-PUSCH. FIG. 6A shows an example of resource configuration for the 1-bit Nack and 3-bit A/N, both in the NR-PUSCH region for OFDMA based UL transmissions. As shown, the corresponding resources are clustered around the UL RS for high quality channel estimation.

Figure 5C:
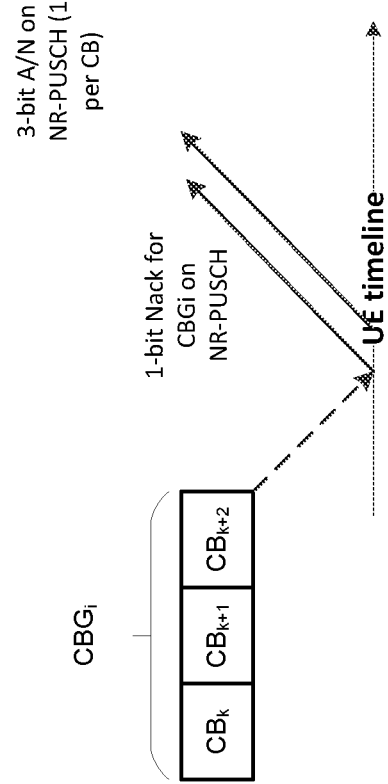
FIG. 5C shows an example UE response to observing a Nack, wherein a NR physical uplink shared channel (PUSCH) carries the Nack for CBG and the 3-bit A/N is sent on the following NR-PUSCH.

Referring to FIG. 5C, in accordance with the example, a 1-bit Nack may be sent on the NR-PUSCH, and the 3-bit A/N at finer granularity may be sent on the successive NR-PUSCH. FIG. 6B shows an example of resource configuration for the 3-bit A/N on the NR-PUSCH. FIG. 5D shows that the 1-bit Nack may be sent on the NR-PUCCH, and the 3-bit A/N at finer granularity may be sent on the successive NR-PUSCH.

Figure 7B:
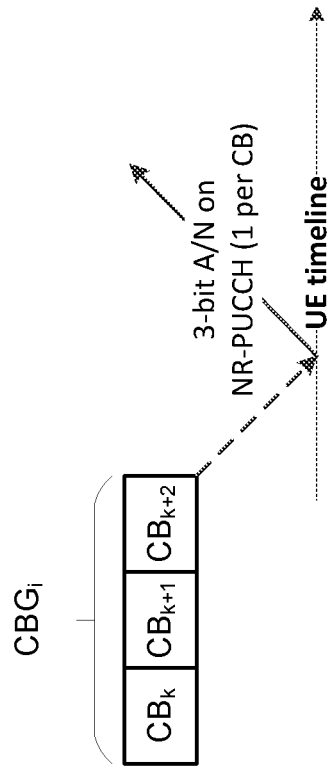
FIG. 7B shows an example multi-bit A/N response (per CB of $CGB_i$) directly transmitted for detection through blind decoding, wherein the transmission is on NR-PUCCH.
Figure 7A:
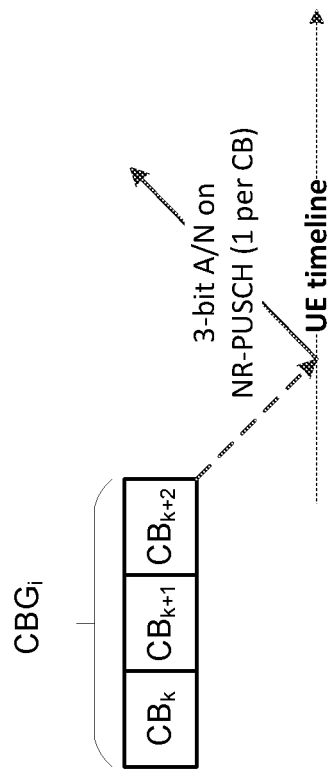
FIG. 7A shows an example multi-bit A/N response (per CB of $CBG_i$) directly transmitted for detection through blind decoding, wherein the transmission is on NR-PUSCH.

In some cases, when the UE receives a CBG for which a Nack needs to be sent in response, the UE directly sends a multi-bit A/N for CBs/CBGs (within the CBG that corresponds to the Nack) at a finer granularity. For example, a network node (e.g., eNB) may blindly decode a 1-bit Ack for CBG or an N multi-bit A/N, and determine the quality of the reception. Referring to FIG. 7A, for example, a UE sends the transmission of the 3-bit A/N when CBG fails decoding at the UE. The NR-PDSCH resources may be punctured or backed off (such as rate matched) to accommodate the multi-bit A/N. Such blind decoding may be enabled by locating the resources for 1-bit A/N and multi-bit A/N in different locations within the NR-PDSCH as illustrated in FIG. 6A, where the resources for 1-bit Ack are located below the RS while those for multi-bit A/N are located above the RS.

In some cases, the UE may have resources allocated on NR-PUCCH for 1-bit A/N per configured CBG. But upon observing Nack on CBG, for example, the UE may encode a multi-bit A/N and transmit them within those resources on the NR-PUCCH. The effective code rate may be higher for the multi-bit A/N case, but for use cases where the multi bit payload is small for example, it may be sufficient for the eNB to decode it. FIG. 7B shows an example where the 3-bit A/N response is sent on NR-PUCCH resources formerly allocated for 1-bit A/N for $CBG_i$. The eNB may blindly decode for the 1-bit Ack for $CBG_i$ and multi-bit A/N at finer granularity. The blind decoding can be enabled by using different scrambling signatures on the coded A/N bit message or by interleaving the bits when mapping to the resource elements (REs).

Figure 8B:
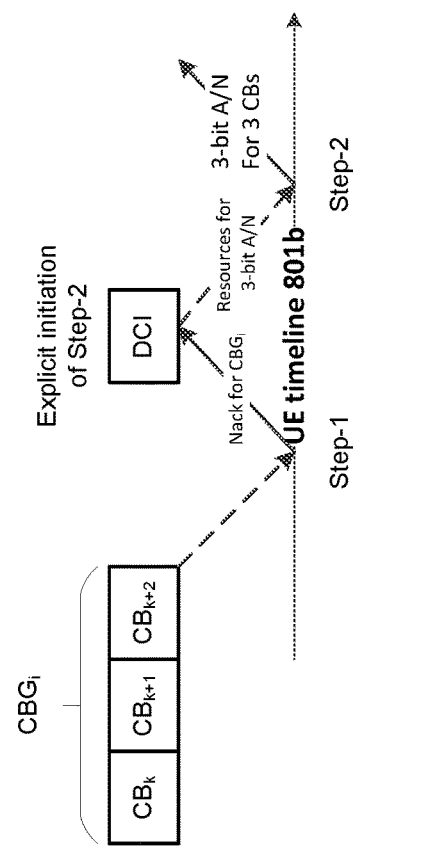
FIG. 8B shows an example 2-step A/N method in which there is explicit resource allocation for multi-bit A/N through DCI.
Figure 8A:
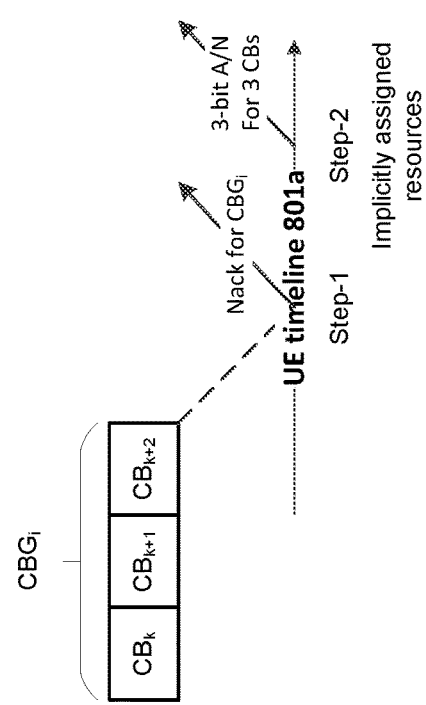
FIG. 8A shows an example 2-step A/N method in which there is implicit resource allocation for multi-bit A/N in step 2.

In accordance with another embodiment, a process may be used to convey the finer multi-bit A/N information to the eNB. It will be understood that an eNB or a gNB is often used herein for purposes of example, and other network nodes may implement the various functionality exemplified by the eNB or gNB. In this example, separate resources are allocated for transmission of the multi-bit A/N at finer granularity. If a CBG fails decoding by a UE, for example, the UE may send a Nack. This transmission is referred to as step-1 herein and in FIGS. 8A and 8B. Upon failure, a process referred to as step-2 may be initiated, wherein the UE sends a multi-bit A/N with finer granularity. Initially, in some examples, a CBG may be assigned a single A/N bit in feedback. If a Nack is observed for the CBG at the UE, for example, the UE may send the Nack in its reserved resources, and subsequently may send a multi-bit A/N (for instance, 1 per CB in the CBG) in another set of resources configured in various ways described below. FIGS. 8A and 8B show example timelines 801a and 801b, respectively, for step-1 and step-2 for the example cases of reception of Ack and Nack for the CBG. During 801a, the UE sends the multi-bit A/N sometime after the Nack. During 801b, the UE sends the multi-bit A/N in response to receiving DCI, and the DCI is sent from a network node after the network node receives the Nack from the UE (step-1).

With continuing reference to FIGS. 8A and 8B, in some examples, a given UE is provided UL A/N resources for the step-2 (transmission of the multi-bit A/N) if step-1 results in a Nack. These UL A/N resources may be implicitly known at the UE or explicitly indicated to the UE. For example, the UL A/N resources may be indicated through the DCI of the DL grant (see FIG. 8B), or may be derived based on one or more of the following, for example and without limitation: A/N resources of step-1, DCI grant, or a specific resource block (RB) of the DL grant (e.g., the starting RB).

In some cases, if step-1 results in an Ack, the resources allocated for step-2 are released from the UE and returned to the eNB's resource pool. In other cases, if step-1 results in a Nack, then the resources allocated for step-2 are used for transmitting the A/N at a finer granularity. FIG. 8A shows an example where step-1 uses a single A/N bit for $CBG_i$ and results in a Nack. This triggers step-2, wherein A/N bits are sent at a finer granularity for the individual CBs within $CBG_i$. In some cases, the eNB ensures that it does not schedule other transmissions on resources for the step-2 if a Nack is received from the UE.

In an example, the eNB requests step-2 to trigger, and assigns the A/N resources accordingly. The eNB may indicate the resources through a new form of NR-DCI, wherein the HARQ process is identified with the same ID as the original transmission for which received a Nack. FIG. 8B shows an example in which the DCI indicates the new resources for the multi-bit A/N. In some cases, the scheme in FIG. 8B can have more latency than the example scheme illustrated in FIG. 8A.

The number of A/N bits to be reported in step-2 and the finer CBGs may be specified or preconfigured through system information, or indicated through the DCI associated with the original transmission. It will be understood that the above-described procedures are not limited to two steps, and thus the procedures may be extended to an N-step A/N reporting process, wherein each step provides A/N bits at finer granularity.

In accordance with various embodiments, A/N bits for retransmissions may be configured in various ways. In one example, a single A/N bit is retransmitted for a plurality of CBGs. In some cases, this limits the overhead in DCI configuration (HARQ process) for retransmission. In another example, similar to the configuration of the first transmission, one A/N bit may be sent per CBG in the retransmission. This may be specified or configured by system information/higher layer signaling or indicated through the DCI of the original transmission. In yet another example, CBG configurations for multi-bit A/N may be specified explicitly through DCI of the original transmission or the retransmission.

Figure 9:
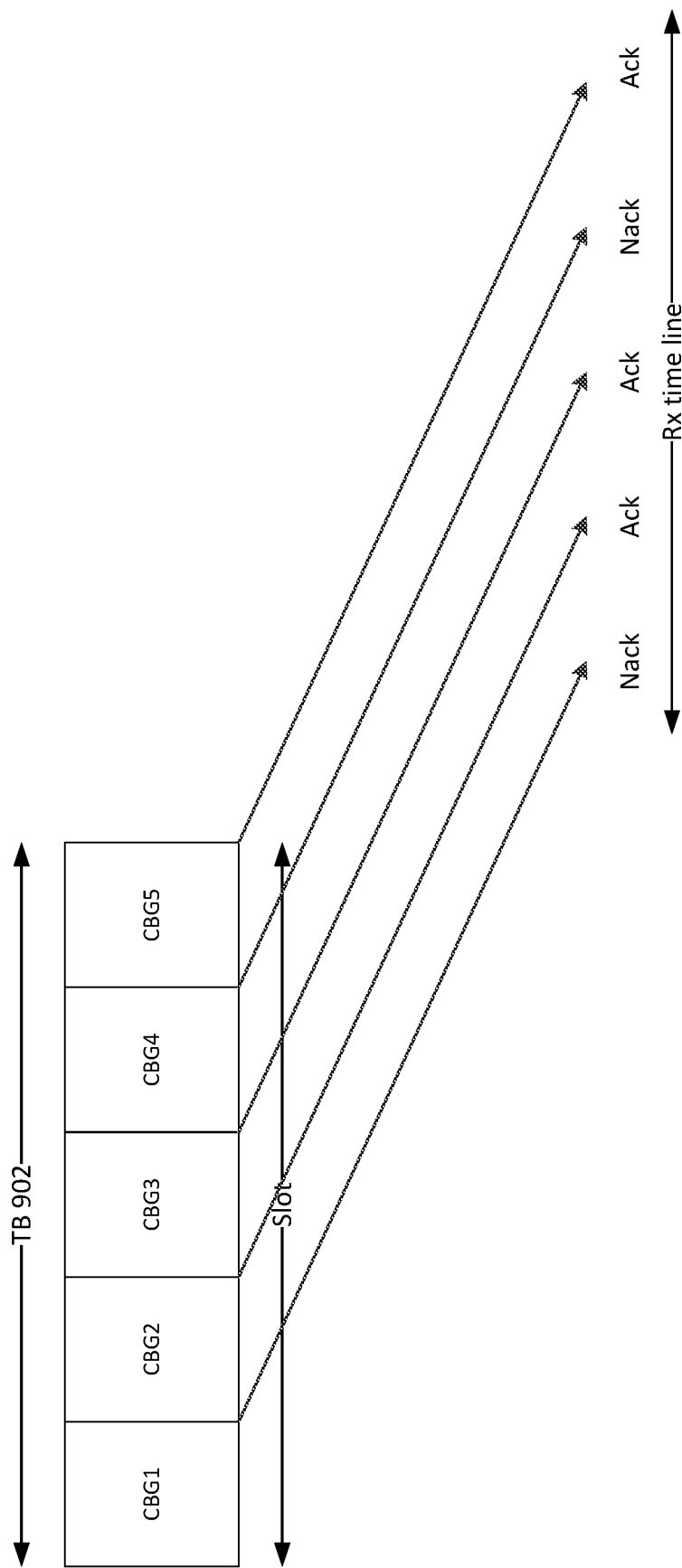
FIG. 9 illustrates an example transport block (TB) that includes multiple CBGs, and an Ack or Nack is sent in response to each CBG.

Referring now to FIG. 9, an example is shown in which a TB 902 consisting of multiple CBGs is transmitted by a network node. In accordance with the example, an A/N is received (by the network node) for each CBG. Upon reception of each Nack, the corresponding CBG may be retransmitted. By way of example, FIG. 9 shows a transmission of the TB 902 that contains 5 CBGs, designated as CBG1 through CBG5. CBG1 and CBG4 are incorrectly decoded and induce a Nack response while the other CBGs induce an Ack response. Note that the figure does not depict coding, modulation, and RE mapping explicitly but these steps are understood to be present.

Figure 10B:
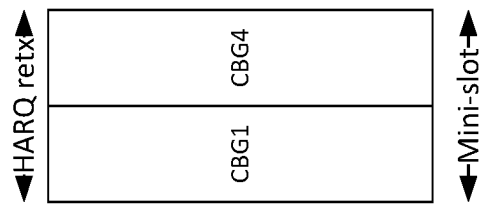
FIGS. 10A and 10B illustrate retransmissions of CBGs that induced a Nack in a single HARQ process, in accordance with an example embodiment.
Figure 10A:
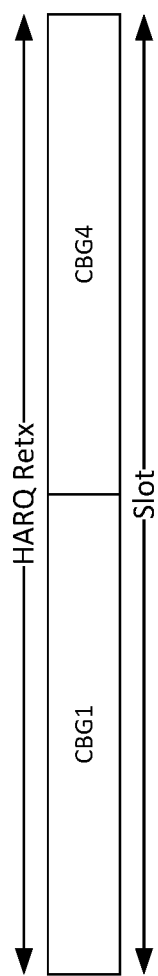

Referring to FIGS. 10A and 10B, a CBG from a HARQ process that induces a Nack message may be retransmitted in a single HARQ retransmission. Continuing with the example shown in FIG. 9, CBG1 and CBG4 are retransmitted in FIGS. 10A and 10B. FIG. 10A illustrates an example where the retransmission occurs over one (1) slot, and FIG. 10B shows an example where the retransmission occurs over a mini slot. The retransmitted CBGs may be implicitly recognized at the UE, as they correspond to the CBGs that induced Nack messages in the previous transmission. To keep the retransmission simple, in some cases, the CBGs are retransmitted in the same order in which they were sent in the original transmission. Thus, in some examples, the DCI for the retransmission of the HARQ process does not explicitly carry information regarding which CBGs are retransmitted.

CBGs from a HARQ process that induce a Nack may be retransmitted together in a single HARQ retransmission as shown in FIGS. 10A and 10B, but with the DCI for the corresponding grant explicitly indicating the retransmitted CBGs. For example, the retransmitted CBGs may be indicated using a bit-map for each CBG, where the bit for the retransmitted CBG is set. For the example, with reference to FIGS. 9-10B, the bitmap in the retransmission may be '10010', wherein the ones correspond to CBGs 1 and 4. By explicitly sending the index number of the retransmitted CBGs, for example 000, 011 for CBGs 1, 4, as the DCI carries information of the retransmitted CBGs, they may be transmitted in any order.

Figure 11A:
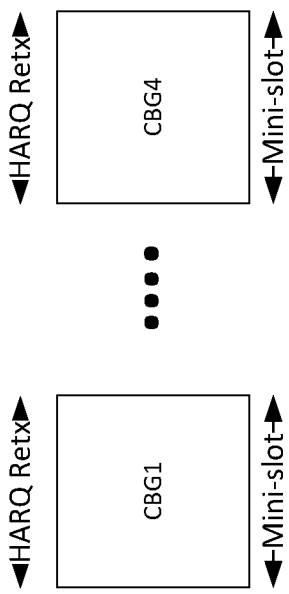
FIGS. 11A and 11B illustrate multiple HARQ retransmissions of CBGs that induced a Nack, wherein each retransmission contains a single CGB, in accordance with an example embodiment.
Figure 11B:
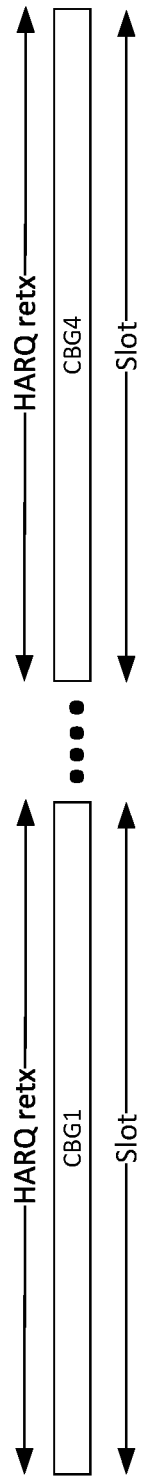

Referring now to FIGS. 11A and 11B, in another example, the CBGs that induce a Nack message from a HARQ process may be retransmitted in different HARQ retransmissions, each with its own DCI and DL grant. In some cases, this example may be implemented where resources for retransmitting all the CBGs at once might not be available. The retransmission HARQ may occur in adjacent transmission time intervals (TTI) or in non-adjacent TTIs. Furthermore, the information concerning the CBG number in the transmission may be explicit or implicit as further described herein.

In an explicit example, the DCI of the retransmission may carry a field providing the identity of the CBG being retransmitted in the HARQ retransmission. The retransmissions may occur in different mini-slots or slots. Each retransmission may contain one or more of the CBGs requiring retransmission, for example, indicated by the explicit indication that may be a bitmap. In an implicit example, the CBG in the retransmission may be implicitly understood from the order of the Nacks associated with the original transmission. For example, it may be understood that the first retransmission is for $CBG_1$, and the second retransmission is for $CBG_4$.

In some examples, each CBG that induces a Nack may be retransmitted with a different redundancy version (RV). This may be useful, for example, for cases where a CBG may be lost due to preemption. By way of example, for a CBG that induces a Nack due to preemption, RV0 may be the preferred retransmission to compensate the erasure, whereas for a CBG that induces a Nack due to poor SINR, redundancy versions other than RV0 may be preferred. A bitmap for the retransmitted CBGs may be used to indicate the RVs for the retransmitted CBGs, as shown in FIGS. 12A and 12B. In FIG. 12A, a single HARQ retransmission contains two (2) CBGs each with a different RV. In FIG. 12B, two HARQ retransmissions are used to carry the CBGs, and each CBG has its own RV. In some cases, if a retransmission contains only CBGs corresponding to a single RV, a single set of bits may be used to indicate the RVs for all those CBGs.

Figure 13:
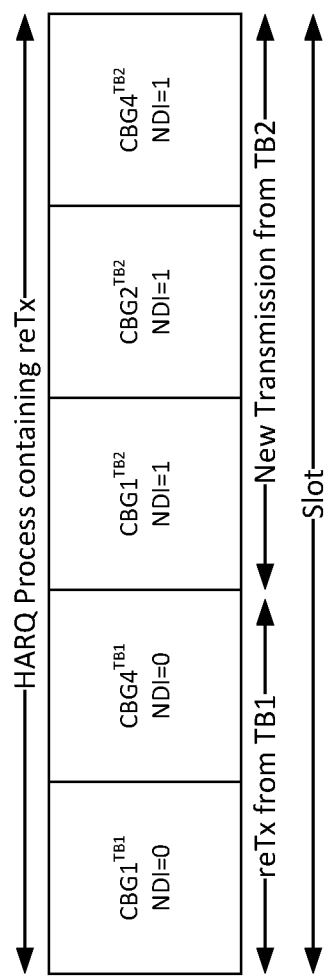
FIG. 13 illustrates a retransmission of CBGs with the transmission of a new TB, in accordance with an example embodiment.

Referring to FIG. 13, CBGs of a first TB that induced a Nack may be retransmitted with CBGs of a second TB. For example, as shown, CBG1 and CBG4 of TB1 are retransmitted as part of the HARQ process containing the CBGs CBG1, CBG2, and CBG3 of a new transmission of TB2. In an example, a new data indicator (NDI) is present for each CBG. The NDI may be is set to 1 when a new CBG is sent, and the NDI may be set to 0 for a retransmission. If CBGs from a previous TB are transmitted with new CBGs from a new TB, the NDI indicates which CBGs may be Chase-combined and which ones must be flushed for new data. When the NDI is 0, another field may be present to indicate the CBG identity so that it can be combined with the correct part of the past transmission.

Turning now to eMBB multiplexing with URLLC, in the DL, a URLLC transmission may be preemptively transmitted on a scheduled eMBB resource due to latency requirements of URLLC. Described now are examples for multiplexing URLLC with eMBB in a preemptive manner.

Figure 14:
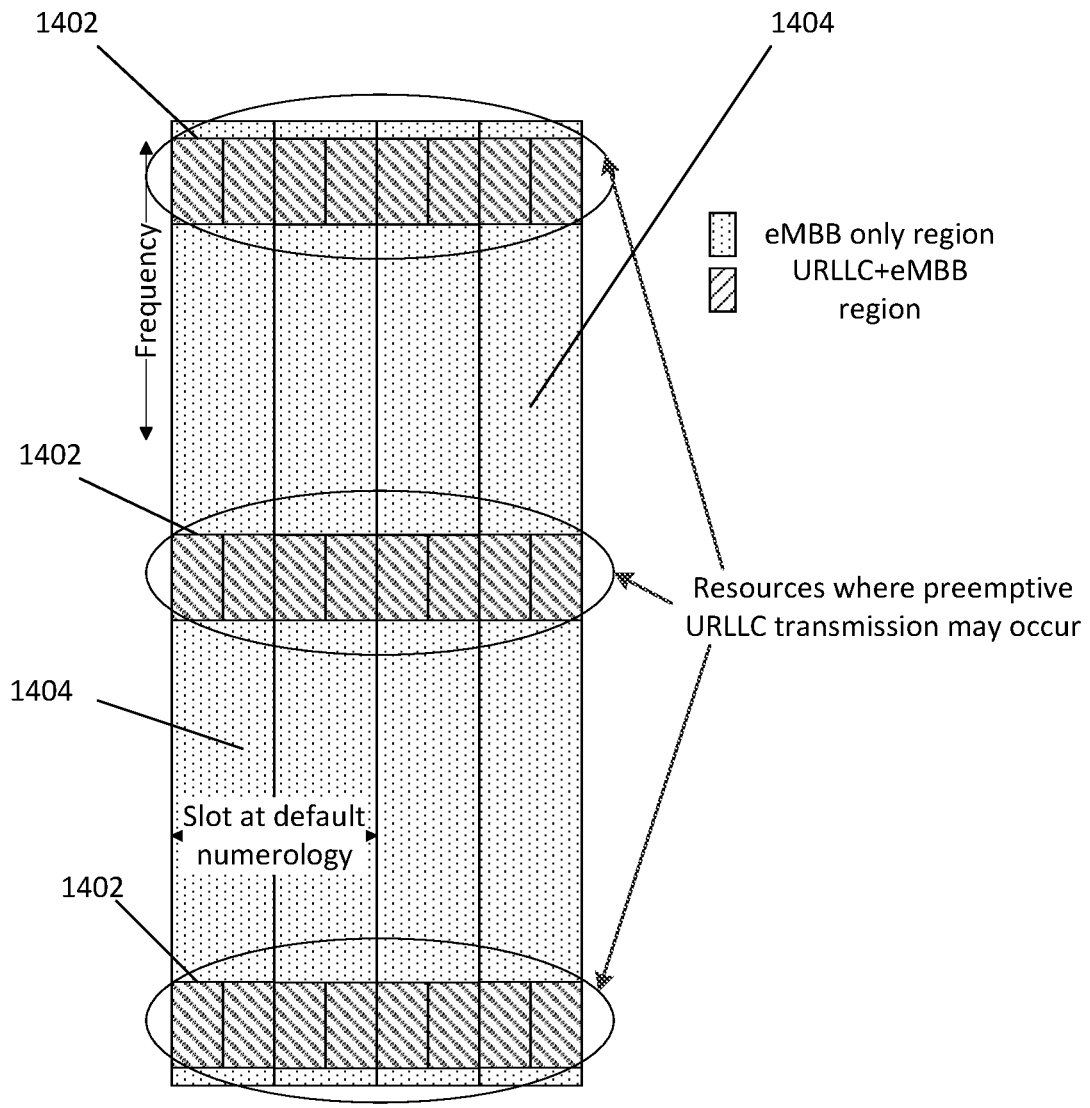
FIG. 14 depicts a preemption region and a scheduled region in accordance with an example.

In an example, the available DL bandwidth may be divided into preemption regions 1402 and scheduled regions 1404 as shown in FIG. 14. In some cases, only the resources in the preemption region 1402 can carry preemptive URLLC transmissions. In an example, the scheduled region 1404 cannot carry preemptive URLLC transmissions. In an example, an eMBB UE assigned to the scheduled region 1404 does not monitor the URLLC indication. When assigned to the preemptive region 1402, an eMBB UE may monitor the network node for a preemption indication.

The resources for the preemption region 1402 and scheduled region 1404 may be indicated through the physical broadcast channel (PBCH) or other system information, group-common NR-PDCCH, or RRC signaling. For a UE in the preemption region 1402, a preemption indication (of a URLLC preemption) may occur in various manners. For example, the preemption indication may occur in a timely manner, such that, the eMBB decoder receives information of the preempted resources before it sends A/N feedback to the eNB. The eMBB UE may use this information to improve its decoding performance. In another example, the preemption indication may occur in a delayed manner, such that, the eMBB UE relies on explicit A/N feedback to obtain retransmissions to improve BLER of its CBGs/TBs.

The preemption indication may be sent explicitly in preconfigured resource locations, such as shown in the examples depicted in FIGS. 15A-D. For example, the preemption indication may be sent as a new physical channel, denoted as a physical preemption indication channel (PPIC), with a format similar to NR-PDCCH, so that an eMBB UE may decode it to check if a preemption indicator is present. FIG. 15A illustrates an example PPIC in a monitoring occasion, indicating the preemption information to the eMBB UE. As shown, the URLLC resources are frequency division multiplexed (FDM) with eMBB resources, and the PPIC signaling overlaps in time with the URLLC signal. FIG. 15B shows an example where the PPIC resources occur prior to the preemption. FIG. 15C shows an example PPIC transmission after the URLLC preemption, but within the duration of the scheduled eMBB resource. FIG. 15D shows an example delayed PPIC transmission occurring after the scheduled eMBB transmission. As seen in FIGS. 15A-D, the PPIC resources may be localized or distributed.

In some cases, if there is no preemptive URLLC transmission in a given symbol/slot/mini-slot, the resources otherwise used for the PPIC are used for other signals, such as data and shared channels.

Referring now to FIGS. 16A-C, a preemption indication may be sent through new radio downlink control information (NR-DCI) that is transmitted in a common or UE-specific (or group common PDCCH or NR-PDCCH) mini-slot or slot. FIG. 16A shows an example NR-DCI carrying the preemption message in a mini-slot just prior to the URLLC transmission. FIG. 16B shows an example NR-DCI carrying the preemption message in a mini-slot following the preemption with respect to time, but within the scheduled duration of the eMBB transmission that was preempted. FIG. 16C shows an example NR-DCI carrying the preemption message in the slot after the preemption.

Thus, as shown, an eMBB UE may receive the preemption message in a multicast manner through common NR-DCI or a group common PDCCH, or in a unicast manner through UE-specific NR-DCI.

The preemption indication message, which may come through the PPIC or NR-PDCCH, for example, may indicate or include various information. For example, the preemption indication may indicate include, for example and without limitation, the preempted resources at some level of granularity (e.g., such as impacted RE, physical resource blocks (PRBs), CB, CBG symbol, mini-slot, slot, subframe); locations of impacted RS for eMBB; new configurations of RS for eMBB; CBG configuration for multi-bit A/N feedback; resources for additional transmission; CBGs that may have additional transmission; IDs of eMBB UE that are impacted, in which case the preempted resources may be indicated as an offset to the location of the eMBB UE resources; and impacted layers of the associated eMBB devices.

In another example, the PPIC message may be indicated through high layer signaling, such as through a MAC CE. This may be implemented in various use cases, such as in use cases where the eMBB UE that was preempted has more DL grants within a short latency of the preempted DL payload.

With respect to preemption indication monitoring, in an example, a group of UEs within the preemption region may be configured to monitor occasions for a preemptive transmission indication in the preemption region, for example when the indication occurs on PPIC. These occasions may be referred to herein as preemption indication occasions.

The symbols and resources in a mini-slot or slot, aggregated mini-slots/slots, or subframes or frames, which can carry a preemptive indication transmission, may be configured through RRC or specified supported numerology. The preemption resources may have various configurations. For example, preemption resources may occur on any of the symbols in a mini-slot/slot/subframe/frame. In another example, preemption resources may occur only on specific symbols in a mini-slot/slot/subframe/frame.

Figure 17:
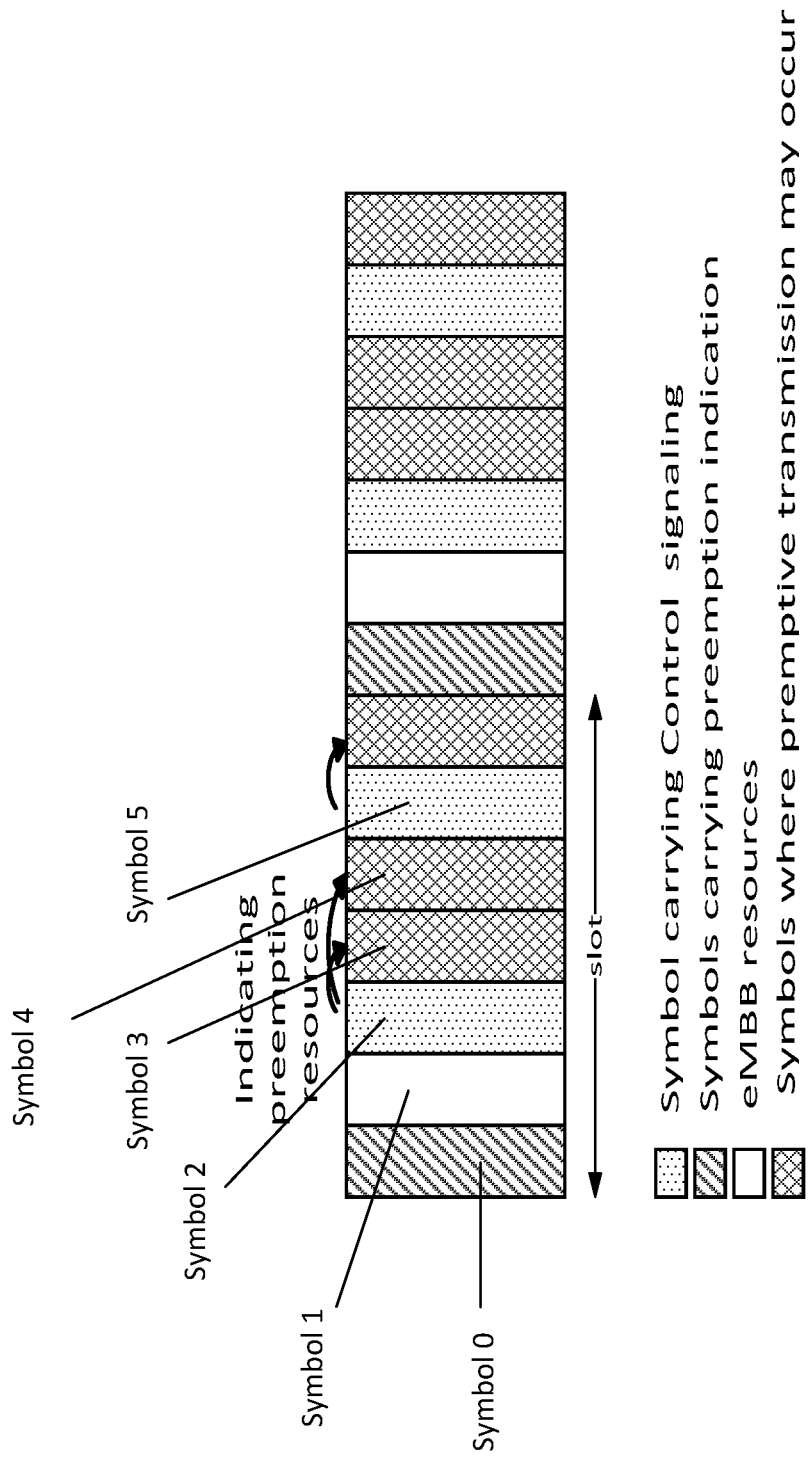
FIG. 17 shows various example occasions for preemption indication.

The preemption indication monitoring occasions may occur at certain periodicity as shown in the example shown in FIG. 17. As shown, by way of example, the monitoring occasions might occur only in the $2^{nd}$ and $5^{th}$ symbols of the slot, and they indicate preemption in symbols {3, 4} and 6, respectively. Symbols 0 and 1 do not carry preemption transmission or preemption indication.

Figure 18:
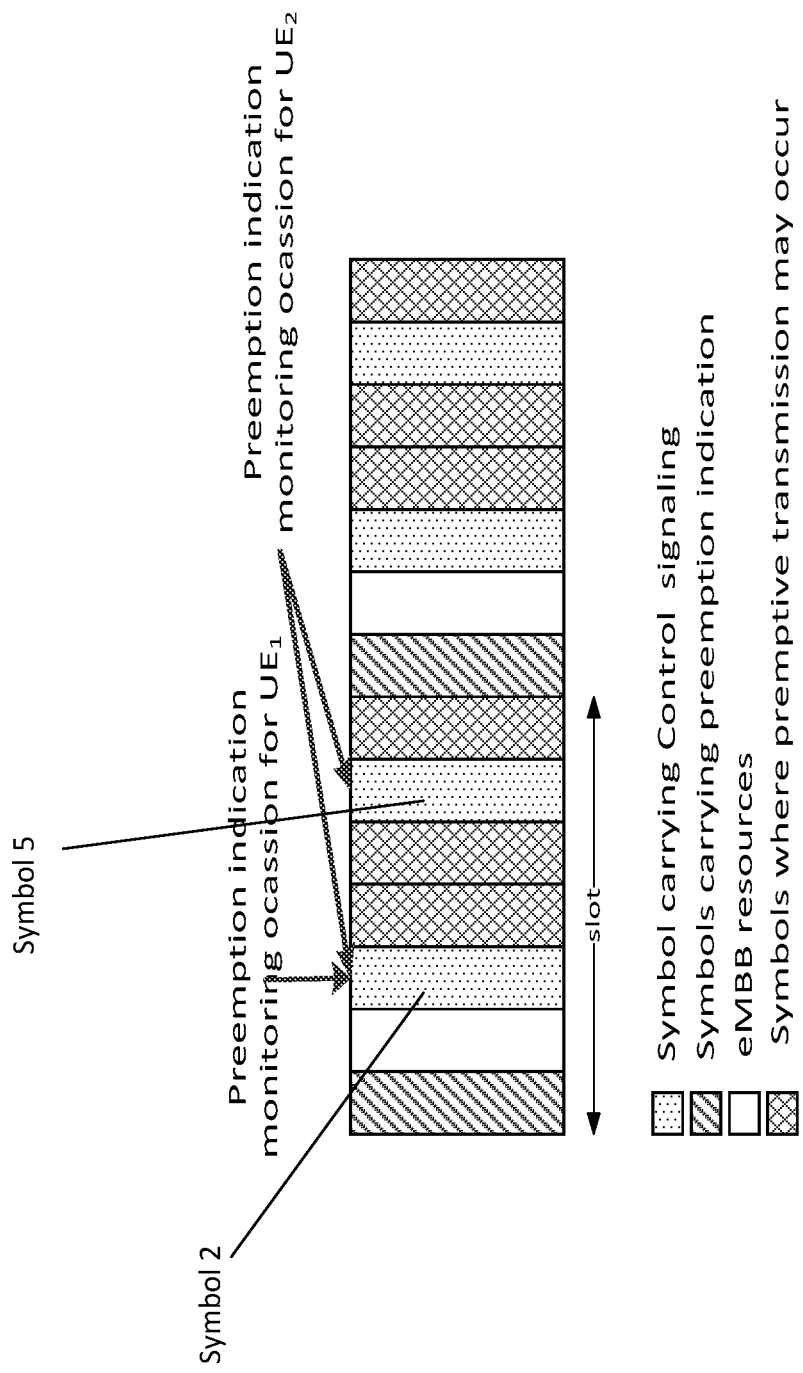
FIG. 18 shows example different preemption indication monitoring occasions for eMBB UEs.

In another example, each eMBB UE may be assigned a subset of preemption monitoring occasions to monitor. FIG. 18 shows an example where eMBB $UE_1$ monitors only symbol 2 for its preemption indication, whereas eMBB $UE_2$ monitors both symbols 2 and 5.

The preemption indication message may be configured as desired. For example, a URLLC Preemption (UP) radio network temporary identifier (RNTI) (UP-RNTI) may be assigned to a group of eMBB UEs for monitoring preemption indication messages. An eMBB UE may determine that it is a valid recipient of the message by identifying the UP-RNTI in a message. For example, the cyclic redundancy check (CRC) of the preemption indication message may be masked with the UP-RNTI. In an example, if an eMBB UE correctly decodes the preemption indication message, it recognizes the presence of a preemption. The preemption indication message may further indicate the impacted resources in the spectrum. If the eMBB UE identifies the impacted resource within its scheduled resources, for example, it may recognize that it has been preempted.

In another example, the UP-RNTI and a cell-RNTI (C-RNTI) of the eMBB UE may both be used in the preemption indication message. The message may directly indicate the impacted resources within the eMBB UE's DL grant. For example, the CRC may be masked by the exclusive OR (XOR) operation of the UP-RNTI and C-RNTI of the eMBB UE. Alternatively, the message may contain the IDs (C-RNTI) of the impacted eMBB UEs and the corresponding impacted resources. Upon finding its C-RNTI, in an example, the eMBB UE proceeds to locate its impacted resources. Each eMBB UE may also be individually configured to receive the preemption indication message. Here, the UP-RNTI may be the same as the eMBB UE's C-RNTI, and the message may directly indicate the impacted resources within the eMBB UE's DL grant.

In some cases, multiple preemption indication messages may be sent in a single occasion, wherein each message may be intended for a specific eMBB UE or a group of eMBB UEs. A UE may also receive multiple preemption indication message it preempted by multiple URLLC transmissions. Alternatively, an eMBB UE may receive a single message indicating multiple preemptions on a single transport block.

Thus, as described above, a node, for instance a device classified as an eMBB device, may monitor at least one preconfigured occasion for a preemption indication. The node may receive a preemption indication message comprising the preemption indication, and based on the preemption indication message, identify at least one scheduled resource that is preempted for use by a second device. In an example, the second device is classified as an ultra-reliability low latency communication (URLLC) device. In accordance with an embodiment, the node is one of a group of devices, and the preemption indication applies to each device in the group of devices. For example, the preemption indication message may include a radio network temporary identifier (RNTI) assigned to the group of devices, and using the RNTI, the node may determine that the node is a valid recipient of the preemption indication message. In an example, the preemption indication message is received on a group common physical downlink control channel. In some cases, the node receives the preemption indication message before the least one scheduled resource is preempted for use by the second device. In other cases, the node receives the preemption indication message after the at least one scheduled resource is preempted for use by the second device. For example, the preemption indication message and the at least one scheduled resource preempted for use by the second device may be received in the same slot. In another example, the at least one scheduled resource that is preempted is received in a first slot, and the preemption indication message is received in a second slot that is received after the first slot with respect to time.

Figure 19:
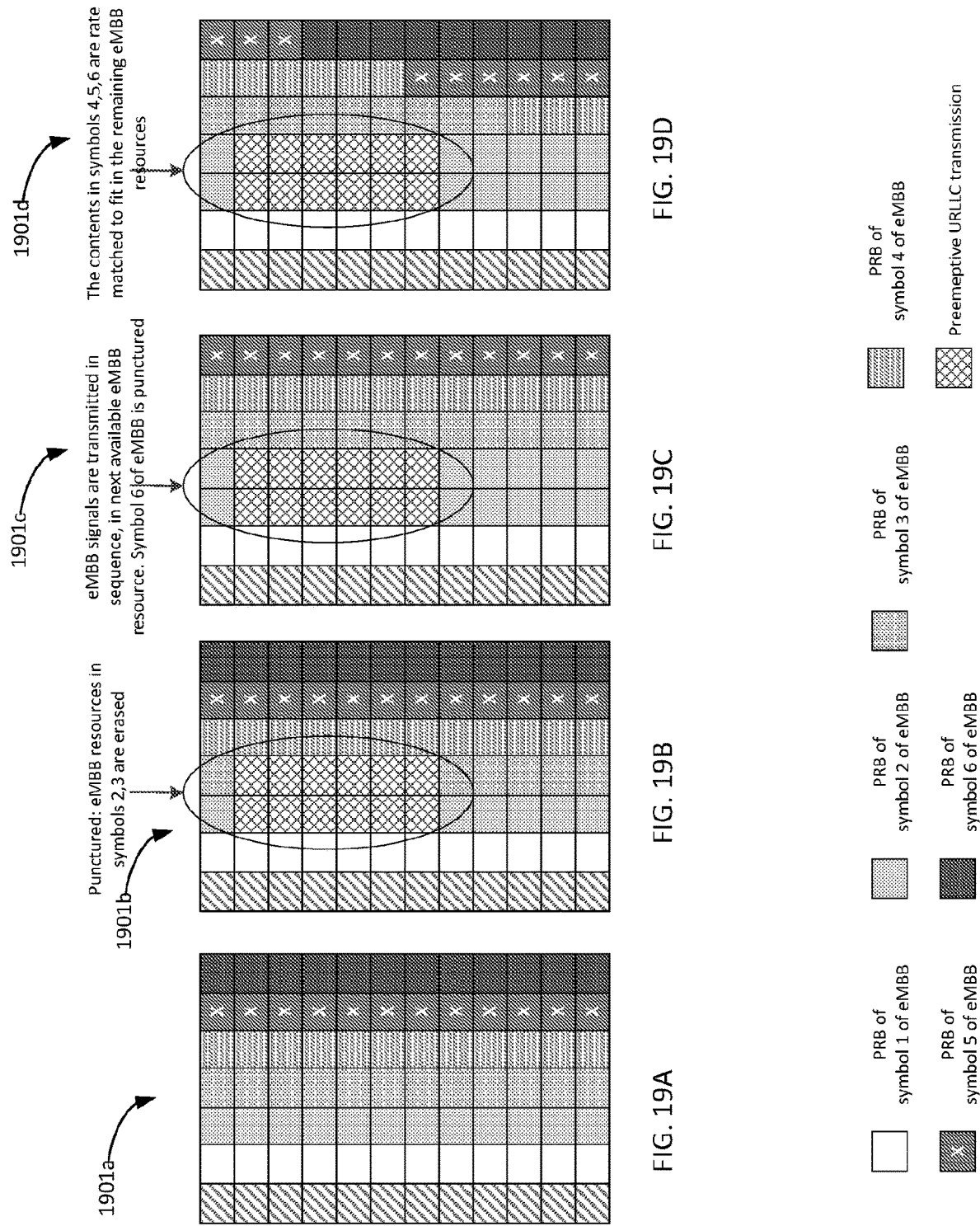
FIG. 19A shows an example eMBB transmission without preemption.
FIG. 19B shows an example of eMBB resources in the preempted region that are punctured.
FIG. 19C shows example eMBB resources that are contiguously mapped in resources, excluding the preempted ones.
FIG. 19D shows eMBB resources which, following the preemption, are rate matched to fit within the remaining scheduled resources.

Preemptive URLLC resources may puncture resources of eMBB devices in various ways. Example mechanisms are described below and illustrated in FIGS. 19A-D. Referring to FIG. 19A, resources for eMBB are shown to be scheduled in a slot 1901a. In an example slot 1901b depicted by FIG. 19B, the preempted URLLC resources puncture the eMBB data scheduled at those resources. In FIG. 19B, an example URLLC transmissions preempts, and thus erases, certain physical resource blocks (PRBs) of symbols 2 and 3 of the slot 1901b.

In some cases, eMBB data is transmitted in sequence. For example, eMBB data may be mapped to the available resources after preemption and the tail end of the eMBB TB may be omitted from transmission. FIG. 19C shows an example case where the eMBB data originally scheduled in REs of symbols 2 and 3 of slot 1901c are transmitted in available resources after the preemptive transmission, but contents originally intended for symbol 6 are omitted.

In another example, the eMBB contents starting from the preemption resource or those occurring after the preemption resources are retailored to fit into the remaining available eMBB resources. For example, the eMBB transmission may be additionally rate matched to fit the remaining resources available. In the example slot 1901d depicted in FIG. 19D, some PRBs of contents of original symbols 3,4,5,6 are omitted due to additional rate matching. In some examples, the modulation coding scheme (MCS) of the eMBB transmission may be adjusted to use a higher code rate. In some examples, the MCS of the eMBB transmission may be adjusted to use a higher order modulation.

It is recognized that one or more, for instance all, of the code blocks (CBs) may be impacted due to retailoring. A few examples are provided below for purposes of illustration. In one example, all the CBs following the preemption are retailored to fit in the remaining resources. For example, in some cases, all the CBs following the preemption have some impact on their puncturing, code rate, or modulation. In another example, if an eMBB transmission uses aggregated slots and is preempted, only the resources within an impacted slot will be retailored to fit into the slot. The transmissions in other slots within that aggregation occur as per the original schedule.

In an example, the resources may be retailored according to a rule that is specified, and the eMBB UE might not require explicit indication regarding retailoring procedures or resources. For example, the URLLC REs lost due to preemption may be divided as uniformly as possible between the $C_{eMBB}$ CBs following preemption, and the $C_{eMBB}$ CBs may be rate matched accordingly. Here, $C_{eMBB}$ CBs refer to the CBs assigned to the eMBB user or device.

Figure 20:
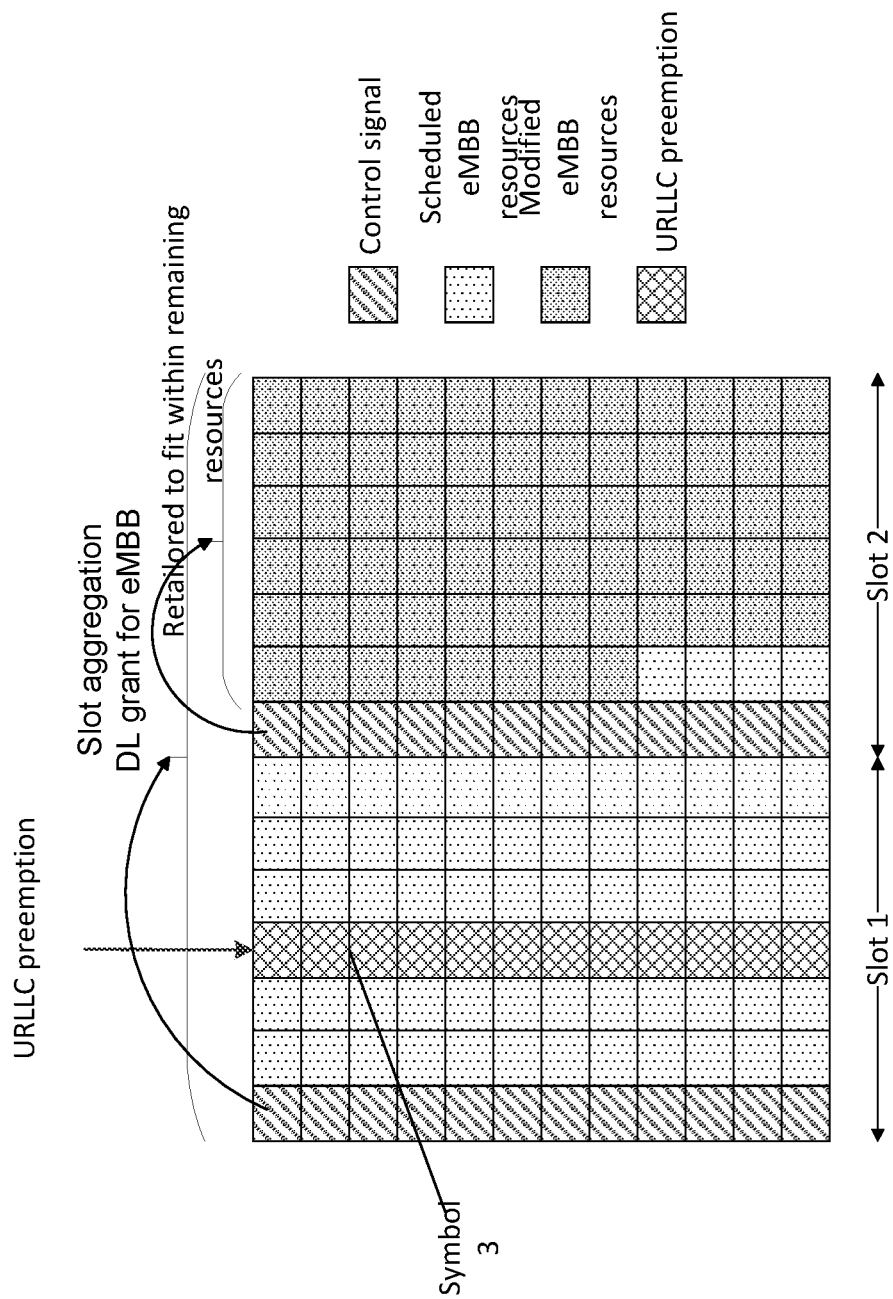
FIG. 20 depicts an example modified rate in the second slot of an eMBB transmission.

Referring now to FIG. 20, an example slot-aggregation scenario is shown. As shown, an eMBB UE may be assigned PDSCH resources in multiple slots, for instance slot 1 and slot 2. A preemptive URLLC transmission occurs in symbol 3 of the slot 1. The eNB keeps mapping the eMBB resources in REs that are not preempted according to the DL grant's modulation, coding rate, puncturing, interleaving, and rate matching scheme within the slot 1. In slot 2, the CBs whose resources are completely within the slot 2 are additionally rate matched to fit into the remaining resources. Some CBs that have some resources in slot 1 and slot 2 are left according to the original DL grant. The indication of the preemption may be received in the DCI of the slot 2. In this example, the DCI in slot 2 modifies the rate matching of the CBs fully in slot 2 to fit the remaining resources.

Turning now to additional transmissions for eMBB, in some cases, for example if the percentage of punctured resources is small, the eMBB UE may still successfully detect the CB/TB. But in some cases, the eMBB UE may require the whole or part of the erased transmission for successfully decoding the TB. In an example embodiment, the preemption information is provided to the eMBB UE through additional transmission. FIG. 21A-D illustrate various examples, presented without limitation.

In one example, the additional transmission occurs in one or more symbols/mini-slots or slots after completion of the scheduled transmission, prior to transmission or reception of the A/N that corresponds to the scheduled transmission. In some examples, a retransmission may include an additional transmission. In some cases, an original transmission is preempted, and thus never actually sent, and an additional transmission includes the data that was intended to be sent during the original transmission. A retransmission may include data that is re-sent in a TB or CBG in response to a Nack.

FIG. 21A shows an example where the preempted eMBB resources are retransmitted as an additional transmission in a mini-slot after the original transmission. In another example, the additional transmission occurs in one or more symbols/mini-slots or slots after reception of the Nack. FIG. 21B shows an example additional transmission after receiving the Nack from the eMBB UE. In another example, the additional transmission occurs in one or more symbols/mini-slots or slots in a different frequency resource, but overlapping in time with the original transmission. FIG. 21C shows the additional transmission in other frequency resources in symbols 4, 5 and 6. In yet another example, the additional transmission occurs as part of resources of another scheduled TB for that eMBB UE. FIG. 21D illustrates this example solution in which the specific resources within the subsequent TB may be reserved for the additional transmission of the preemptively punctured eMBB TB.

In some cases, the presence and resources for the additional transmission may be linked to the eMBB TB size and/or modulation/coding. For instance, additional transmissions of the type shown in FIG. 21A may be supported in the event of puncturing for, for instance only for, higher order modulations of eMBB transmissions.

The scheme used for the TB sizes and modulation/coding may be specified or set up by system information (SI) and/or RRC signaling. Alternatively, the DCI message that includes the eMBB DL grant or preemption indication message may specify the nature of the additional transmission if a preemption occurs.

In an example, the parameters for the additional transmission are indicated through the preemption indication message on PPIC or PDCCH. Alternatively, the HARQ process that makes the grant for the additional transmission may indicate that impacted eMBB resources of the original transmission and information on the additional transmission such as involved CBs/RBs/symbols/mini-slots/slots, their resources in the additional retransmission.

Parameters, such as resource location (such as RBs) and RS configuration, may be implicitly tied to the original DL grant to reduce control signaling overhead.

In an example, the additional transmission may be sent with the original RV or a different RV. A default or the same RV may be used for the additional transmission, and might not require an explicit indication. Alternatively, the RV for the additional transmission may be conveyed through the preemption indication message.

When the additional transmission is scheduled, the eNB may handle the A/N resources of the original grant to the eMBB UE various ways, such as those illustrated in FIGS. 22A and 22B.

In an example, if the additional transmission occurs prior to transmission of the A/N, the eNB may reassign the original A/N resources assigned to the first transmission for the additional retransmission. This example is illustrated in FIG. 22A, where the A/N resources originally assigned are used for the A/N response after receiving the additional information.

Referring to FIG. 22B, in accordance with the illustrated example, if the additional transmission occurs prior to transmission of the A/N, the eNB may repeal the A/N resources for the original transmission and reassign new A/N resources for that HARQ process based on the latency of the additional transmission. The A/N resources may be reconfigured through the preemption indication message. As shown, the A/N resources of the original transmission may be rescinded, and new A/N resources may be assigned for the additional transmission.

In some cases, if the additional transmission is delayed such that the UE cannot process it before sending the A/N of the original transmission, the eNB may ignore the A/N bits corresponding to the preempted resources.

Figures 23A, 23B, 23C:
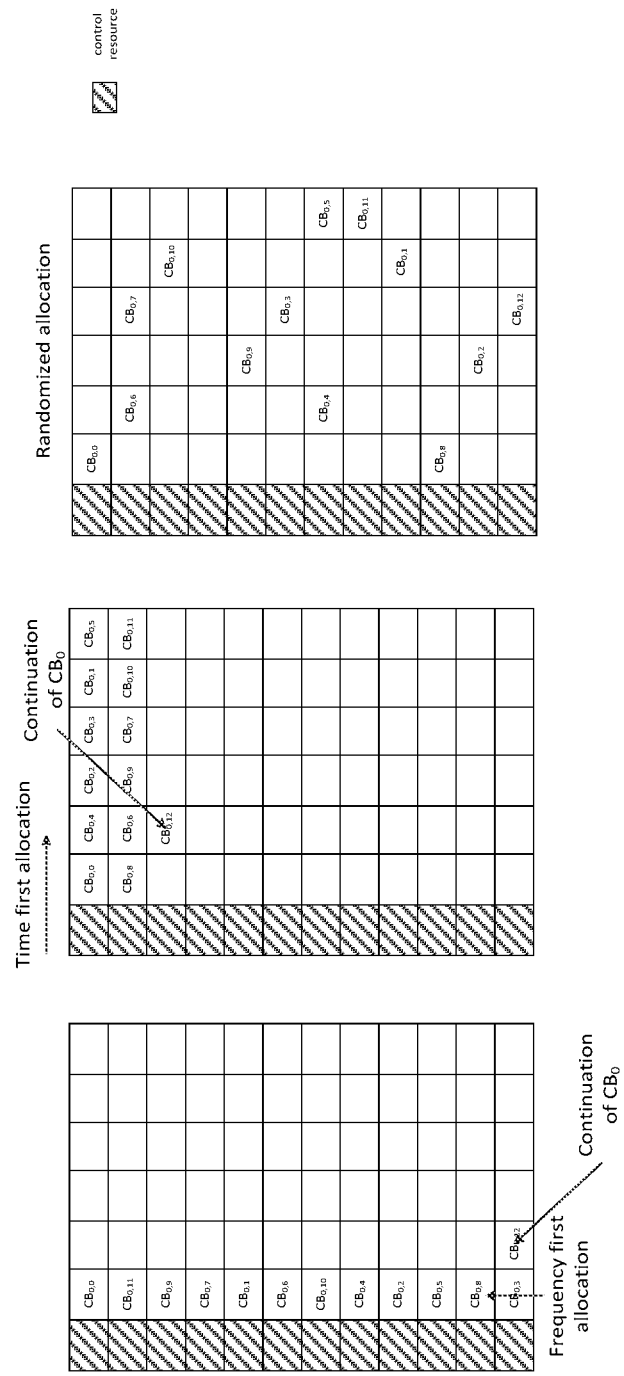
FIG. 23A shows an example CB mapping to a time-frequency grid, wherein the mapping is a frequency-first mapping.
FIG. 23B shows an example CB mapping to a time-frequency grid, wherein the mapping is a time-first mapping.
FIG. 23C shows an example CB mapping to a time-frequency grid, wherein the mapping is a randomized mapping.

Turning now to CB mapping for eMBB, the TB or CBs for eMBB may be mapped to the time-frequency resources grid in various ways. FIGS. 23A-C illustrates examples of various solutions, presented by way of example and without limitation.

Referring to FIG. 23A, a frequency-first example is shown, which minimizes latency at the receiver, but might make the CBs less robust to erasure. As shown, the symbol k of $CB_{0,k}$ is in the time-frequency grid, and the symbols are mapped to different subcarriers in a symbol. When no more resources are left in the symbol, the mapping may continue in the next symbol.

Referring to FIG. 23B, a time first over N symbols example is shown, which may improve robustness to erasure, as the erased resources are mapped over multiple CBs. The latency at the receiver may be increased N times and some frequency diversity might be lost. As shown, the symbol k of $CB_{0,k}$ is in the time-frequency grid, and the modulated symbols are mapped to different OFDM symbols. When no more time-resources are left, the mapping may continue for the next subcarrier.

Referring to FIG. 23C, a Pseudo-random over N symbols and F frequencies example is shown, which may improve robustness to erasure, as the erased resources are mapped over multiple CBs. The latency at receiver may be increased N times. Here, N may refer to any integer of symbols over which the CB's resources are allocated. As shown, the symbols $CB_{0,k}$ are randomized through the time-frequency grid. The randomization may be done according to a specified pseudo-random pattern, such that the randomization is a function of one or more of beam ID, cell ID, UE-ID, and symbol/mini-slot/slot number within a frame. For a case where the resource allocation is small in time, randomization of the resources may be preferred over the other approaches, as latency requirements for eMBB may be sufficiently satisfied.

In the preemption region, if the likelihood of preemptive URLLC traffic is high, the eMBB transmission may be configured to support randomization of the CBs across all available time resources, in accordance with one example. This may reduce the impact of the preemption on a single CB, and distributes it to other resources.

The type of mapping implemented may depend on the modulation, coding, payload size, and/or number of A/N bits for the TB (e.g., CBG size). The type of mapping may be defined for different TB or coding/modulation configurations, or may be signaled through RRC or DCI.

Turning now to mapping for URLLC resources, in an example, URLLC transmissions are confined to N symbols to achieve latency targets. N=1 provides the least latency. The upper bound of N may be set by the length of a mini-slot or a set of aggregated mini-slots. The N may refer to an integer number of symbols assigned to URLLC. Thus, N may be greater than or equal to one (1). Frequency-first URLLC mapping may be supported to keep the latency bounded.

A URLLC TB may consist of a number of CBs. The URLLC use case may be configured to directly report one of the following, presented by way of example and without limitation, one A/N per CB to minimize latency, or one A/N per CBG consisting of K CBs within S symbols in time. This CBG and A/N configuration may be defined for URLLC or set through higher layer signaling.

Figures 24A, 24B, 24C:
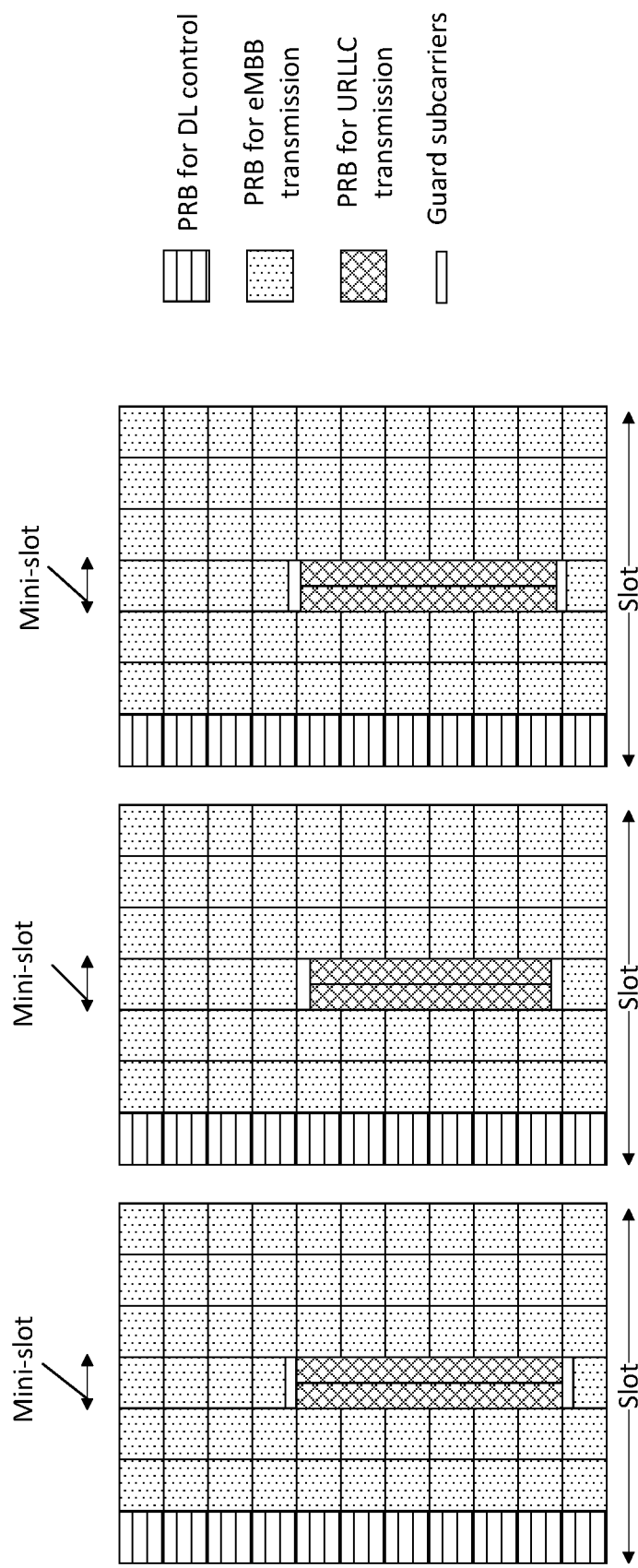
FIG. 24A shows an example guard subcarrier allocation in which the guard subcarriers may be fully contained within a physical resource block (PRB) of the eMBB UE.
FIG. 24B shows an example guard subcarrier allocation in which the guard subcarriers may be fully contained within the PRB of the URLLC UE.
FIG. 24C shows an example guard subcarrier allocation in which the guard subcarriers may be divided between the PRBs of the URLLC region and eMBB region, depending on the numerology.

In some cases, URLLC resources may be assigned in multiples of units such as the PRB contiguously or noncontiguously in frequency. In a mixed numerology case (URLLC uses higher subcarrier spacing than eMBB), for example, guard subcarriers may be provided between the FDM parts of the transmissions of the different numerologies. FIGS. 24A-C shows example ways to allocate the guard subcarriers for an example case where eMBB is at 30 KHz and URLLC is at 60 KHz. FIG. 24A shows that the guard subcarriers may be fully contained within the PRB of the eMBB UE. FIG. 24B shows that the guard subcarriers may be fully contained within the PRB of the URLLC UE. FIG. 24C shows that the guard subcarriers may be divided between the PRBs of the URLLC region and eMBB region depending on the numerology. The configurations for the guard subcarriers may be specified or set up by RRC.

When mixed-numerology is used, localized URLLC resources may be preferred to minimize the spectrum used for guard subcarriers. For the common numerology case, distributed URLLC resources may provide higher diversity gain.

In an example embodiment, when URLLC resources are preemptively assigned, a URLLC transmission may not begin in the control symbol region unless the eMBB resources are semi-persistently scheduled. This is because the eNB has the opportunity to schedule the URLLC without having to puncture eMBB. However, if a URLLC transmission started in the last symbol of a slot, it may continue preemptively in the first symbol of the next slot in resources not containing DCIs.

Figure 25:
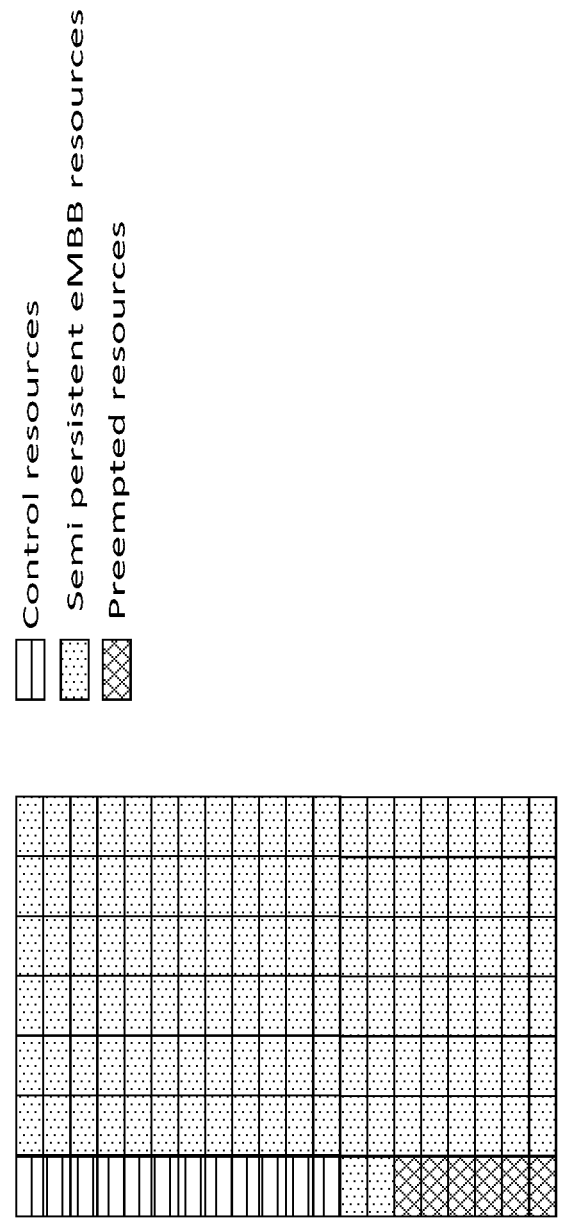
FIG. 25 depicts an example preemptive URLLC transmission in FDM with control signaling.

For the semi-persistent case, in accordance with an example, preemptive URLLC transmissions are supported in the leading symbols of the slot or mini-slot where it may be FDM'ed with DL control. FIG. 25 shows an example where semi-persistent eMBB data allocation in the first symbols of a slot is preempted by a URLLC UE.

Turning now to DL HARQ processes for URLLC, a given URLLC HARQ process may be transmitted multiple times with the same or different RVs to improve reliability at the receiver. The retransmissions may occur before or after the reception of A/N feedback.

In an example embodiment, some or all retransmissions may occur before another HARQ process is transmitted. Successive retransmissions of a HARQ process that have an aggregated A/N may be referred to herein as a burst. In an example, the transmissions in a burst need not occur in consecutive symbols/mini-slots/slots/subframes. However, if they do occur in successive bursts, the scheme may be similar to TTI bundling in LTE.

Figure 26:
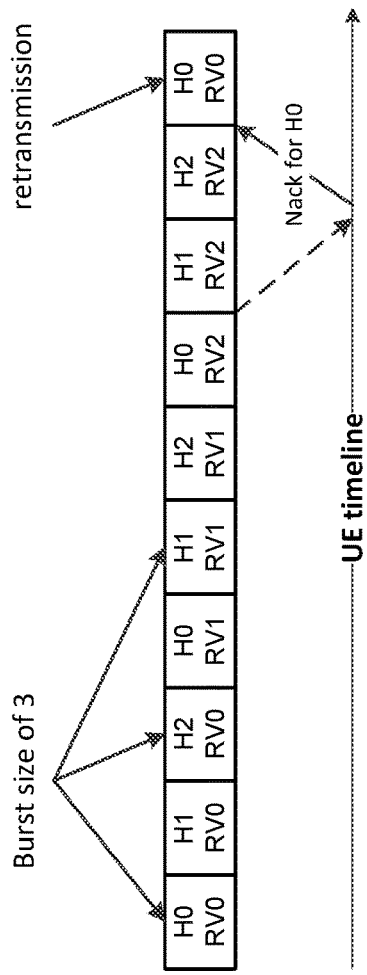
FIG. 26 shows an example hybrid automatic repeat requests (HARQ) HARQ interleaved between different HARQ processes.
Figure 27:
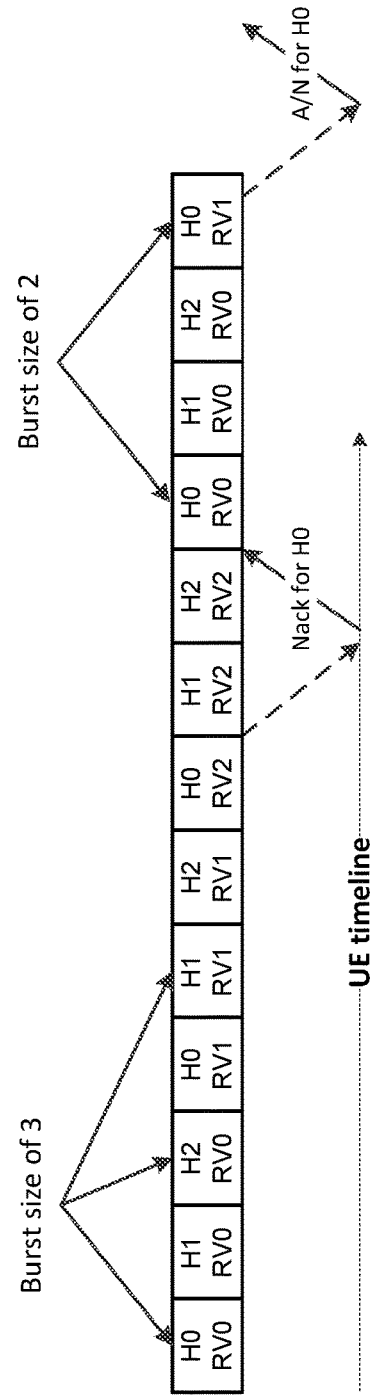
FIG. 27 shows an example in which retransmission bursts are shorter than original bursts.

FIG. 26 shows an example where URLLC HARQ process bursts of size three (3) are transmitted in an interleaved manner. If a Nack is received in response to a URLLC burst, additional retransmissions of bursts may occur in burst sizes equal or smaller to the first transmission. An example is shown in FIG. 27 where the retransmission burst is of length two (2).

The burst size and the resources for the repetitions may be configured by the DCI of the first transmission or semi-statically through RRC. Alternatively, the resources for the retransmissions in a burst may be implicitly determined from those for the first transmission through a rule specified or indicated through higher layer signaling. Alternatively, the retransmissions in a burst may have their own DCI indicating their resources. The retransmissions may occur as preemptive transmissions or scheduled DL URLLC transmissions.

In an example, the eMBB UE may be configured to report multi-bit A/N, for example, especially when it carries preemptive URLLC. The eNB may request A/N bits for specific CBs or groups of CBs, for example those with the most puncturing. An example is when the eMBB UE is configured to transmit one A/N bit for the CBG consisting of all CBs that are not impacted by preemptive transmission and one A/N bit per impacted CB. The configuration of the CBGs may be done semi statically through RRC signaling or through the DCI grant for eMBB or the indicator providing information about the preemption. The impacted CBGs for which multi-bit A/N is requested may be implicitly understood from the punctured resources (corresponding CBs) or may be explicitly specified.

When URLLC UE overrides eMBB resources, in accordance with an example embodiment, the URLLC resources may be assigned such that eMBB UE is able to maintain important functions, such as control channel detection, channel estimation, channel quality measurement, etc. This can be achieved by taking special care of certain DCIs and RS such as, for example, DMRS, CSI-RS, etc., and ensuring that the eMBB control information is not punctured. In an example, the eMBB RS that is preserved may be specified or alternatively indicated through system information.

Described now are examples of how the eMBB RS can be handled in the presence of preemptive URLLC, without severely impacting eMBB performance. FIG. 28A shows an example eMBB slot 2801 without preemption.

In an example, URLLC resources may be assigned in a way such that it does not overlap with eMBB RS and control signals. FIG. 28B shows one example. This may be particularly well suited for the case where both eMBB and URLLC UEs have the same numerology. In some cases, the URLLC UE must know the location of the eMBB RS that must be preserved. An RS that has a known location configured will be known to the UE. In an example, RS for eMBB that are set up through system information are made known to the URLLC UE. RS that are configured dynamically for eMBB UE can be indicated dynamically to the URLLC UE. This information may be provided to the URLLC UE through its DCI carrying the URLLC DL grant, or the group-common NR-PDCCH. Also, even if RS configuration is preconfigured from system information for the eMBB UE, there may be multiple valid configurations for different eMBB use cases. For example, for a high Doppler eMBB UE, the DMRS locations may be predefined and may be denser in time than for a low Doppler UE. The number of ports used for eMBB might not be obvious to the URLLC UE, and may determine the number/location of eMBB RS resources. In these cases, in an example, the URLLC UE knows the use case of the underlying eMBB transmission to derive the RS configuration.

Figure 29:
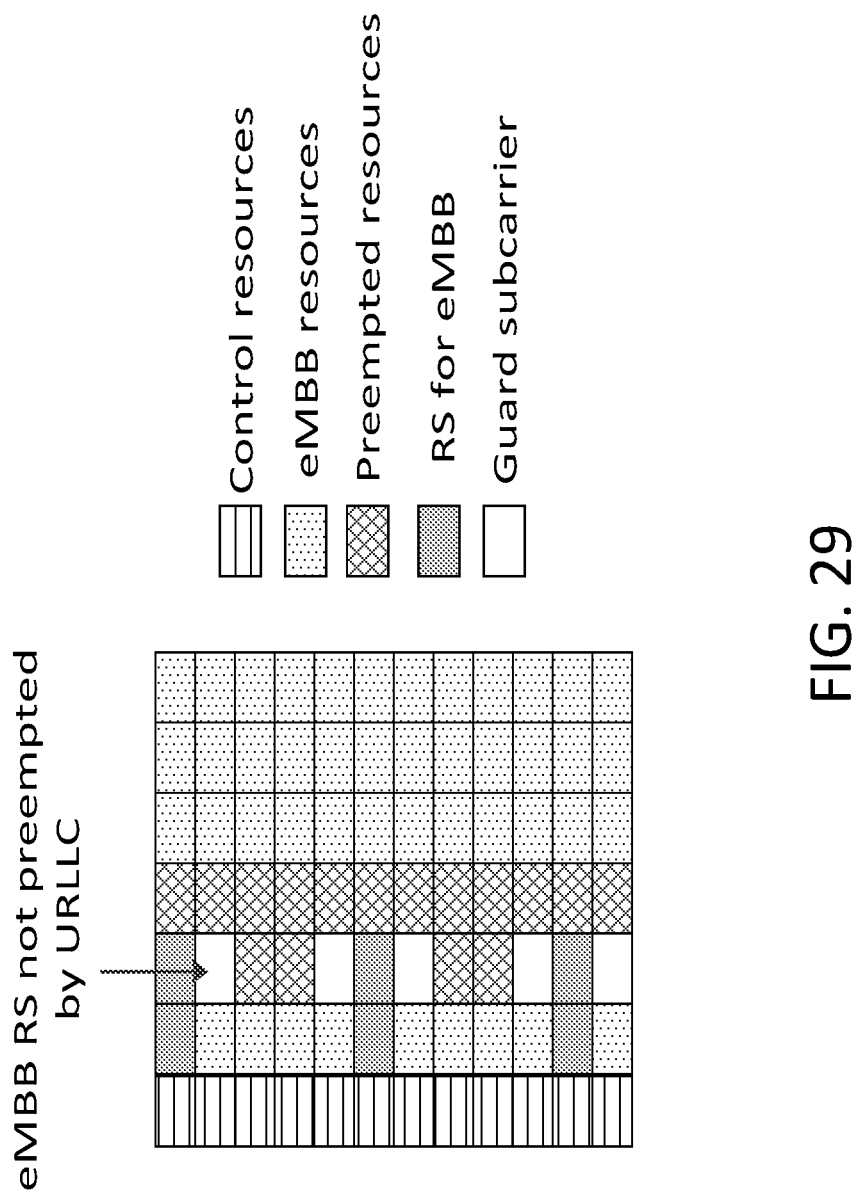
FIG. 29 depicts an example guard subcarrier in an example mixed numerology case.

In another example, to preserve eMBB RS, the URLLC transmission may be required to use a few guard subcarriers as shown in FIG. 29. As shown, for purposes of example, the eMBB transmission is assumed to be at 30 KHZ subcarrier spacing, and URLLC is at 60 KHz. One 30 KHz subcarrier is used as a guard band on either side of the URLLC transmission. The guard bands consume resources, and this can be a significant load on the system if the RS is dense for eMBB.

Other techniques discussed below may be implemented for the mixed-numerology case, presented by way of example and without limitation. Referring to FIGS. 28C and 28D, the RS may be moved to the next available resource in time and/or frequency. Referring to FIG. 28E, the RS may be dropped, and a lower density of RS may be acceptable for eMBB operation, for example, as long as the degradation is within tolerated limits. Referring to FIG. 28F, the punctured RS may be repeated in the next available resource, for instance when the RS is CDM across multiple REs (one or more of which are impacted by the URLLC preemption). Referring to FIG. 28G, if the eNB has knowledge of preemption during transmission of the previous symbol, the reference signals (e.g., those in CDM across multiple REs) may be reassigned to the closest available location among the eMBB resources. Referring to FIG. 28H, the eMBB device may be configured to use REs in frequency domain within a symbol for CDM of RS.

In various examples, different configurations for different use cases. For example, the example implementation illustrated in FIG. 28B may be used when the same numerology applies to eMBB and the preemptive transmission, while another technique may be used for the mixed-numerology case.

Turning now to DL URLLC Reliability, various embodiments that target reliability of the URLLC are now described. As URLLC may operate at much higher reliability than eMBB, it is expected that the eNB may target BLER of $1^{e-3}$-$1^{e-5}$ for a single URLLC transmission. Note that in LTE, CQI reporting is targeted for $1^{e-1}$ BLER. For URLLC, in accordance with an example, the CQI reports provide more information especially at lower BLER. At a given time the eNB may request one or more CQI reports for the same frequency band at different BLER. For example, a URLLC UE's CQI report may feedback the MCS at $1^{e-1}$ and $1^{e-3}$ to improve throughput through better eNB scheduling.

The reporting requirements may be semi-statically configurable through RRC or dynamically configured through DCI. A group common PDCCH targeting URLLC UEs may configure the BLERs at which CQI reports may be fed back.

URLLC DCI may be protected for higher reliability by supporting higher aggregation levels than NR, lower order modulations like QPSK or BPSK, transmit diversity such as CDD, SFBC. The control resources may be distributed or localized in frequency. Furthermore, the control resources for NR-PDCCH may be distributed in time across the symbols in such a way that the control resources in the first symbol are independently decodable. If the decoding fails, then the UE uses the additional control resources in the second symbol (this lowers the effective code rate on the DCI) along with the resources in the first symbol to decode the DCI. This increases latency for UEs with low SINR but provides low latency for UEs with high SINR. But the blocking probability due to large aggregation levels is reduced.

Figure 30:
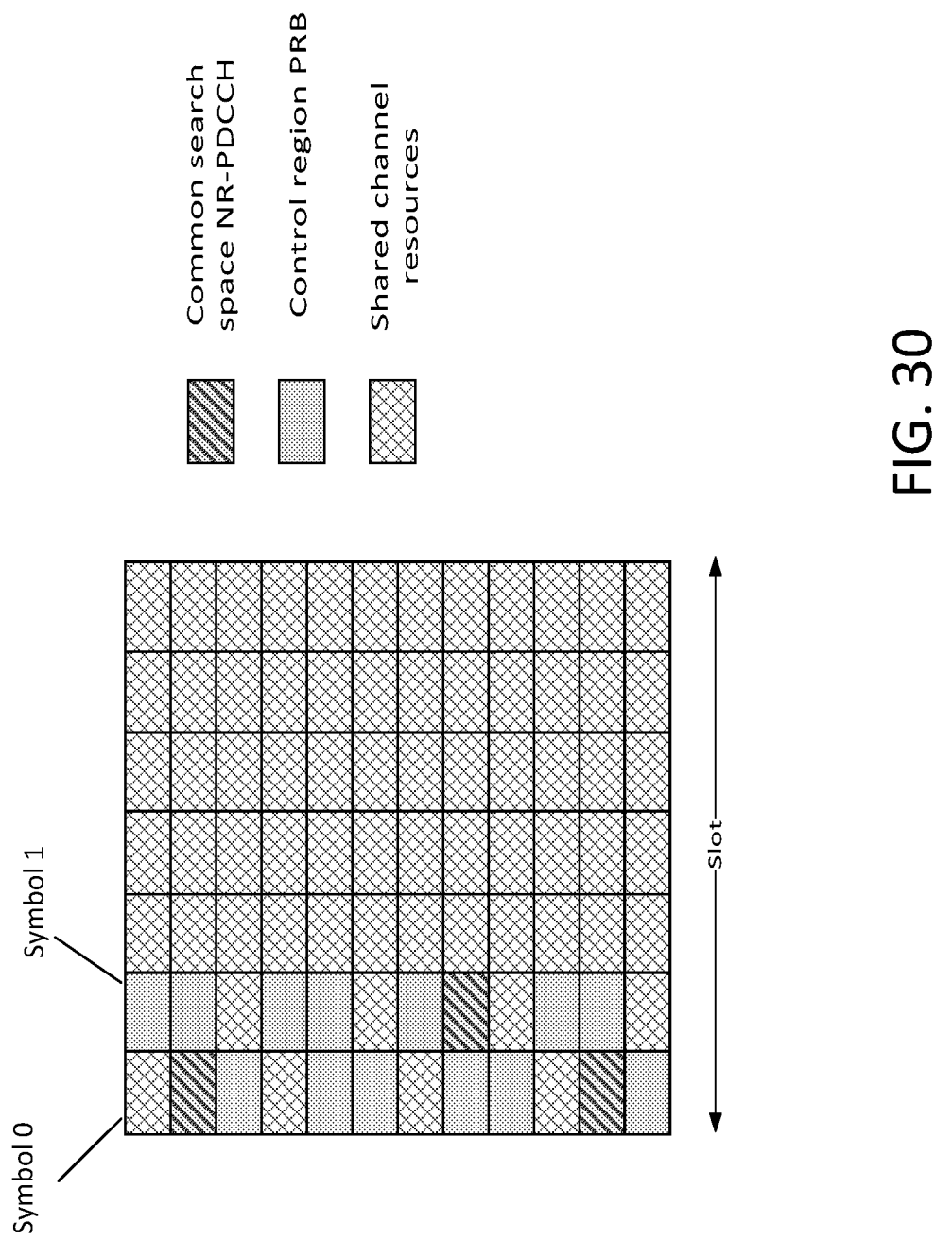
FIG. 30 depicts an example of NR-PDCCH resources in multiple symbols.

FIG. 30 shows an example of a time-frequency grid where the control channel is sent in the first two (2) symbols (symbol 0 and symbol 1) of the slot. In the symbol 0 and symbol 1, the control signals and shared channel resources are in FDM. Resources for one NR-PDCCH from the common search space are shown to be distributed between the first symbol (symbol 0) and the second symbol (symbol 2).

Figure 31:
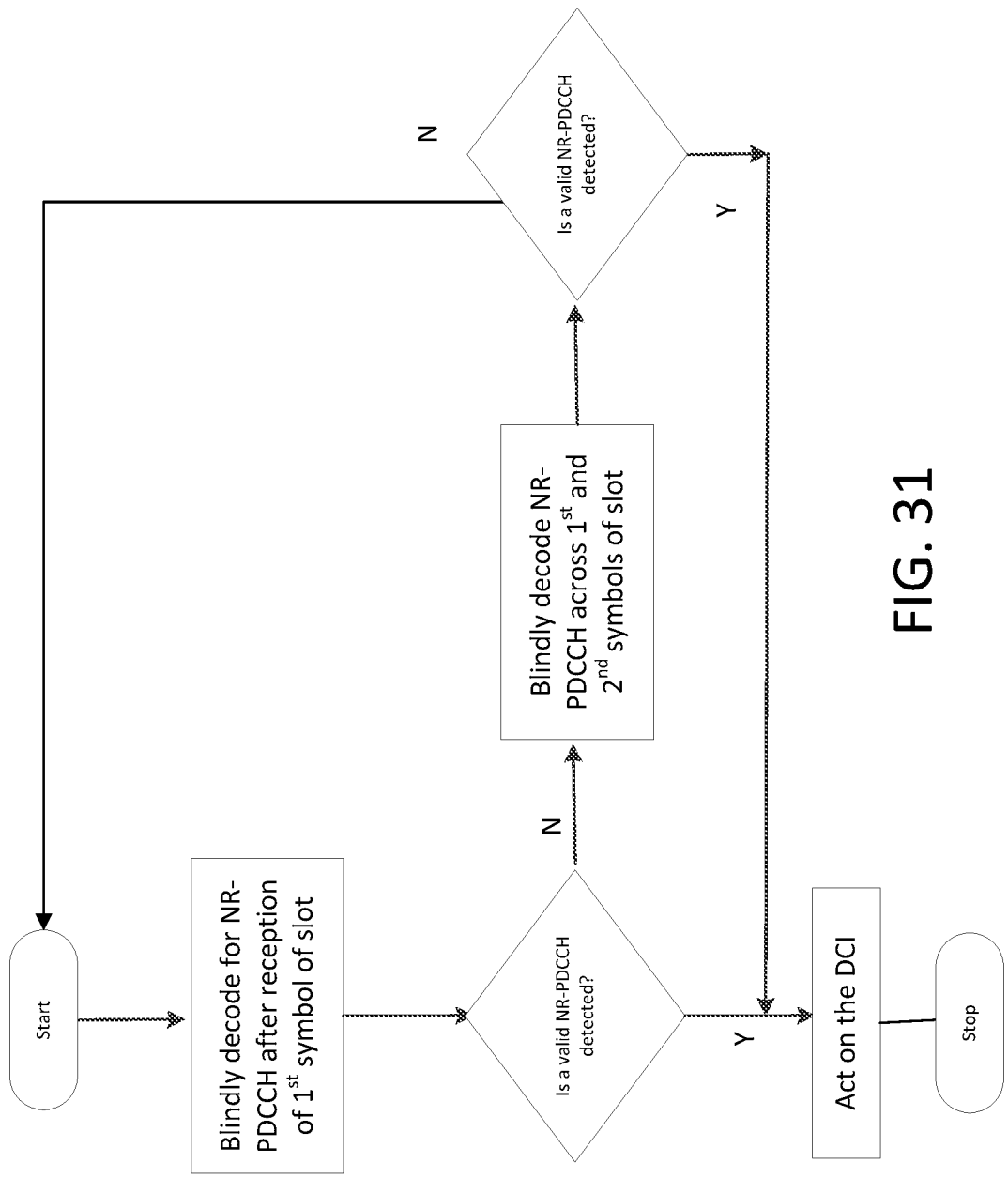
FIG. 31 is call flow for NR-PDCCH decoding for UEs, in accordance with an example embodiment.

A first $UE_1$ and a second $UE_2$ may be configured to receive this NR-PDCCH. The $UE_1$ may have sufficient SINR to complete the decoding in the first symbol. However, the $UE_2$ may fail at decoding the NR-PDCCH in the first symbol. The second $UE_2$ may use the resources of the NR-PDCCH from the second symbol (symbol 1) in addition to those in the first symbol (symbol o) to successfully decode it, as depicted in FIG. 31.

Turning now to example group common PDCCH configuration methods, the group common PDCCH resource allocation, such as time-frequency resource of search space, DMRS configuration, or transmission scheme and periodicity, can be configured via RRC signaling, the PBCH, and/or system information. Different groups of common PDCCH may be assigned or allocated to different time-frequency resources to reduce the bind decoding efforts.

In some cases, if the configuration of group common PDCCH is via RRC signaling, then single or multiples of group common PDCCHs configuration parameters can be signaled via RRC message, which is carried by NR-PDSCH.

Further, the configuration of monitored group common PDCCH can be signaled via an updated RRC_connection_reconfiguration message. The RRC_connection_reconfiguration message can be transmitted via NR-PDSCH. Table 2 shows example content of a group common PDCCH configuration via RRC message.

TABLE 2

Example RRC message for group common PDCCH
groupCommonPDCCHConfiguration searchSpace: symbol locations,
allocated time and frequenc resources:
start RB location, allocated resource block size,
group RNTI
numerology: subcarrierSpacing
DMRSConfiguration: nPORTs, symbol
locations: $n_s$, $n_{G\_DMRS\_ID}$: DMRS group ID,
allocated time and frequenc resources (Option)
transmissionScheme: modulation order, SFBC,
precoding, etc . . .
transmissionPeriod: 5 ms, 10 ms, etc. (Option)

In some cases, if the configuration of group common PDCCH is via the PBCH, then the DCI for group common PDCCH configuration can reuse similar resource allocation methods in LTE UL, such as resource allocation methods type 0, 1 and 2, for example. In LTE, resource allocation type 0, the whole system bandwidth (RBs) are arranged into an RBG. The number of RBs within the RBG depends on system bandwidth. In an example embodiment, this resource allocation can be extended to NR. For example, in 80 MHz deployment, a 400 RBs may be kept into 100 RBG. It is may be assumed that 4 RBs=1RBG. Hence, a 100 bitmap may be used to represent the system resources. In the 100 bitmap string, a 1 at the particular location may represent that RBG is allocated, and 0 does not. This is under physical resource allocation where UE can directly map to physical resources. In type 1 resource allocations, the RBGs may be grouped into a number of RBG subsets, and certain PRBs inside a selected RBG subset are allocated to the UE. There are a total of P RBG subsets, where P is the RBG size. An RBG subset p, where 0≤p<P, consists of every P-th RBG starting from RBG p. Therefore, the resource assignment information may consist of three fields: the first field indicates the selected RBG subset, the second field indicates whether an offset is applied, and the third field contains the bitmap indicating PRBs inside the selected RBG subset. If the configuration of group common PDCCH is carried in the system information (SI) and the configuration can be transmitted via NR-PDSCH, the configuration can use DCI format.

In some cases, different group common PDCCH may be assigned to same or different search space, and it may be dependent on the configuration. The following Table 3 is an example DCI format design for group common PDCCH.

TABLE 3

Example DCI for group common PDCCH configuration

| | |
|---|---|
| Symbol location | 0, 1 or 2 |
| Resource allocation | Type 0, Type 1 or Type 2 |
| Modulation order | QPSK, 16 QAM or 64 QAM |
| Transmission methods | SFBC, beamforming, or |
| DMRS ID | DMRS ID for sequence generation |
| DMRS Ports | 0, 1, 2 . . . M ports |

Turning now to DMRS configuration for group common PDCCH, the DMRS of group common PDCCHs can be configured to share among different group common PDCCHs. For example, the DMRS ports of group common PDCCH can be shared among different groups of common PDCCH under single-beam operation. In LTE, it uses CRS for UE specific PDCCH and common PDCCH demodulation and eNB always transmit the CRS. However, in NR, it is recognized herein that the DMRS for group common PDCCH can be configured according to network loading and it doesn't have to transmit group common PDCCH all the time. In accordance with various embodiments, DMRS configuration of group common PDCCH may include or indicate allocated DMRS resource of group common PDCCH, which can be independently setup with its allocated search space. If there is no extra signaling of DMRS resource, in an example, then UE can assume DMRS uses the same allocated resource for group common PDCCH. The DMRS configuration of group common PDCCH may also include or indicate a G_DMRS_ID (group DMRS ID) for DMRS sequence setup, and this DMRS group ID can be associated with the beam ID, i.e., $n_{G\_DMRS\_ID}=f(BID)$, where BID is the beam identification and f(•) is an operation function. The DMRS configuration may also include $N_{ID}^{TRP}$, the TRP ID; and $n_s$ DMRS slot numbers.

Figure 32A:
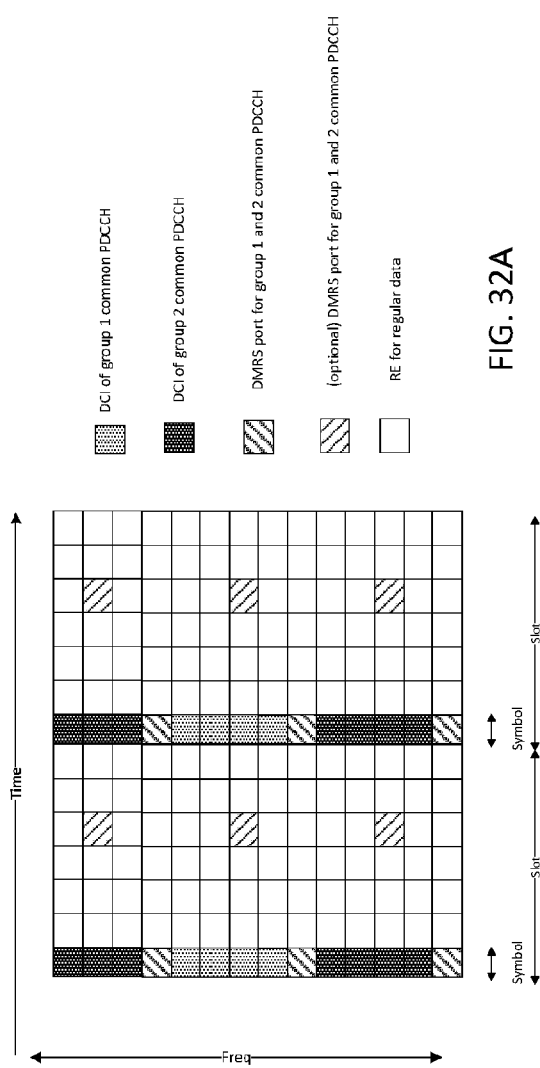
FIG. 32A shows an example DMRS setup among different group common PDCCHs, wherein an example Group 1 and Group 2 are allocated at the same OFDM symbol and share the same DMRS ports.
Figure 32B:
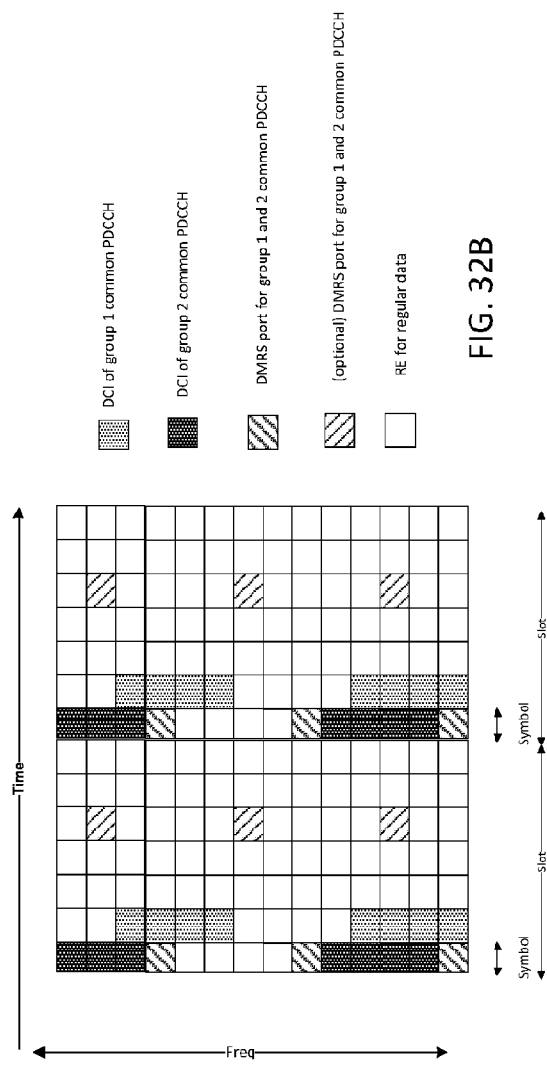
FIG. 32B shows an example DMRS setup among different group common PDCCHs, wherein an example Group 1 and Group 2 are allocated different OFDM symbols and share the same DMRS ports.
Figure 32C:
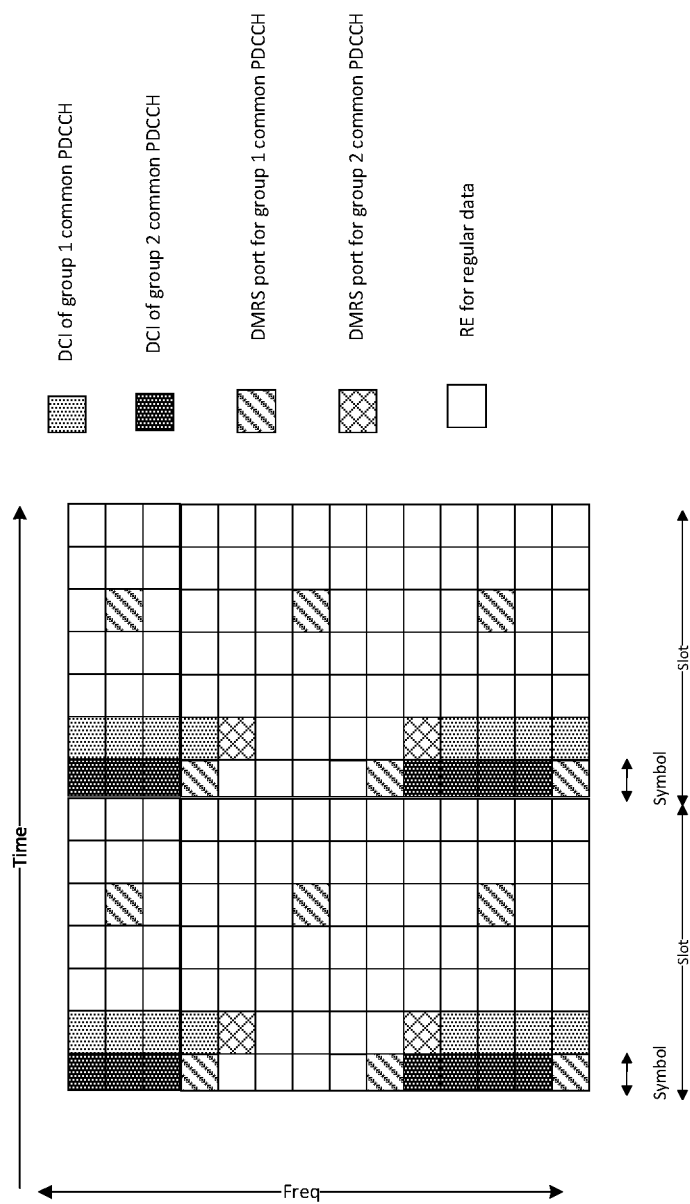
FIG. 32C shows an example DMRS setup among different group common PDCCHs, wherein an example Group 1 and Group 2 have their own DMRS ports.

Referring now to FIG. 32A and FIG. 32B, two (2) group common PDCCHs sharing the same DMRS port are shown to save DMRS resources. In FIG. 32C, two (2) group common PDCCHs are shown that have their own DMRS setup (ports) and resource allocation. An example below is shown for the purpose of illustration, but it will be understood that embodiments are not limited as such. Suppose a NR group common PDCCH uses k ports for transmission. For any of the antenna ports, p∈{n, n+1, . . . , n+k} the reference-signal sequence r(m) is defined by $$r(m) = \frac{1}{\sqrt{2}}(1-2c(2m)) + j\frac{1}{\sqrt{2}}(1-2c(2m+1)),$$

where the pseudo-random sequence c(i), i=1, . . . , Q is the base sequence and Q is the sequence length to build for the DMRS sequence. The DMRS sequence to port allocation can be described by the following method: $a_{k,l}^{(p)}=r(g(m))$, where $a_{k,l}^{(p)}$ is DMRS at the k-th subcarrier and l-th OFDM and g(•) is a mapping function of DMRS sequence index m. The pseudo-random sequence generator may be initialized with $c_{init}=(f(n_s), N_{ID}^{TRP}, n_{G\_DMRS\_ID})$, where $n_s$ is slot number, $N_{ID}^{TRP}$ is the TRP ID and $n_{G\_DMRS\_ID}$ is the group DMRS ID. The sequence r(m) can choose CAZAC sequence, M sequence, or other sequences instead. The DMRS sequence applied to port p can be illustrated as shown in FIG. 32A.

Figure 33:
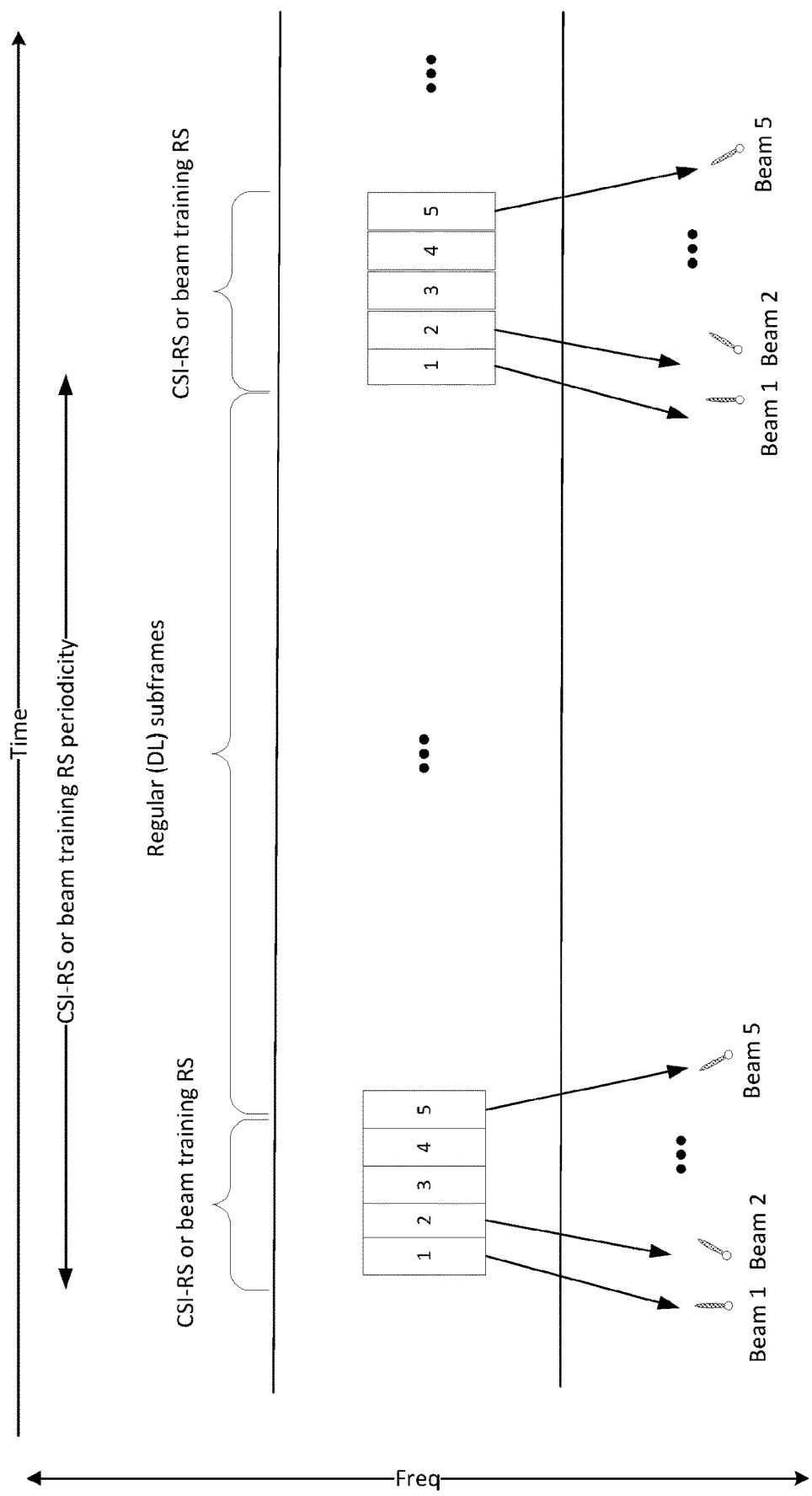
FIG. 33 depicts an example of CSI-RS configured for beam pairing of a group common PDCCH.
Figure 34:
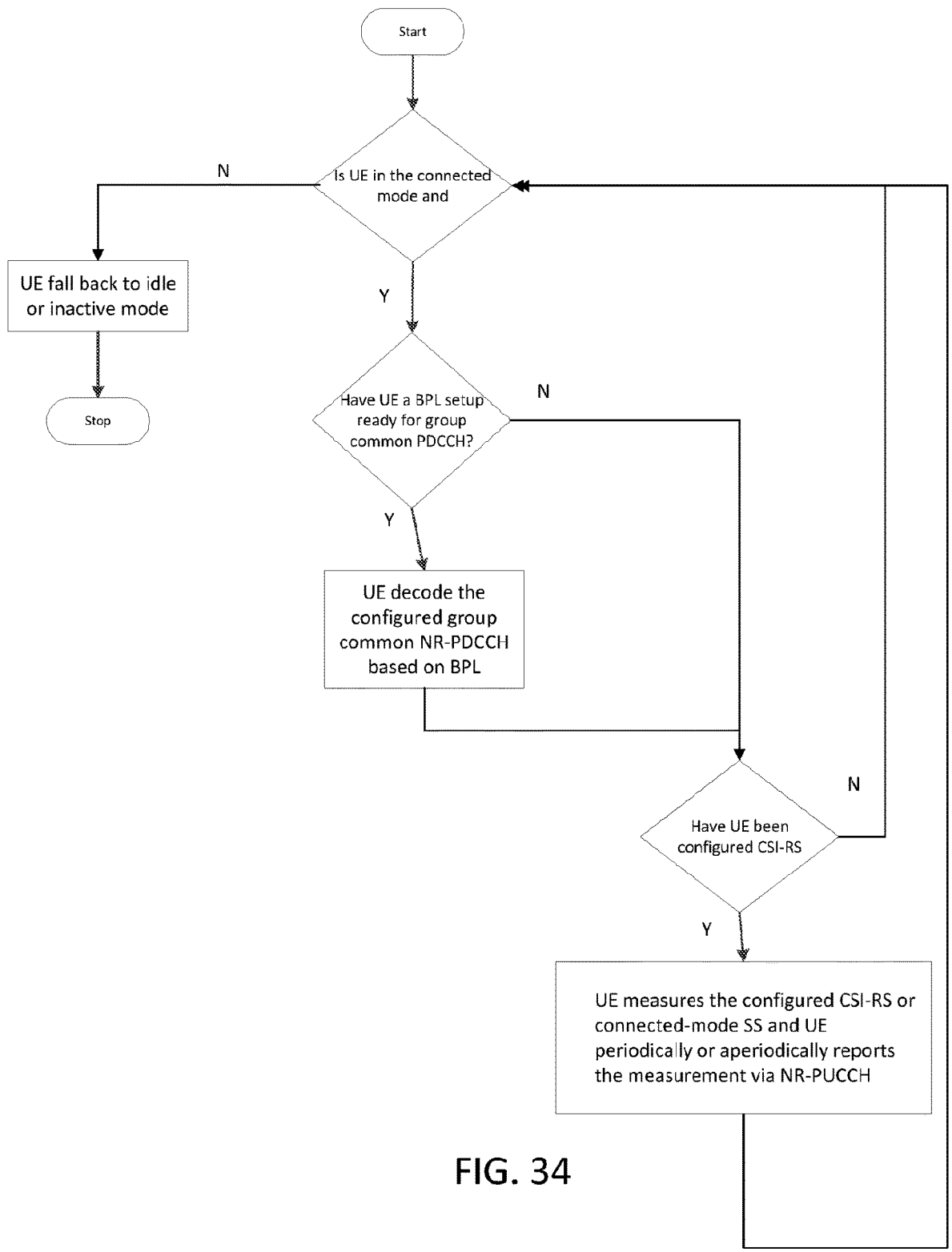
FIG. 34 is an example call flow for a UE to monitor a group common PDCCH under multi-beam operation, in accordance with an example embodiment.

Turning now to Beam pairing and beam monitoring mechanisms for group common PDCCH, an eNB may configure a beam sweeping burst set for group common PDCCH because group common PDCCH may use different beam setup between initial access SS burst or UE-specific PDCCH/PDSCH beams. In some cases, once a given UE finishes establishing the RRC connection, the UE can be configured with a set of CSI-RS (or beam training reference, e.g. BRS) for group common PDCCH beam paring in the connected-mode. FIG. 33 illustrates an example. In an example, the eNB can configure either (group) CSI-RS in connected mode for UE to perform beams monitoring because, for example, group beams may be different with UE-specific beams for UE-specific PDCCH and PDSCH. In the connected-mode, UE may report measurements (e.g., CQI, RSRP, etc.) periodically or aperiodically via NR-PUCCH or NR-PUSCH. Those configured CSI-RSs that UE performs measurement of group common PDCCH can be used as potential BPLs if the current group common PDCCH BPL has broken. When the current BPL degrades, the eNB can assign a new group common PDCCH for the UE if a new BPL can be established. In an alternative example, if the UE initiates the beam training for group common PDCCH, the beam training reference signals may be performed via using SRS when there is a channel reciprocity. Or, the eNB may notice the degradation from beam quality report and re-select the BPL. The eNB may re-assign UE to monitor different group common PDCCHs. The reassignment procedure can be performed in various ways. For example, the UE may monitor the group of common PDCCH based on a selected beam pair link (BPL) for multi-beam operation (e.g. for frequency band >6 GHz). In another example, if the CSI-RS or beam training RS (BRS) has been setup as periodical transmission, then the transmission periodicity can cooperate with the UE connected mode DRX cycle. An example UE procedure to monitor CSI-RS group common PDCCH is depicted in FIG. 34.

Figure 35:
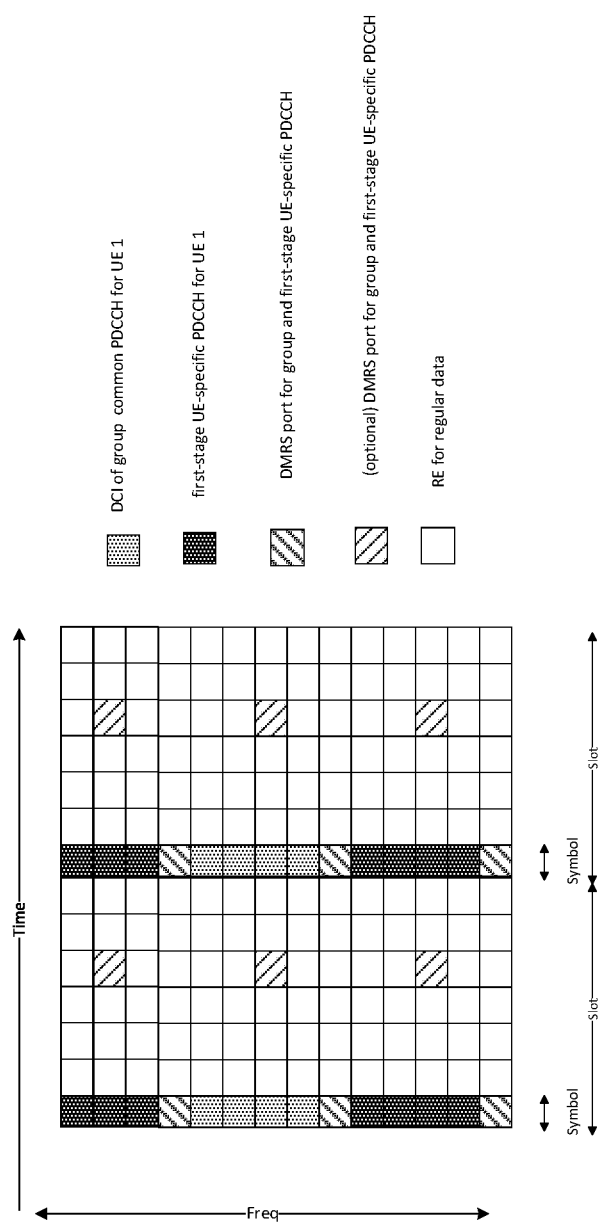
FIG. 35 depicts an example DMRS that is shared among group common PDCCH and first stage UE-specific PDCCH.

Turning now to group common PDCCH and two-stage UE-specific DCI, the DMRS of group common PDCCH can be shared with the first-stage UE specific PDCCH to reduce the DMRS overhead. The first-stage of UE-specific PDCCH beam setup can be dependent with group common PDCCH beam setup and 2nd-stage DCI beam setup can be dependent or independent with group common PDCCH. Hence, the DMRS of first-stage DCI can be shared with group common PDCCH. If there is no sharing between group common and the first-stage of UE-specific PDCCH, for example, then UE might need to monitor a different set of CSI-RS for UE-specific PDCCH. In practice, in some cases, the similar channel quality of those UEs may be assigned to a same group. UEs assigned to the same group may have similar channel property (e.g., QCL). One example is illustrated in FIG. 35. Therefore, in an example embodiment, the DCI aggregation level of first-stage UE-specific and group common PDCCH can be set the same to reduce the blind search and decoding effort. In some cases, the control resource set and search space design may be similar to those for first-stage of UE-specific search space. In an example, the UEs selecting the same beam in initial access may form a group or multiple groups.

According to a further aspect, depending on its payload, the group common PDCCH may carry a wide range of DCI bits. For example, if it conveys a relatively simple slot structure, it may be composed of only a few 10s of bits even after accounting for coding and rate matching. On the other hand, if the group common PDCCH carries information on preemption indication or paging information, it can have large payloads possibly over 100 bits.

To cater to various use cases, in accordance with various examples, the group common PDCCH may support a wide range of payload. The smaller payloads might not have a cyclic redundancy check (CRC) or may have a shorter length CRC, for example the CRC may be only 4 to 8 bits long. The larger payload cases may use CRC of length 16 bits.

As used herein, unless otherwise specified, the radio network temporary identifier (RNTI) for group common PDCCH may be referred to as GC-RNTI. In some examples, the GC-RNTI is embedded in the group common PDCCH so that UEs in the appropriate group can access it, while other UEs can ignore it. In LTE the RNTIs are 16 bits long and mask the CRC. For group common PDCCH with no CRC or smaller CRC, various examples are described herein for the GC-RNTI. The FEC (forward error correction) encoding for group common PDCCH may be polar coding or Reed-Muller (RM) coding, for example, depending on the payload size. If the payload is small, RM may be preferred.

Figure 36:
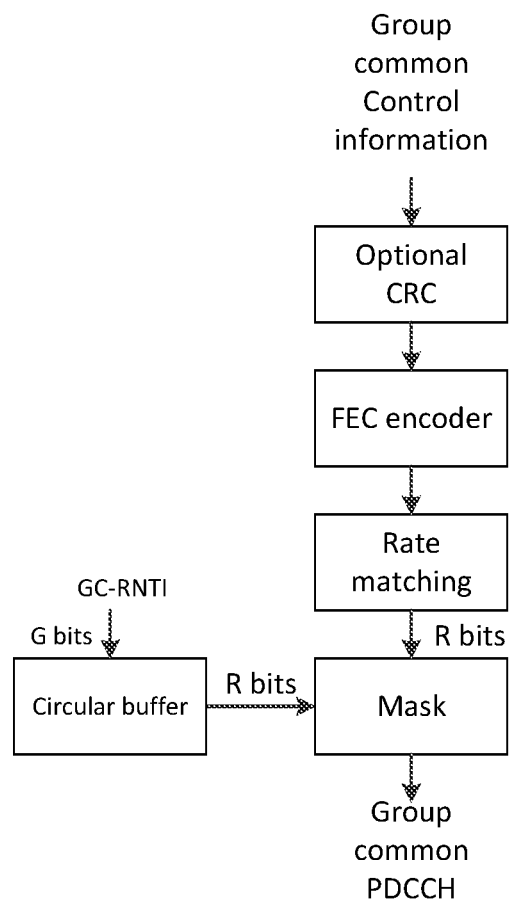
FIG. 36 illustrates a GC-RNTI mask applied to a control payload after coding and rate matching.

Referring to FIG. 36, the GC-RNTI may mask the encoded, rate-matched DCI. The CRC may be absent or a short CRC may be attached to the control information. The GC-RNTI of length G may be processed through the circular buffer to match length R of the rate matched bit vector.

Figure 37:
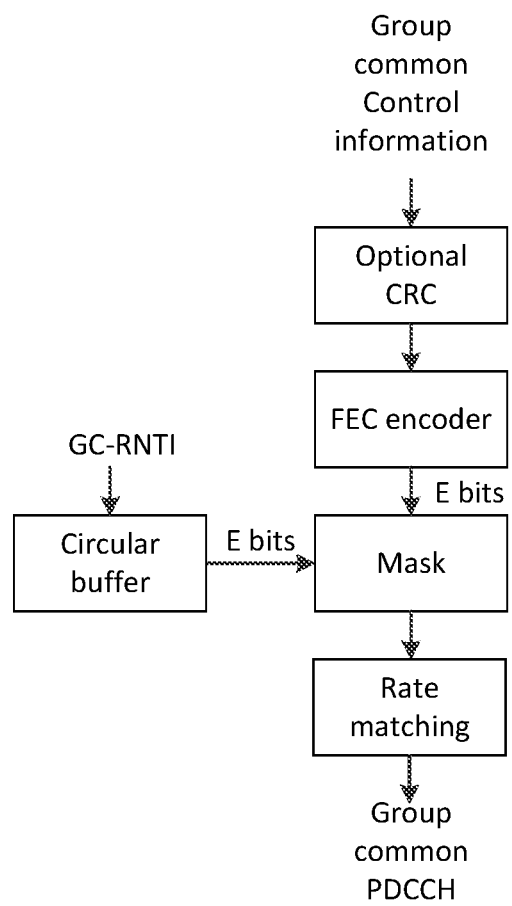
FIG. 37 illustrates a GC-RNTI mask applied to a control payload prior to rate matching.

Referring to FIG. 37, the GC-RNTI may mask the polar-encoded control signal, prior to rate-matching. The CRC may be absent or a short CRC may be attached to the control information. The GC-RNTI of length G may be processed through the circular buffer to match length E of the polar encoded bit vector.

Figures 38A, 38B:
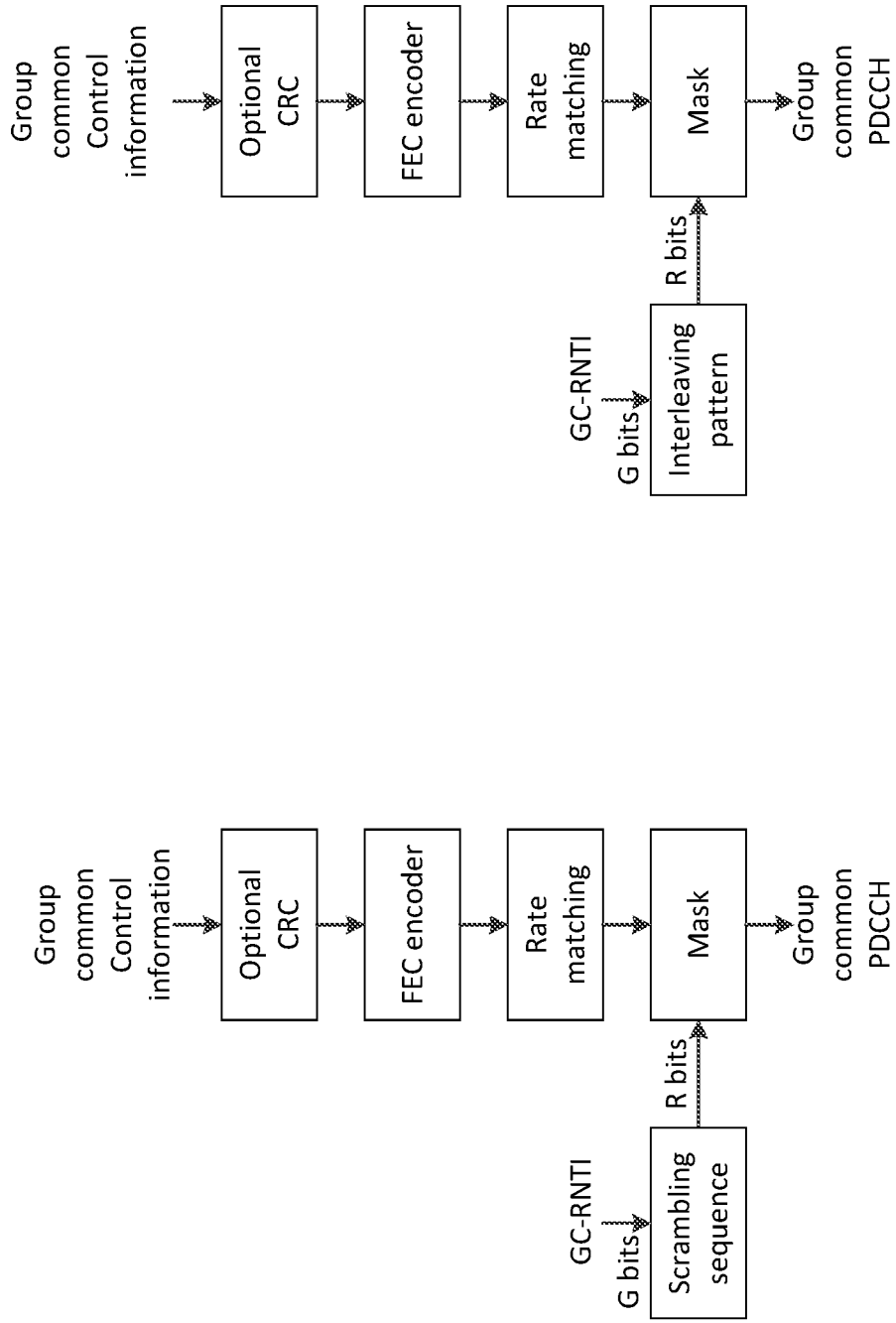
FIGS. 38A and 38B illustrate GC-RNTI maps for a scrambling and interleaving pattern, respectively, that is applied to the control payload.

Referring to FIGS. 38A and 38B, after encoding and rate matching, the control signal may be scrambled or interleaved by a pattern that uniquely maps to the given GC-RNTI. The GC-RNTI may be of variable lengths depending on the use case and may map to specific scrambling sequence of length R as shown in FIG. 38A. For example, the GC-RNTI itself may be the state of an m-sequence generator used to produce R output scrambling bits. Alternatively, as shown in FIG. 38B, the GC-RNTI may uniquely map to a pseudo random bit-interleaver pattern applied to the rate matched control information.

Figure 39:
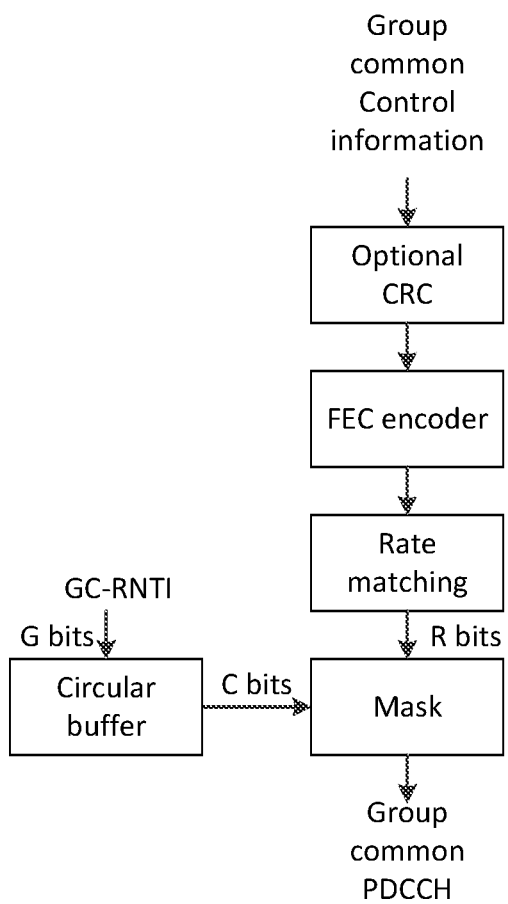
FIG. 39 illustrates GC-RNTI masks in a short cyclic redundancy check (CRC).

Referring to FIG. 39, the GC-RNTI may mask both the control information and short CRC, prior to encoding. The GC-RNTI may be processed through a circular buffer to match the length C of the CRC attached control information. In some cases, no GC-RNTI may be used. For example, if the control information need not be limited to a group of UEs or must be broadcast, no GC-RNTI may be used.

Figure 40:
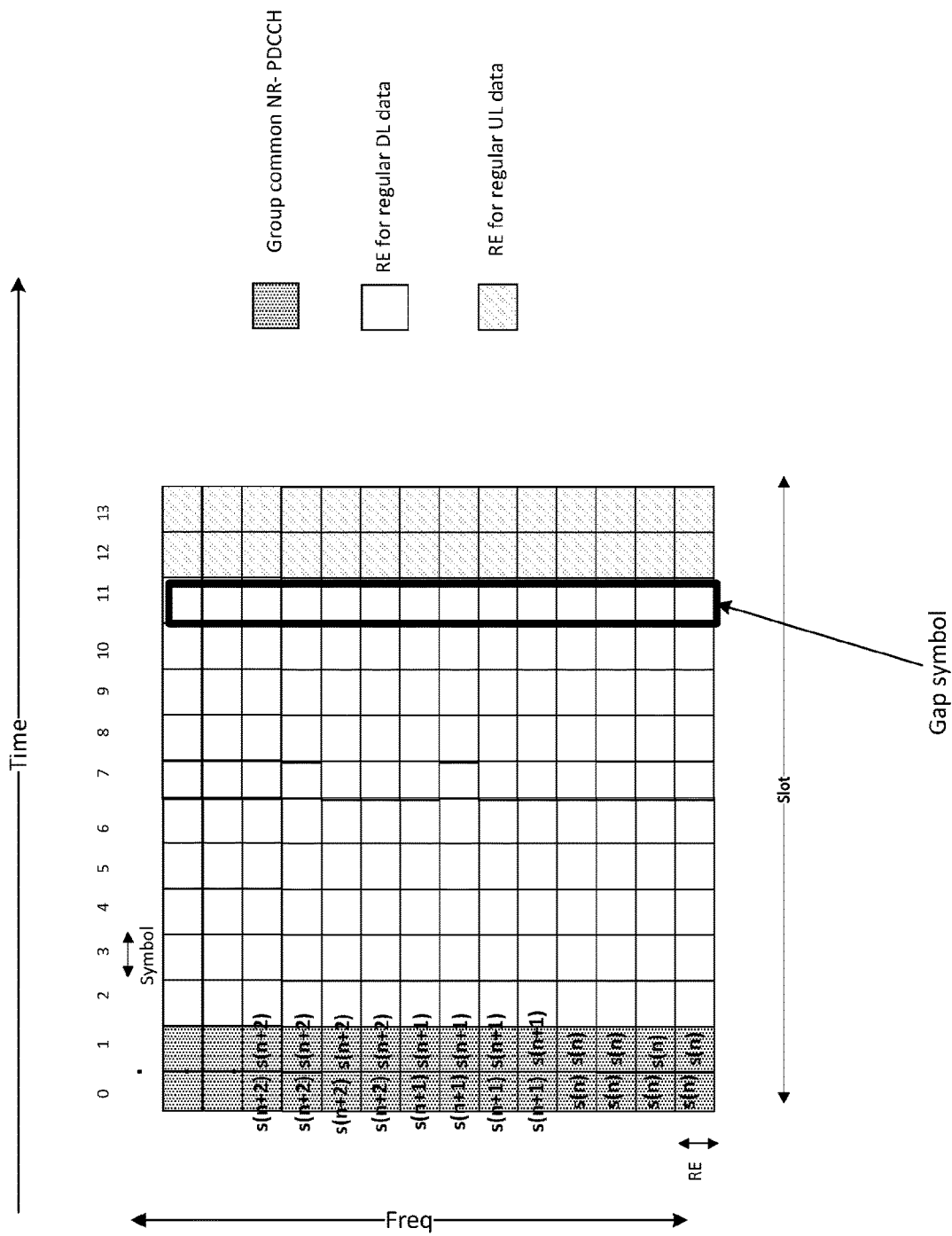
FIG. 40 illustrates the demodulated symbol of the group common NR-PDCCH with a total spreading factor (SF) equal to eight (8), wherein the symbol is spreading into both frequency-domain and time-domain.

Referring to FIG. 40, group common NR-PDCCH can adopt multiplexing methods such as, for example, multicarrier CDMA (MC-CDMA) or multicarrier DS-CDMA, to further enhance the detection performance and increase the robustness for scheduling the resource allocation. For an example, a group common NR-PDCCH with spreading factor (SF)=8 is depicted in FIG. 40. In this example, group NR-PDCCH is spread in frequency-domain with spreading factor=4 and time-domain spread with spreading factor=2. Let s(n), n=1, . . . , N denote the modulated symbols of the group common NR-PDCCH, and N is the total numbers of transmit modulated symbols of a group NR-PDCCH.

Figure 41:
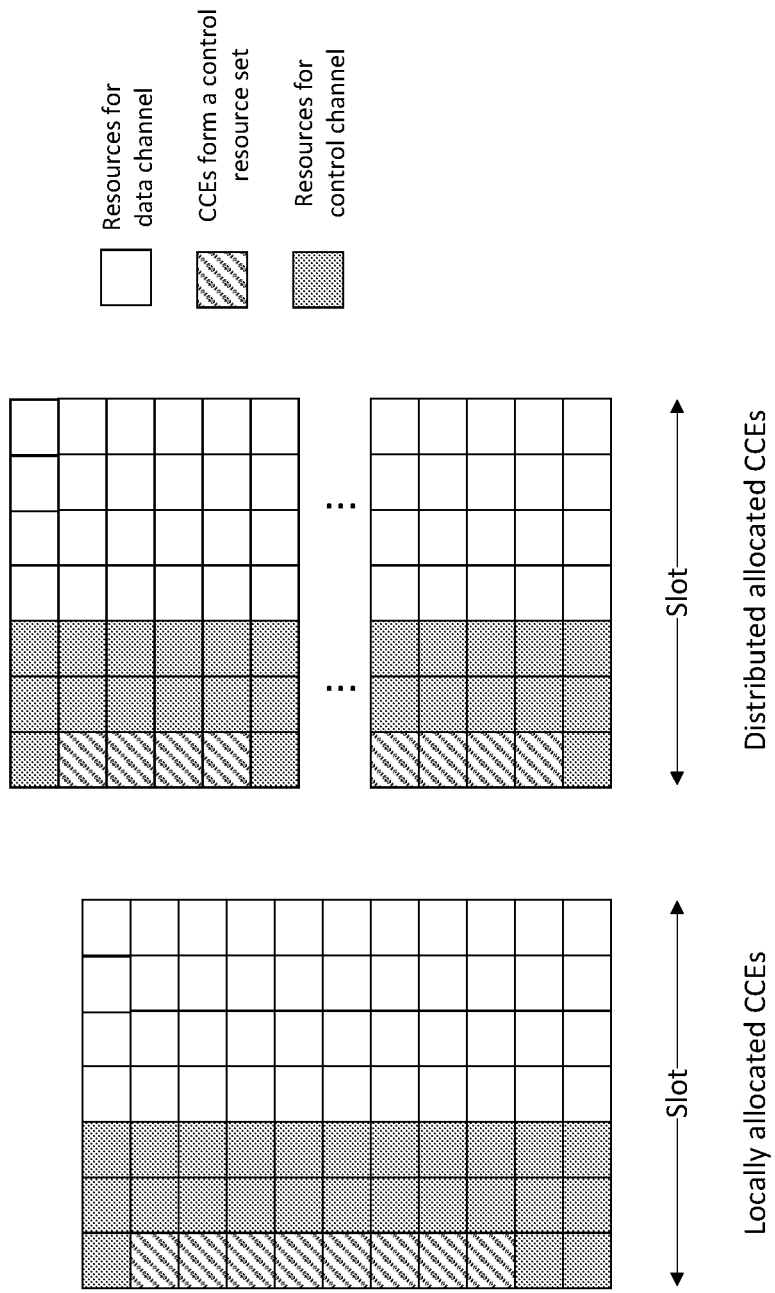
FIG. 41 depicts example control resource sets with allocated CCEs that are local and distributed.
Figure 42:
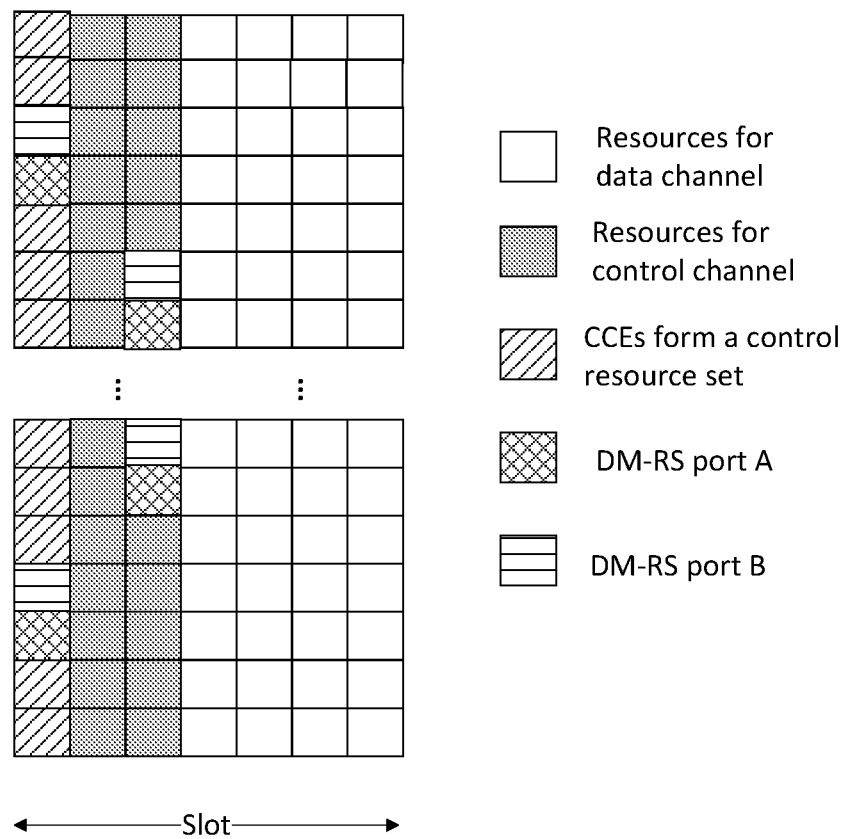
FIG. 42 depicts an example of DM-RS ports being associated with control resource sets.

Turning now to a search space design for NR UE-Specific PDCCH, a control resource set refers to a set of control channel elements (CCEs), which may be locally allocated to a subband or distributed across different subbands as shown in FIG. 41. A search space may be formed be a control resource set associated with RS configurations. The UE may monitor a search space for control information, wherein monitoring may imply attempting to decode each of the PDCCH candidates in the search space. Associated to different RS, a control resource set may form different search spaces. For example, in FIG. 42, the same control resource set can form three different search spaced associated to DM-RS port A, DM-RS port B, or both DM-RS ports A and B. The RS configurations can be signaled via higher layer signaling (RRC signaling or MAC CE), or in group common PDCCH, or the first stage of two-stage DCI.

In an example, the control resource set may be numbered from 0 to $N_{CRS,k}-1$, where $N_{CRS,k}$ is the total number of control resource sets in the control region of subframe k. For hierarchical search space design, the control resource set corresponding to the search space $S_k$ may be given by $Y_k$ mod $N_{CRS,k}$, where $Y_k$ is a sequence generated by the UE's RNTI and the subframe number k. As an example, $Y_k$ could be defined by $Y_k=(A \cdot Y_{k-1})$ mod D, where $Y_{-1}=n_{RNTI} \neq 0$, A and D are two large prime integers, e.g., A=39827 and D=65537. For non-hierarchical search space design, the search space $S_k^l$ may be defined for each aggregation level l. The control resource set corresponding to the search space $S_k^l$ may be given by $Y_k^l$ mod $N_{CRS,k}$, where $Y_k^l$ is a sequence generated by the UE's RNTI and the subframe number k. As an example, $Y_k^l$ could be defined by $Y_k^l=(A \cdot Y_{k-1}^l)$ mod D, where $Y_{-1}=n_{RNTI} \cdot l \neq 0$, A and D are two large prime integers, e.g., A=39827 and D=65537.

The UE may be configured with a single search space or multiple search spaces. The number of search spaces for the UE may be signaled by RRC signaling or MAC CE. When the UE is configured with multiple search spaces, the same control information may be transmitted repeatedly in the search spaces to improve the reliability. Each search space may be associated to different control resource sets. For example, the control resource set corresponding to the search space $S_{k,i}$, i.e., the i-th search space in subframe k, may be given by $$\left(Y_k + i \cdot \left\lfloor \frac{N_{CRS,k}}{I} \right\rfloor \right)$$

mod $N_{CRS,k}$, where I is total number of the search spaces configured to the UE.

The transmit scheme and DM-RS ports for UE-specific PDCCH may be configured by RRC signaling, or MAC CE. In an example, if precoder cycling is configured to the UE, one DM-RS port is associated to the control resource set to form the search space. In an example, if two-port or four-port SFBC is configured to the UE, two or four DM-RS ports are associated to the control resource set to form the search space. For a search space with aggregation level l, which consists of CCEs with indices 0, 1, . . . , $N_{CCE}$, the i-th PDCCH candidate may be defined by CCEs l·i+m, where m=0, 1, . . . l−1.

The beams to transmit UE-specific PDCCH may be selected by the UE based on RS measurement, or may be selected by the eNB based on the UEs' report, and signaled to the UE by RRC signaling, DCI in group common PDCCH, or the first stage DCI in two-stage PDCCH. The beam pairing and beam monitoring may proceed similarly as described above.

In another example embodiment, group common PDCCH may be used to reduce the UE's blind decoding efforts. Beside the common control information, the group common PDCCH may also contain information to reduce the search space of UE-specific PDCCH to a subset. For example, a search space consisting of PDCCH candidates 0, 1, . . . $N_{cand}$−1 can be reduced by half indicated by one bit information, e.g., "1" indicates a subset of PDCCH candidates 0, 1, . . . $\lfloor N_{cand}/2 \rfloor$ and "0" indicates a subset of PDCCH candidates $\lfloor N_{cand}/2 \rfloor$+1, . . . $N_{cand}$−1. Aggregation level may also be indicated in group common PDCCH. An example of content in group common PDCCH is listed in the Table 4 below.

TABLE 4

Example content in group common PDCCH

| Field Element | Meaning of Each Field |
| --- | --- |
| Group ID | Identification of the group |
| Slot format | DL, UL, . . . |
| Control resource set duration | The end of control resource set |
| Aggregation level | Aggregation level for all UEs in the group |
| Search space subset index | Indicating a subset of search space for blind decoding |

Information, such as search space subset index or aggregation level, may be individual information for UEs scheduled for UE-specific PDCCH. An example of content in group common PDCCH is listed in Table 5, where the UE's index in the group is determined by the eNB and signaled to the UE by RRC signaling.

TABLE 5

Example content in group common PDCCH with UE individual information

| Field Element | Meaning of Each Field |
| --- | --- |
| Group ID | Identification of the group |
| Slot format | DL, UL, . . . |
| Control resource set duration | The end of control resource set |
| UE ID 1 | UE 1's index in the group |
| Aggregation level | Aggregation level for all UEs in the group |
| Search space subset index | Indicating a subset of search space for blind decoding |
| UE ID 2 | UE 2's index in the group |
| Aggregation level | Aggregation level for all UEs in the group |
| Search space subset index | Indicating a subset of search space for blind decoding |
| . . . | . . . |

In some cases, instead of a search space subset index, the PDCCH candidate index may be signaled in group common PDCCH, and then the blind decoding might not be necessary because the UE knows the exact location of its UE-specific PDCCH. An example of content in group common PDCCH is listed Table 6.

TABLE 6

Example content in group common PDCCH with UE-PDCCH location

| Field Element | Meaning of Each Field |
| --- | --- |
| Group ID | Identification of the group |
| Slot format | DL, UL, . . . |
| Control resource set duration | The end of control resource set |
| UE ID 1 | UE 1's index in the group |
| Aggregation level | Aggregation level for all UEs in the group |
| PDCCH candidate index | PDCCH candidate index in the UE's search space |
| UE ID 2 | UE 2's index in the group |
| Aggregation level | Aggregation level for all UEs in the group |
| PDCCH candidate index | PDCCH candidate index in the UE's search space |
| . . . | . . . |

Figure 43:
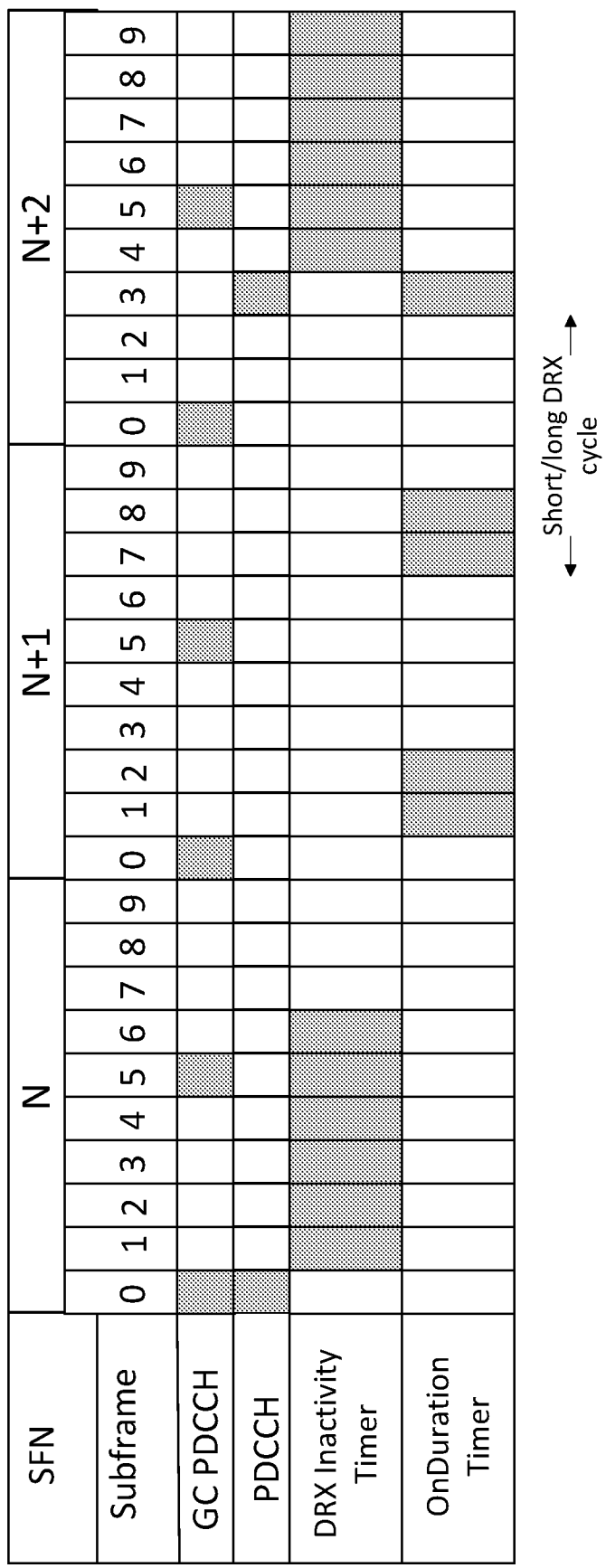
FIG. 43 depicts an example DRX that is not cooperated with a group common PDCCH.

Turning now to discontinuous reception (DRX) for Cooperated with Group Common PDCCH, in some cases, if the UE's group common PDCCH is transmitted periodically, it may adjust its wake-up time due to the periodicity of group common PDCCH. When the UE is scheduled to wake up, it remains sleeping and waits until the next group common PDCCH transmission. For example, as shown in FIG. 43, when the UE wakes up, it cannot receive group common PDCCH. Without the information in group common PDCCH, in accordance with the example, the UE is not able to reduce the blind decoding effort, which might be essential for the UE that desires to save power.

Therefore, in an example, if the UE is configured for periodic group common PDCCH, the short DRX cycle and long DRX cycle are multiples of the period of group common PDCCH transmission, as shown in FIG. 44. During a subframe, in accordance with the example, the reception of group common PDCCH will not start or restart drx-InactivityTimer.

In another example, if the UE's group common PDCCH is not transmitted periodically, a new timer drx-GroupCommonPdcchTimer can be configured by RRC signaling, and the following mechanism for DRX can be used, presented by way of example and without limitation. In some cases, the reception of group common PDCCH will not start or restart drx-InactivityTimer. In an example, the reception of group common PDCCH when OnDurationTimer is on, starts drx-GroupCommonPdcchTimer. When both OnDurationTimer and GroupCommonPdcchTimer expire, go to the short/long DRX cycle. In some examples, the reception of group common PDCCH when drx-InactivityTimer is on, starts drx-GroupCommonPdcchTimer. When both drx-InactivityTimer and GroupCommonPdcchTimer expire, go to the short/long DRX cycle. In an example, the reception of group common PDCCH when drx-GroupCommonPdcchTimer is on, will not restart the drx-GroupCommonPdcchTimer. When drx-GroupCommonPdcchTimer is on, the UE may be in DRX Active time and thus monitors PDCCH.

Figure 45:
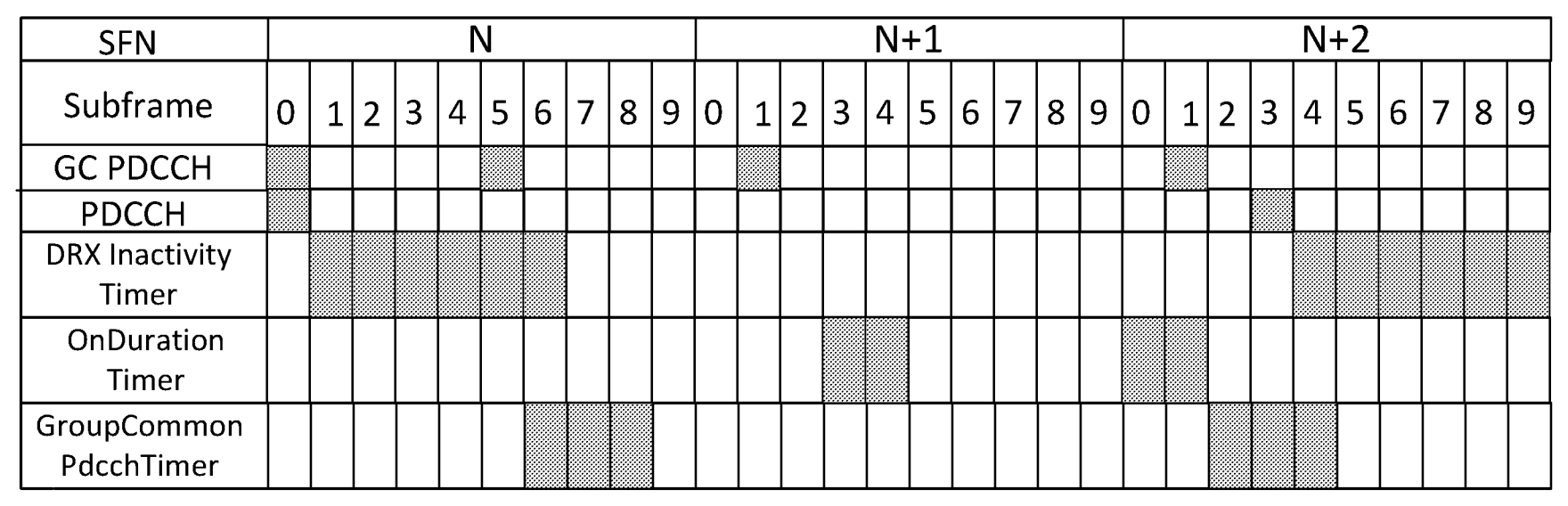

By way of example, referring to FIG. 45, in the subframe 5 of SFN N, the group common PDCCH is received, so drx-GroupCommonPdcchTimer is started and the UE keeps monitoring the PDCCH for the next 3 subframe. In the subframe 1 of SFN N+2, the group common PDCCH is received again and UE-specific PDCCH is also received during drx-GroupCommonPdcchTimer is on, which starts drx-InactivityTimer.

Figure 46:
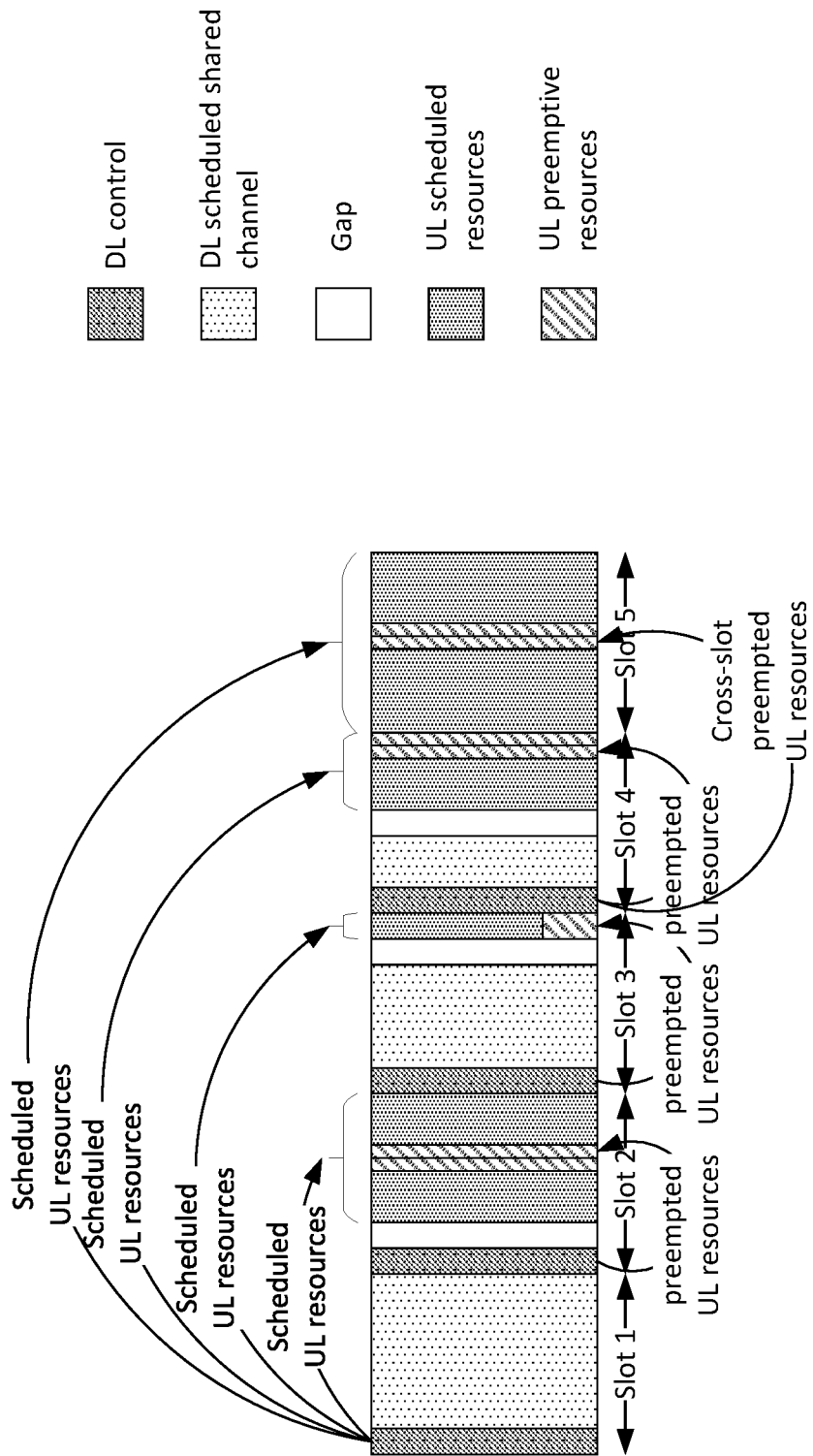
FIG. 46 illustrates a configuration showing UL preemption over scheduled resources in accordance with an example.

Turning again to preemption, in particular UL preemption with reference to FIG. 46, DCI may allocate UL resources for the slots that follow the slot in which the DCI is transmitted. In accordance with the illustrated example, the DCI in the first slot (slot 1) allocates the UL resources for four slots (slots 2, 3, 4, and 5) following slot 1. It will be understood that the DCI can allocate resources for an alternative number of slots as desired. In an example, when need arises to support UL preemption, a subsequent DCI in a following slot may provide the signaling to enable the UL preemption. Here, the DCIs in slots 2, 3, 4 and 5 indicate preemptive UL resources within their respective UL regions. For illustrative purposes, FIG. 2 shows different types of slots: DL-centric, UL-centric, etc. The preemptive resources in slot 5 that are UL centric are scheduled in a cross-slot manner by slot 4. The preempted resources may carry signals of the same or different numerology with respect to the originally scheduled resources.

The preempted resources may carry UL shared channel or UL control signaling. Preempted UL data may be transmitted in accordance with various examples. In an example, low latency applications such as URLLC may require UL resources, but if all UL resources have been scheduled (for instance through aggregation of multiple UL slots or mini-slots), UL preemption may be scheduled. Here, the URLLC UE may request the UL grant through a scheduling request (SR). If a UE initiates a grant free transmission of a TB, the gNB may recognize the transmission and determine to schedule further retransmissions of that TB through scheduled resources. In this case, if the UL slots are already scheduled, for instance for eMBB, the gNB may preempt resources for the UL URLLC retransmissions. The preemptive UL control signaling may be used for various scenarios, such as transmitting A/N for a low latency DL transmission, aperiodic CSI reporting, etc. An example is shown in FIG. 46 where a DL preemption (indicated by the DCI in the mini-slot) is followed by a UL preemption carrying the corresponding A/N. In the example, prior to the configuration of the UL preemption resources, the DCI at the start of the slot had scheduled UL transmissions in the UL resources.

Figure 47:
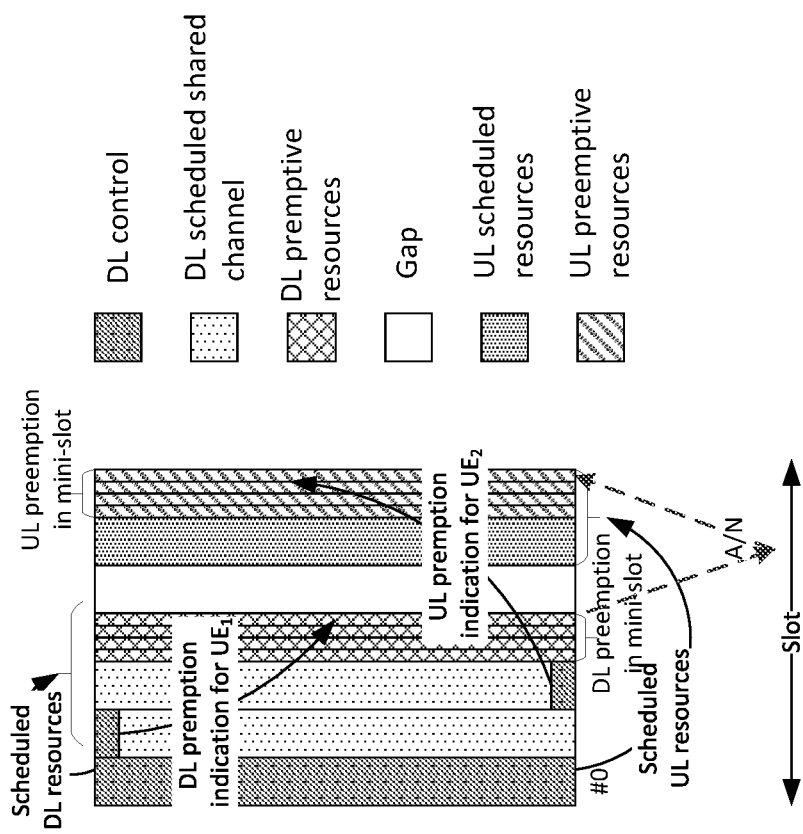
FIG. 47 illustrates an example configuration showing UL control signaling through preemption.

Referring to FIG. 47, in one example, one DCI message may configure the DL preemption resources, while another DCI message may configure the UL preemption resources. In some cases, these DCIs may be transmitted in resources other than leading control symbols. The UE may be configured to monitor these resources for a DCI carrying preemption indication. In FIG. 47, $UE_1$ is preempted in the DL and $UE_2$ is preempted in the UL. Each preemption is indicated by the corresponding UEs UE-specific DCI. When the UE detects a DCI (confirmed through successful decoding of CRC), it reads the message and prepares for the preemption. Referring to FIG. 47, in accordance with the illustrated example, the DCI indicating preemption to the eMBB UE occurs in symbol #1 of the slot, prior to the preempted resources. Another DCI occurring in symbol #2 of the slot indicates the UL preemption resources to the eMBB UE, where the URLLC UE receiving the DL preemption sends its A/N feedback.

In an example, if the same UE is preempted both in the UL and the DL, both preemption resources may be indicated by the same DCI. In another example, a group common PDCCH may be used to indicate both the DL and UL preemption resources. This PDCCH may have one bitmap to indicate the preemption resources for the DL, and another bitmap to indicate the preemption resources for the UL. In some examples, the PDCCH may include one (1) bit to indicate whether a given bitmap is for the DL or the UL. The scheduled UL resources, such as those of eMBB devices, may be UL control signals that may be preempted by UL shared channel or UL control signals of URLLC. Thus, a node, for instance an apparatus classified as an eMBB device, may receive a downlink (DL) control information message comprising a preemption indication. Based on the preemption indication, the node may identify at least one scheduled uplink (UL) resource that is preempted for use by a second device. The at least one scheduled UL resource that is preempted may be preempted for control signaling from another device. Further, based on the DL control information message, the node may identify at least one scheduled downlink (DL) resource that is preempted for use by a third device. In an example, the second device and the third device are each classified as an ultra-reliability low latency communication (URLLC) device. In one example, the second device and the third device are the same devices. In some examples, based on the DL control information message, the node may determine a new UL resource at which the apparatus can make a retransmission. The node may send the retransmission at the new UL resource, and the retransmission may include data that was scheduled to be sent at the at least one UL resource preempted for use by the third device.

Figure 48:
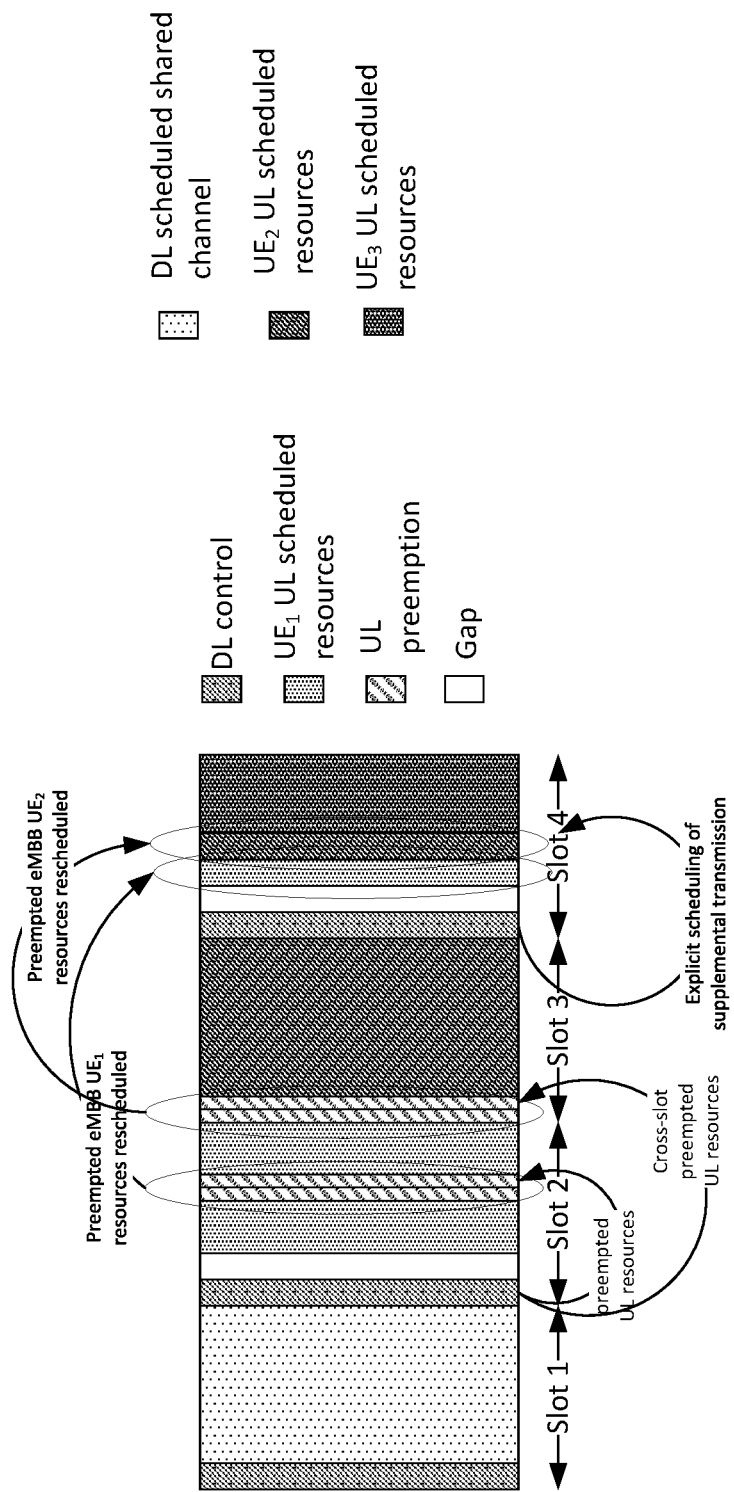
FIG. 48 illustrates an example supplemental UL transmission for preempted eMBB transmission.

In some examples, the gNB may release some of the scheduled UL resources (typically, but not limited to, eMBB UEs) for the preemptive UL transmission (typically, but not limited for, URLLC UEs) by explicitly notifying the previously scheduled UEs (e.g., eMBB) about the preemption. The notification may occur through a preemption signal or preemption indication message occurring prior to the symbol, where the prior scheduled UL transmission resources are preempted. Subsequently, the impacted resources of the eMBB UE may be transmitted as a supplemental transmission in other scheduled resources in following slots or mini-slots, as illustrated in FIG. 48 by way of example. Referring to FIG. 48, UL preemption occurs in slots 2 (UE1) and 3 (UE2) and the supplemental transmissions occur in slot 4. The resources for this supplemental transmission may be implicitly derived by the eMBB UE from one or more of the following: (i) the resources of the original eMBB scheduled transmission; (ii) resources of the preemption; (iii) cell ID; (iv) UE ID; and (v) Beam ID. Alternatively, the resources for the supplemental transmission may be indicated by another DCI in a following slot or mini-slot. The supplemental UL transmission may occur prior to the reception of A/N for the original transmission. As shown in FIG. 48, the DCI in slot 4 explicitly allocates schedules resources for supplemental transmissions of preempted transmissions of UE1 and UE2.

Figure 49:
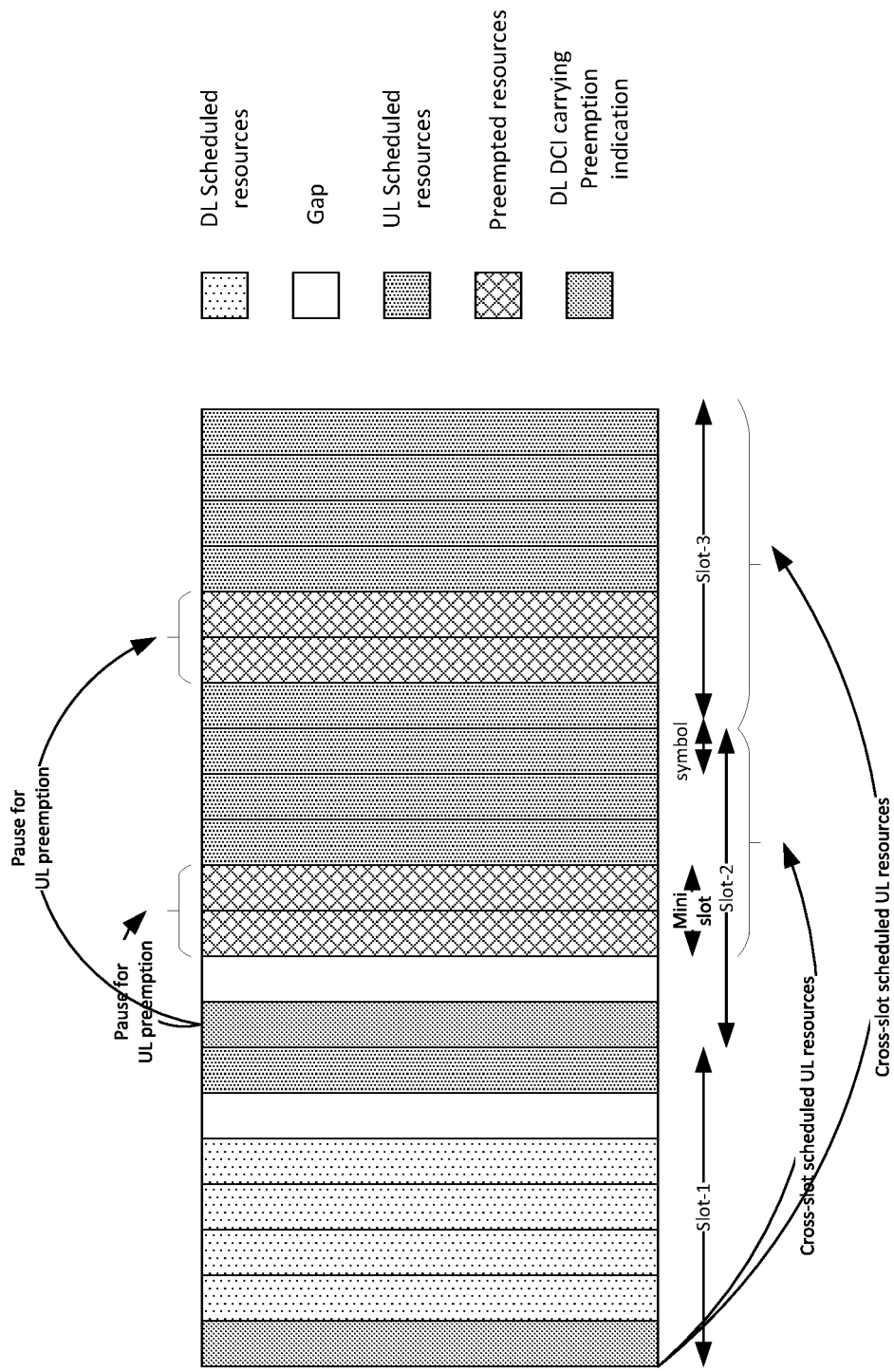
FIG. 49 illustrates an example UL preemption signal indicating pause commands for scheduled UE and the preempted UL resources.

In some examples, the preemption signal or message carries information to pause UL transmission in some resources, and resume transmission in other resources. For example, the preemption message may contain frequency resources that are to be released for preemptive transmission. The preemption message may contain time resources released for preemptive transmission. The timing resources may be indicated using a pause-indication. The pause indication may include the start and end of the duration of a pause. For example, in this duration, the scheduled transmissions pause so that preemptive transmissions may be sent. At the end of the pause duration, the transmissions are resumed. For example, FIG. 49 shows UL preemption occurring in the slots 2 and 3. The DCI of slot 2 indicates the pause-signal for slot 2. The DCI in slot 2 also indicates the pause-signal in a cross-slot manner for UL preemption in slot 3, which is entirely UL-centric. The UEs scheduled originally in the UL resources recognize the preemption indication and pause their transmission to allow the preemption UEs to use the resources.

Figure 50:
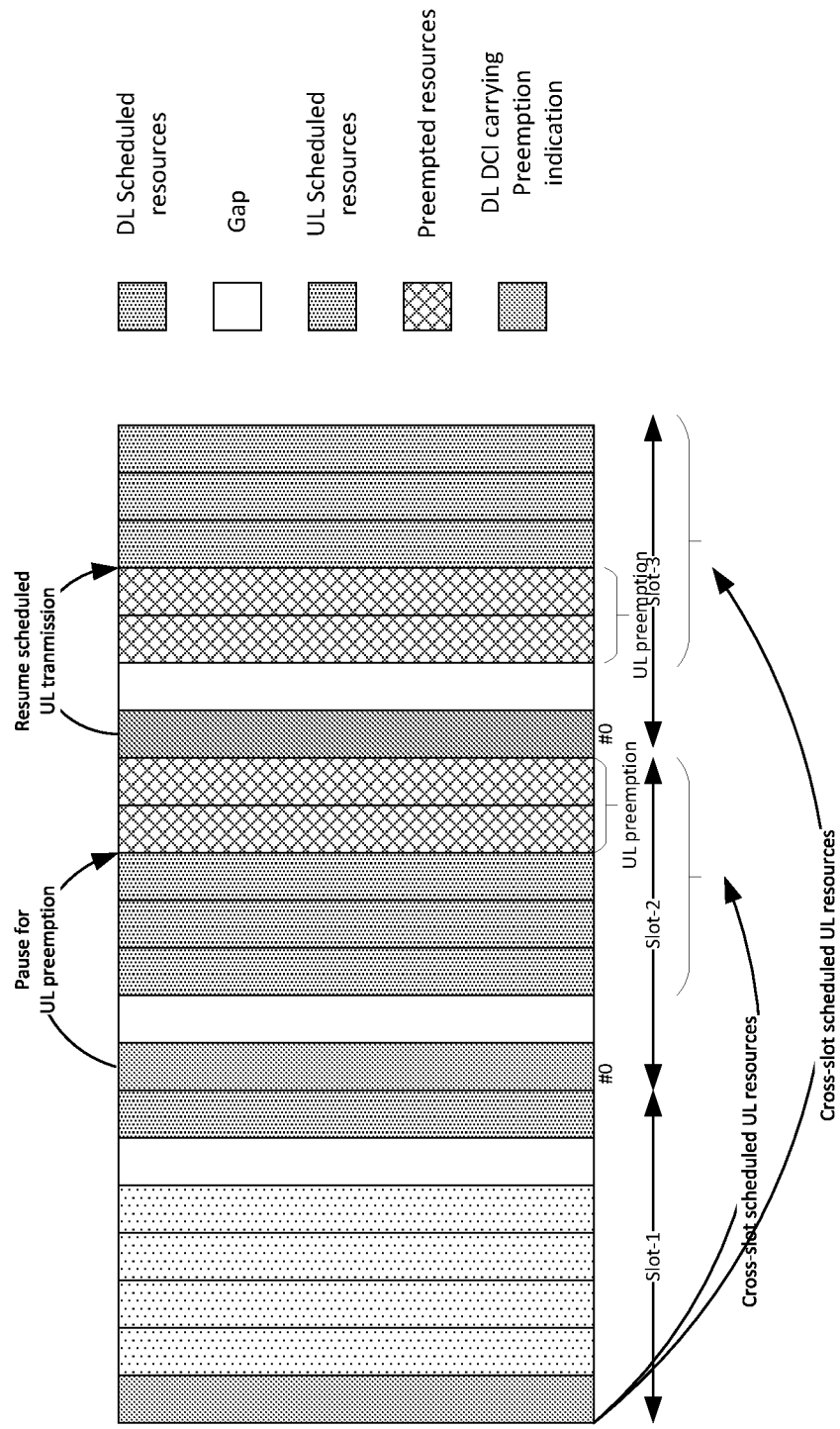
FIG. 50 illustrates an example preemption signal providing pause and resume commands through separate DL control signals.

Alternatively, with reference to FIG. 50, a pause-indication may pause a scheduled UL transmission indefinitely until a resume-indication is sent. In accordance with the illustrated example, the preemption signal in slot 2 carries a pause-indicator from symbol 5 onwards. So scheduled UL transmission is paused from symbol 5 of slot 2. The pause continues in slot-3's UL symbols 2, 3 but scheduled UL resumes at symbol 4 as per the resume-signal indicated by the DCI of slot-3.

The preemption message or signal may also include information to resume transmission in the affected UEs, such as information indicating the symbol/mini-slot/slot for resuming and the resources for transmitting the preempted information.

Figure 51:
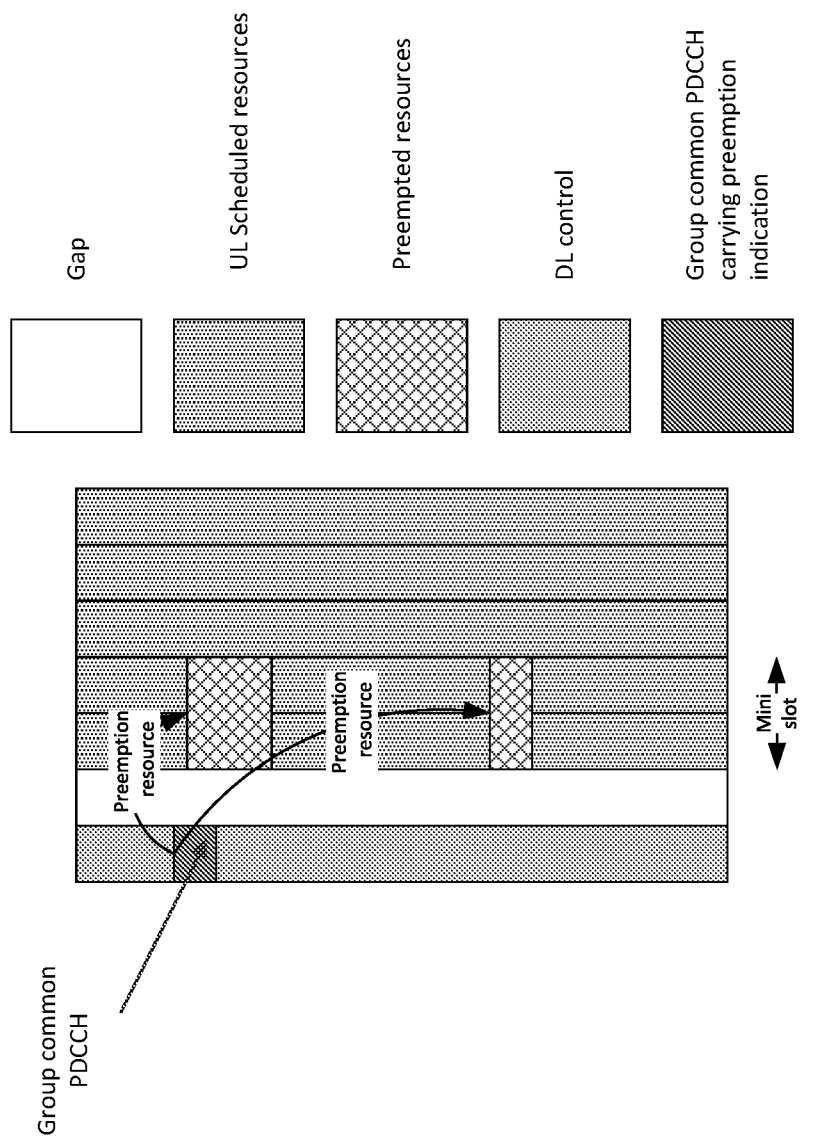
FIG. 51 illustrates an example group common PDCCH that carries the preemption signal and information about the preempted resources.

The pause-signal and resume-signal (if present) may be sent on a group common PDCCH. For example, a group common PDCCH may be configured for a group of eMBB UEs to indicate the preemption resources and the pause/resume signals, as shown in FIG. 51 by way of example. Preemption can occur on a given eMBB UE's shared channel or control channel resources. Multiple eMBB UE's resources may be impacted due to the fact that their control signals may be code-division multiplexed or because their resources use CP-OFDM and can be distributed in the time-frequency grid. For example, UEs operating within a specific 20 MHz band of a 100 MHz spectrum may be configured with a group common PDCCH. This group common PDCCH may be transmitted when there is an UL preemption with this 20 MHz range. The DCI carries resource information/pause-resume indication for one or more preemption regions within this 20 MHz region. UEs scheduled for UL transmission decode the group common PDCCH and check if they any of their scheduled UL resources are preempted. If they are preempted, the UEs pause transmission. Various examples are discussed below, wherein the preempted resources are indicated through some form of DCI.

Figure 52:
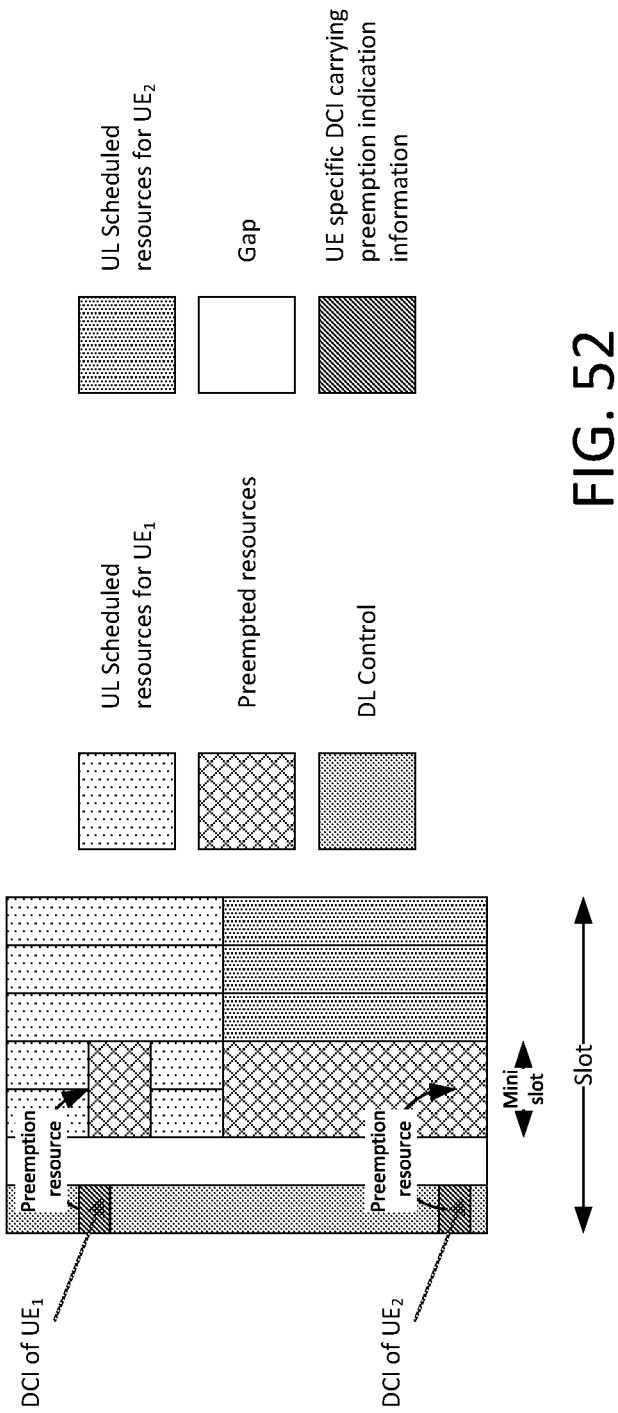
FIG. 52 illustrates an example UE-specific DCI that carries the preemption signal and information about the preempted resources.
Figure 53:
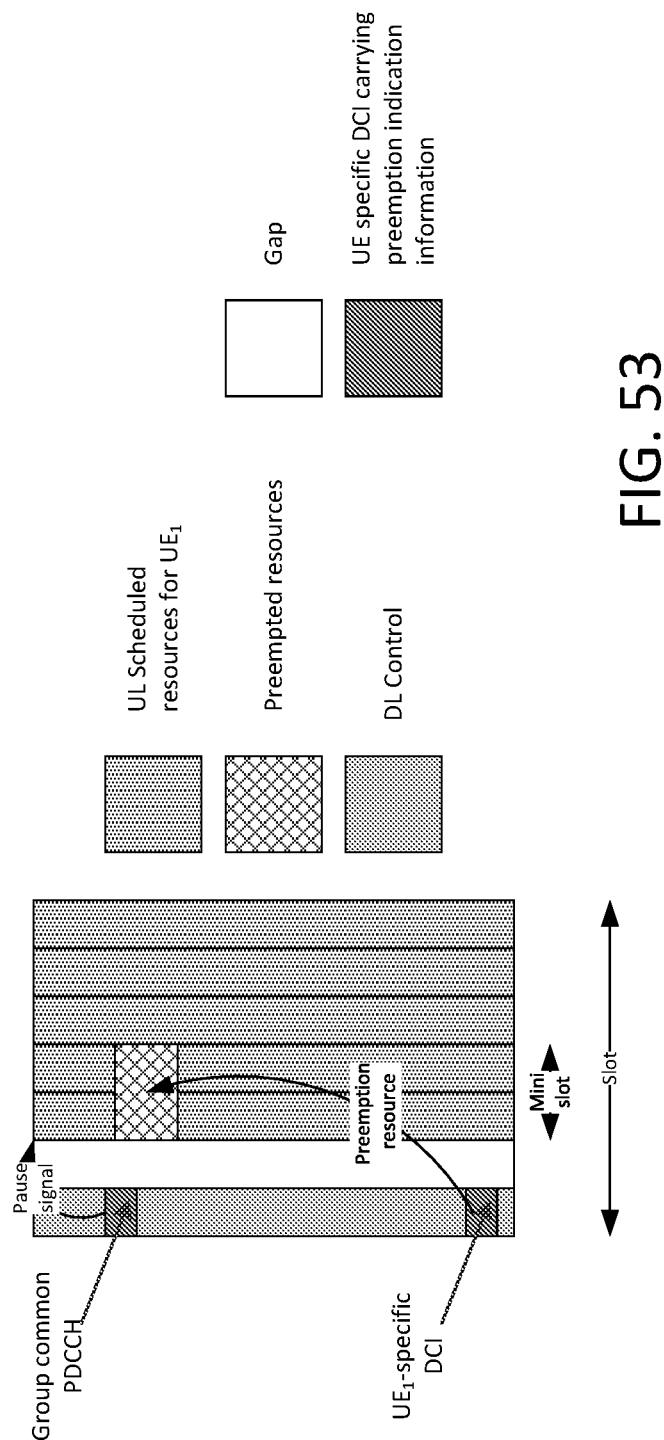
FIG. 53 illustrates a group common PDCCH that carries the pause and resume signals, and a UE-specific DCI that carries information about the preempted resources, in accordance with an example embodiment.

In an example, the UL preemption indication may be sent through UE-specific DCI, such that each impacted UE receives its own DCI indicating the impacted resources, as shown in FIG. 52. Referring also FIG. 53, UE-specific DCI may carry the preemption signal and information about the preempted resources. Alternatively, a group common PDCCH may indicate the preemptive resources, and the indication of the specific preempted resources may come through UE specific DCI as shown in FIG. 52. In some cases, the resume signaling to the eMBB UE may be accompanied by an UL grant for supplemental resources to transmit the preempted portions of the scheduled transmission. The supplemental information may be transmitted in another slot or mini-slot as illustrated earlier in FIG. 52.

Figure 54:
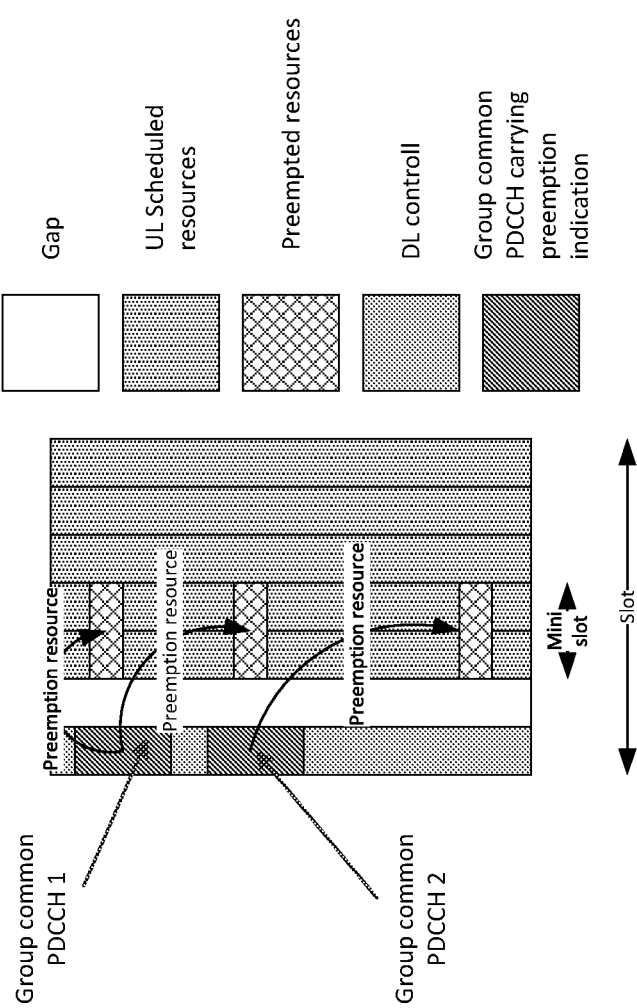
FIG. 54 illustrates one or more DCIs that may carry preemption signaling and may indicate one or more preemption regions.

In some cases, multiple DCIs corresponding to different set of UEs may be transmitted in the same control signaling occasion in a slot or mini-slot occur to indicate pause or resume of preemption of different set of resources. Also, in an example, a single DCI may indicate preemption resources for multiple UEs. An example is shown in FIG. 54 to illustrate both these examples—Group common PDCCH-1 indicates 2 separate preemption regions that could occur in the scheduled resources of 2 UEs. Group common PDCCH-2 indicates a separate set of preemption resources that may have been scheduled for a third UE.

As an alternative to indication of preemption resources through DCI (seen in the above examples), the preemption resources may be predefined depending on the UE ID, beam ID, cell ID and resource location in the time and frequency grid, and may include signaling such as RS in preconfigured REs. An eMBB UE may check for the presence of these RS, an upon detecting the presence, the eMBB UE may recognize the presence of UL preemption.

Figure 55:
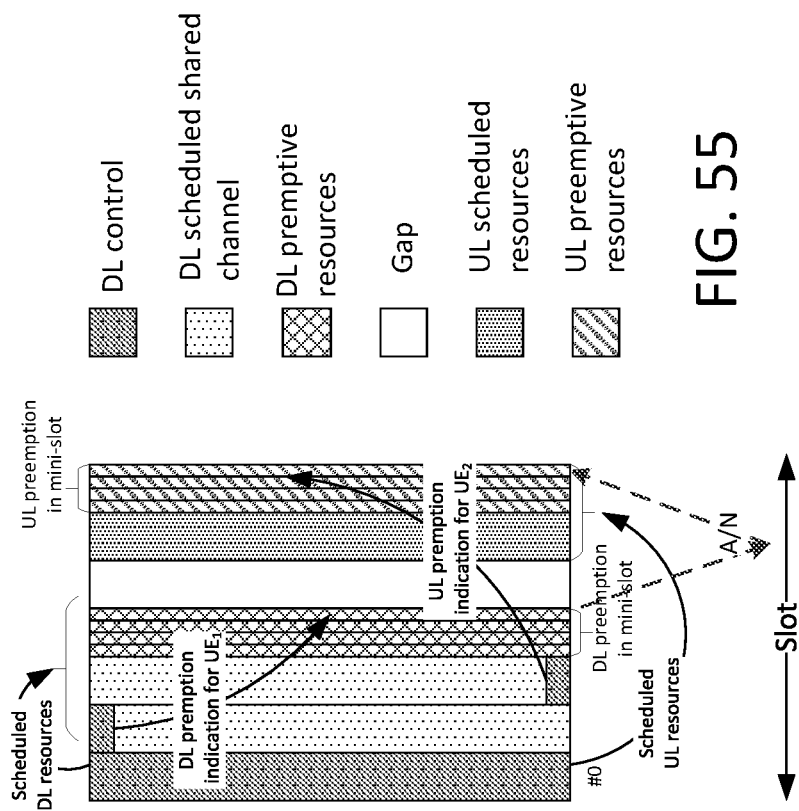
FIG. 55 illustrates using the grant free contention region to support control signaling in accordance with an example embodiment.

Turning now to network assisted signaling in contention based resources, it is recognized herein that in some cases, if the payload for preemptive transmission is small, the DL control overhead may be high for using the schemes discussed above to signal the preemptive resources. Instead of scheduling a preemptive transmission, in accordance with another embodiment, the gNB may schedule the UE to transmit on the contention based region where grant free transmissions may occur. FIG. 55 shows an example where the control signals (A/N) in response to a DL preemption grant are transmitted on the contention region like a grant free transmission.

Figure 56:
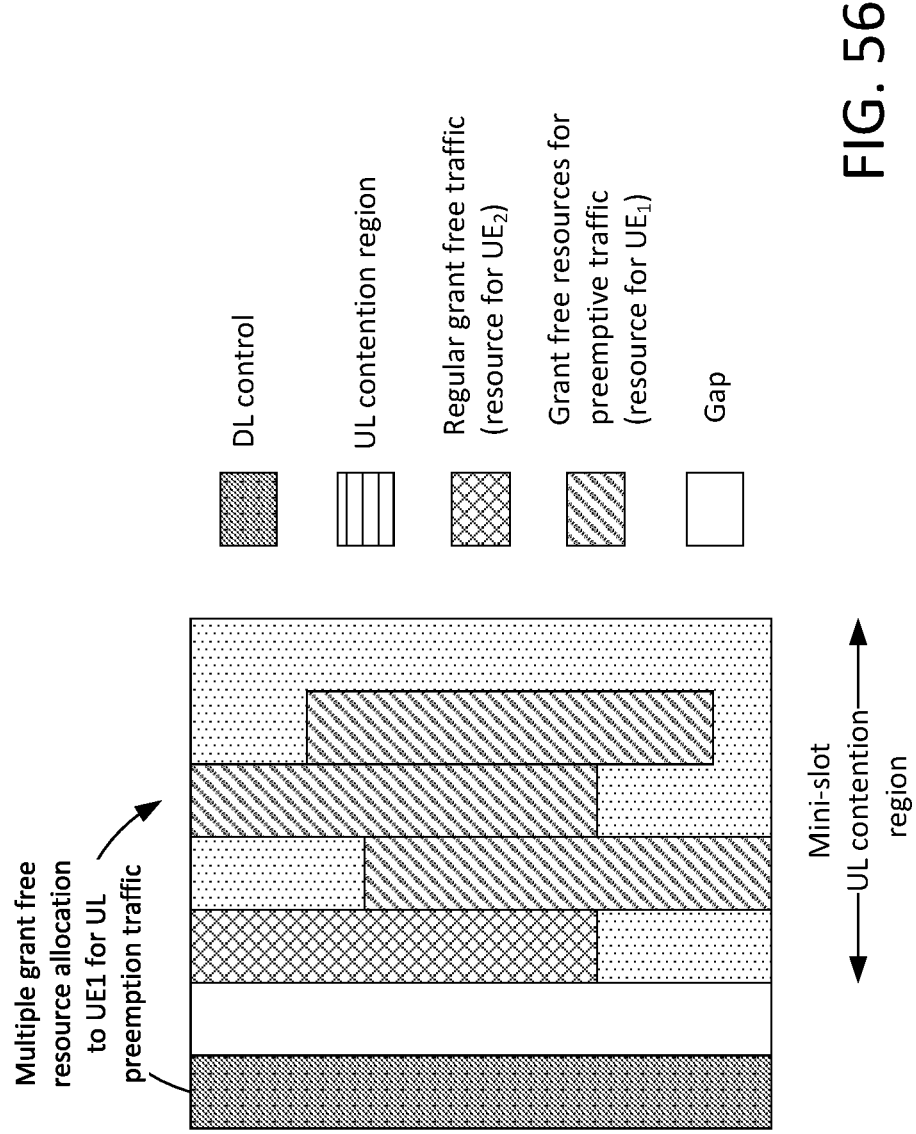
FIG. 56 illustrates assigning multiple grant free resources for preemptive traffic in contention based region in accordance with an example embodiment.

Referring to FIG. 56, the gNB may assign the UE multiple resources in the contention region so that the packet is received with high reliability. For example, for grant free transmission in contention region, the UE may have only 1 resource, but for preemptive transmission on contention region, the UE may be configured with multiple resources assigned through RRC or dynamically through DCI. In the latter case, in some examples, the gNB can select the set of resources according to its prediction of the contention resource usage. FIG. 56 shows an example where multiple resources are assigned to the UE for the preemption transmission.

In some instances, such as UL A/N transmissions, the control payload may be small, for instance in the order of a few bits, especially for DL URLLC transmission. Also, if the reliability is very high as is the case for URLLC, the operating point of BLER for a single transmission in around $1e^{-3}$ or lower, implying that most UL transmissions are Ack. If gNB schedules a preemptive transmission for every Ack, it is recognized herein that the transmissions may drain the DL resources. For such cases, a modified form of A/N transmission may be used, as now described.

In an example, the A/N may be transmitted in a bundled manner. For example, one A/N may be sent for N retransmissions or H HARQ processes, wherein N and H may represent integers greater than one (1). Thus, the A/N transmission can occur less frequently than the number of DL transmissions/retransmissions. Alternatively, in an example, the bundled A/N may correspond to all transmissions within a timing window of preconfigured length. This may occur on a preemptive A/N resource or a scheduled A/N resource on the UL. Alternatively, or additionally, the bundles A/N may carry an indication of which transmissions are bundled together in the response.

Figure 57:
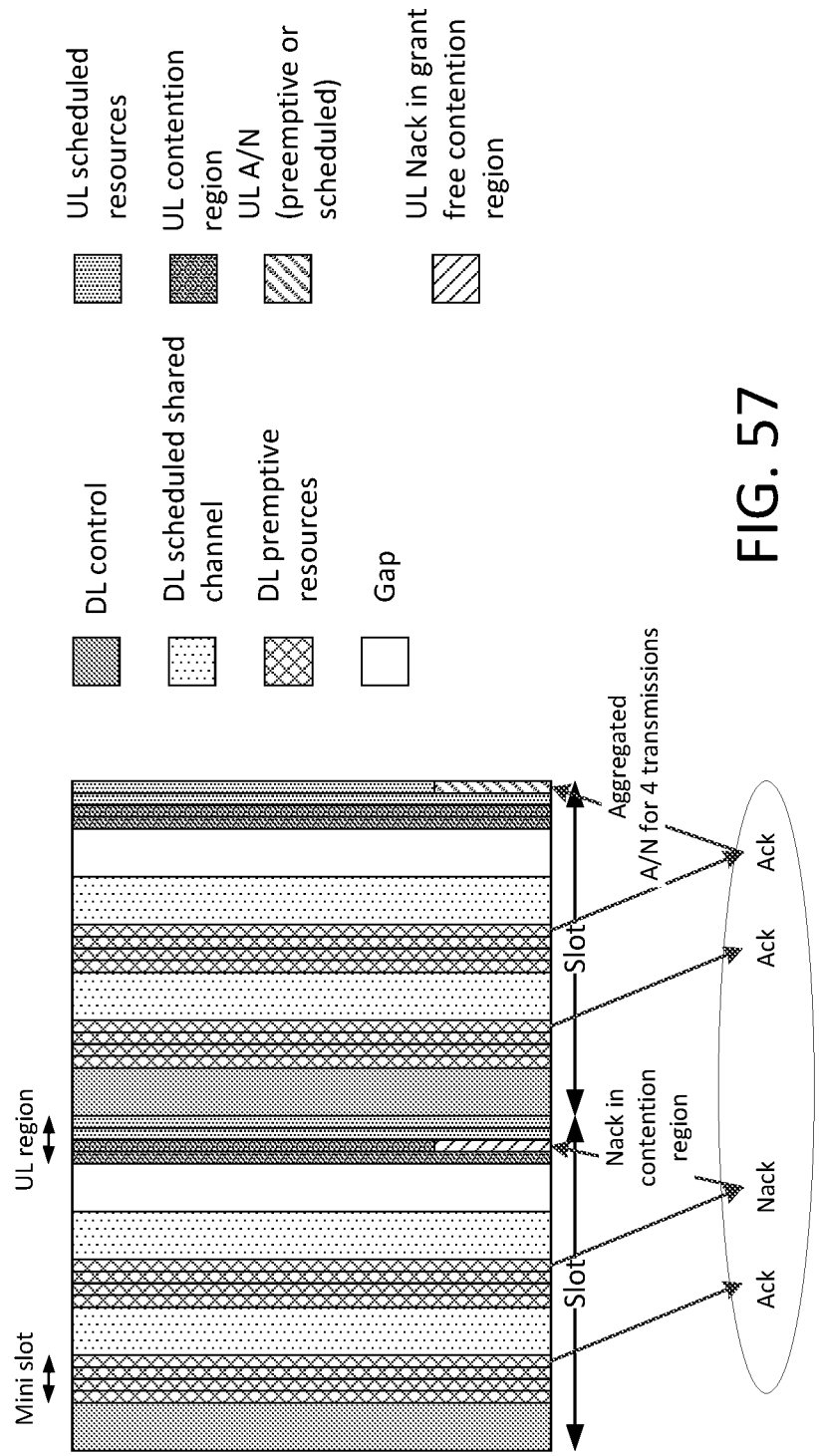
FIG. 57 illustrates an example aggregated A/N transmission with contention based Nack transmission.

In an example, with reference to FIG. 57, if a Nack is encountered after P retransmissions of a HARQ process, the Nack is sent over a grant free transmission in the contention region. The message carrying the Nack may also carry the identity of the HARQ process which induced the Nack. This scheme may ensure that Nacks are received with low latency. This may be important because Nacks can indicate low power or poor channel quality or co-channel interference to the gNB. Thus, the gNB can quickly react, for example through power control to improve the BLER. As shown in FIG. 57, the aggregate A/N (e.g., A/N bundling) is sent for all the preemptive DL transmissions in 2 slots. However, when a Nack occurs (2nd transmission of 1st slot), the information is sent on the grant free contention region of that slot. Transmission of aggregated A/N at low periodicity may ensure that the UE does not get stuck in a DTX state, i.e. if some DL transmissions are not received at the UE (DL grant is not decoded correctly), UE does not include the information of that transmission in the message. So gNB detects DTX and may react by improving reliability of DL control signaling and/or shared channel.

According to another aspect, a UE may support multiple UL HARQ processes for grant free transmission. Furthermore, a retransmission of the HARQ process may occur in a grant free manner or in scheduled resources. To allow for chase combining at the gNB receiver and to provide A/N to the UE, in some examples, the UE and gNB have a common understanding of the HARQ process and RV information. The HARQ and RV information may be embedded in the type of signaling as described above, or HARQ related timing relationships may be defined as described in more detail below.

Figure 58:
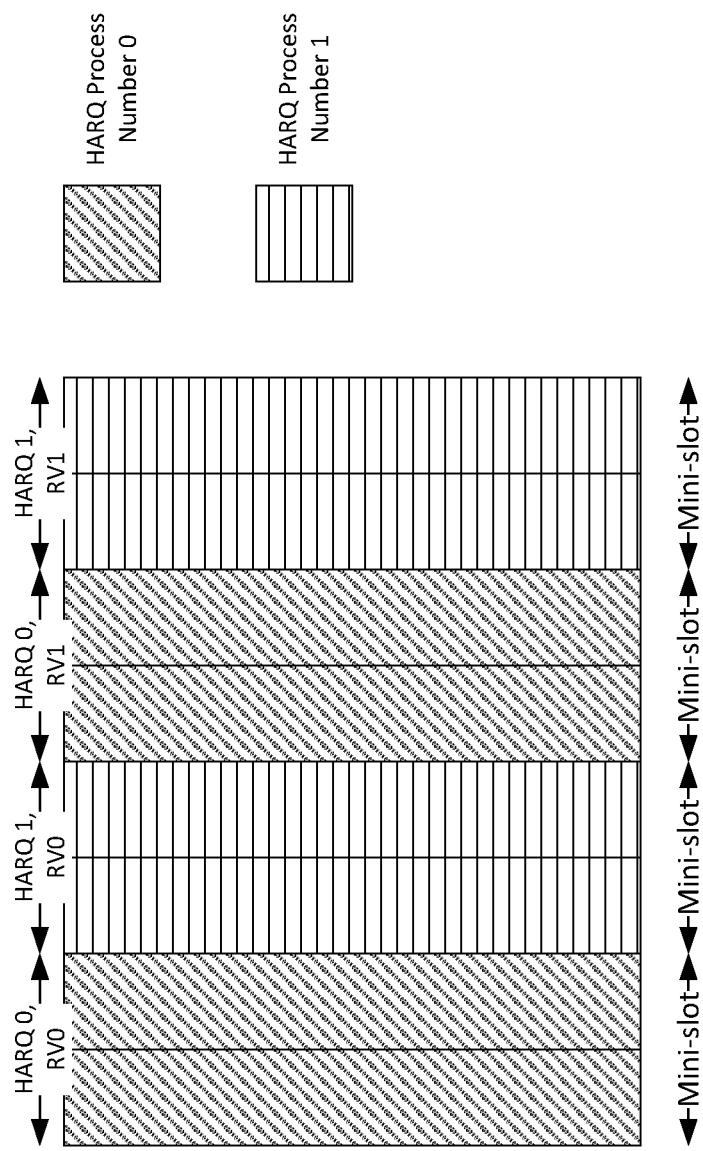
FIG. 58 illustrates implicit signaling of HARQ process numbers and redundancy versions through grant free timing resources in accordance with an example embodiment.
Figure 59:
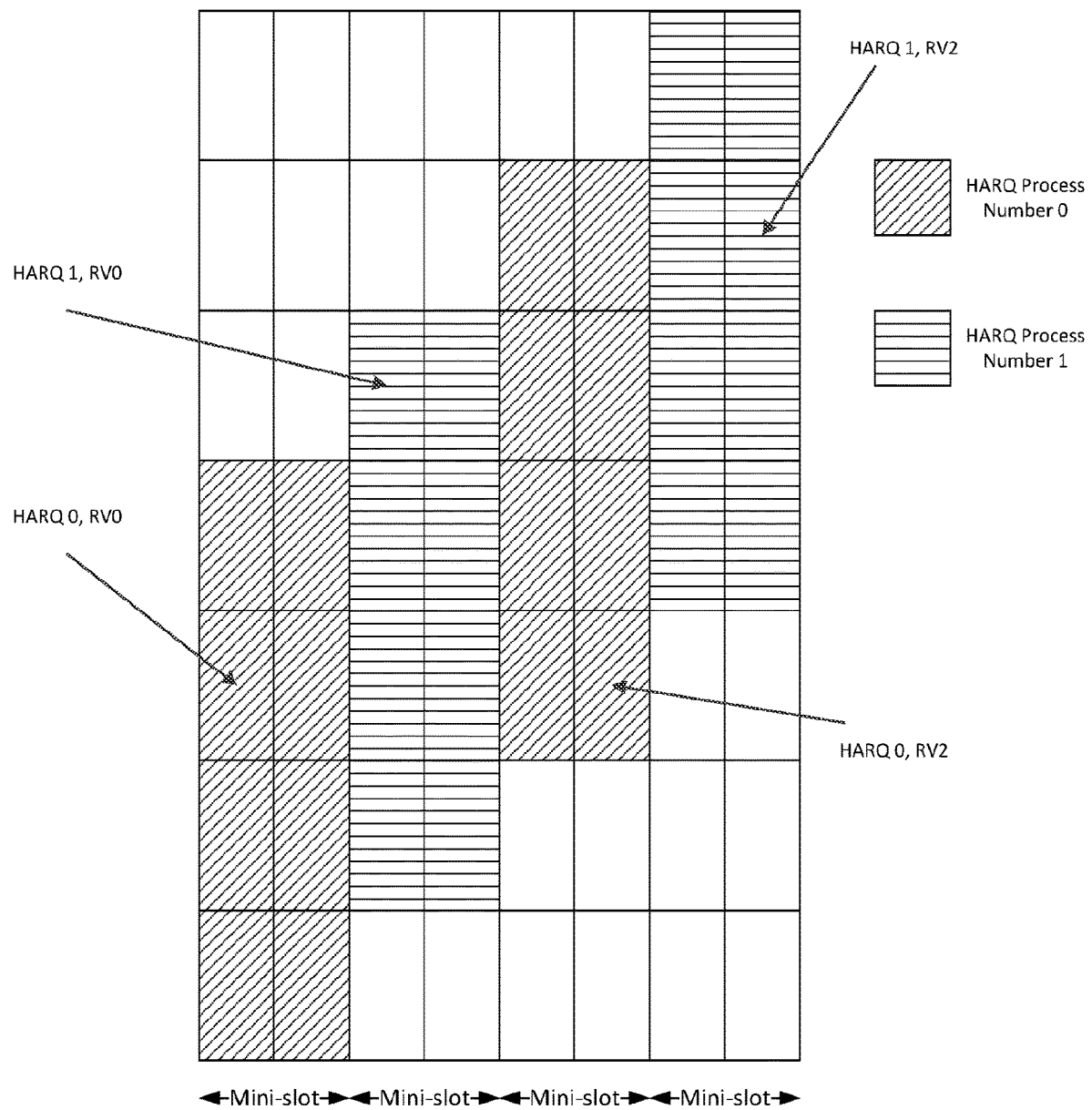
FIG. 59 illustrates implicit signaling of HARQ process numbers and redundancy versions through frequency location of grant free resources in accordance with an example embodiment.

In an example, the UE may maintain a HARQ process ID for its grant free transmissions and the corresponding information may be conveyed to the gNB unambiguously in various ways. For example, in an implicit identification associated with grant free resources, the starting symbol number of the grant free resources within a slot/mini-slot or starting mini-slot number of the grant free resources within a slot or a starting slot number of the grant free resources within a frame may indicate the HARQ process number. For example, in FIG. 58, a transmission in mini-slot #1 of the slot indicates HARQ process Number 0, RV0; a transmission in mini-slot #2 indicates HARQ process Number 1, RV0; a transmission in mini-slot #3 indicates HARQ process Number 0, RV2; and so on. Alternatively, in another example, the lowest RB number of the resources in frequency may indicate the HARQ process number and or RV. For example, if a UE has N hypotheses (UL HARQ processes and RVs) for grant free transmission, then the beginning RB mod N gives a number between 0 and N−1 indicating one of the possible N HARQ/RV hypotheses as shown in FIG. 59. Here, N=4 and 2 HARQ processes and 2 RVs are supported. Furthermore, for each UE the mapping of HARQ process number/RV to resource may be different and derived from the UE ID to randomize the effect of contention. An extension of this example includes is a scheme where both frequency and timing resources can jointly determine the HARQ/RV of the grant free processes.

Figure 60:
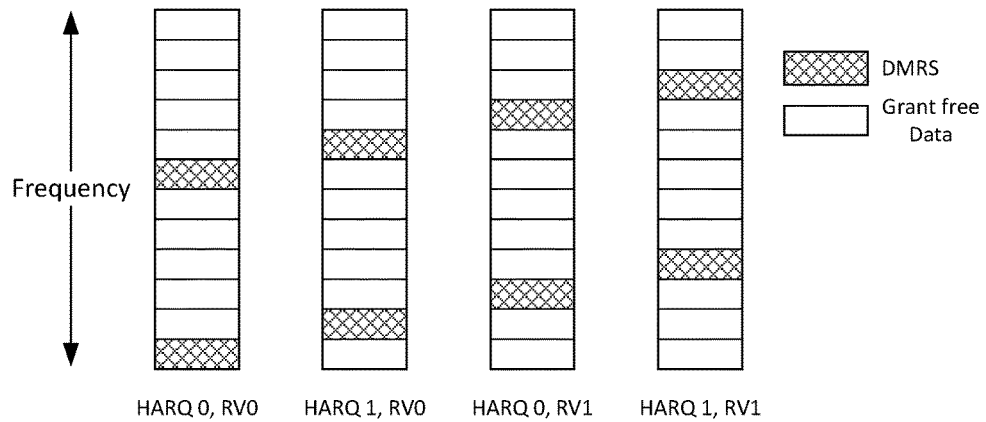
FIG. 60 illustrates an example of implicit signaling of a HARQ process number and redundancy versions through location of DMRS in grant free resources.

In another example, in an implicit identification though DMRS, certain parameters of the DMRS may indicate the HARQ process Number and/or RV. For example, the location of the DMRS with respect to the beginning of an RB may uniquely map to the HARQ process number as illustrated in FIG. 60, wherein different RE locations correspond to different HARQ process/RV. In some examples, the sequence itself may denote UE ID. The gNB may blindly detect the location for the DMRS to find the HARQ process/RV.

Figure 61:
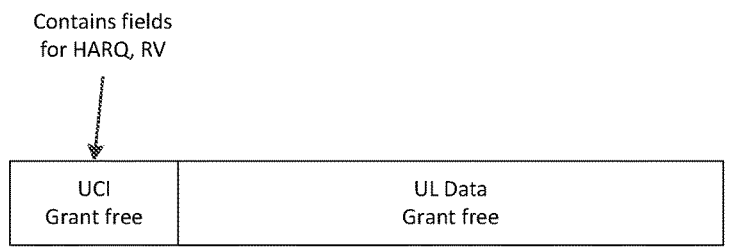
FIG. 61 illustrates an example of explicit signaling of a HARQ process number and redundancy version of grant free transmission using a control information field.

In yet another example, there may be explicit identification through a control signal field. An explicit field may be present to carry control information on the grant free UL. This carries information on the HARQ process number and RV. This control field may have separate coding and CRC from the data portion of the transmission as shown in FIG. 61.

Figure 62:
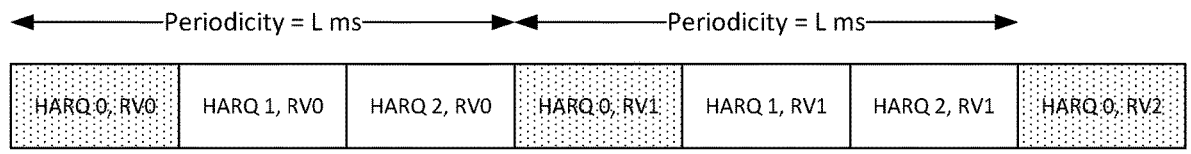
FIG. 62 illustrates timing relations that indicate the HARQ process number and redundancy versions in grant free retransmissions in accordance with an example embodiment.

Turning now to deriving HARQ and RV information without signaling, the HARQ process number and RV might not be conveyed, in some cases, but they may be understood by UE and gNB from the intrinsic timing relations between the retransmissions and A/N response. FIG. 62 provides an example where the grant free retransmissions occur at a predefined periodicity L ms for HARQ process 0. Other HARQ processes from that UE might not occur in occasions corresponding to the retransmissions of the HARQ process number 0. The redundancy version may be tied to the occasion of retransmission, i.e. the retransmissions occur in a specific order without requiring to be signaled.

Figure 63:
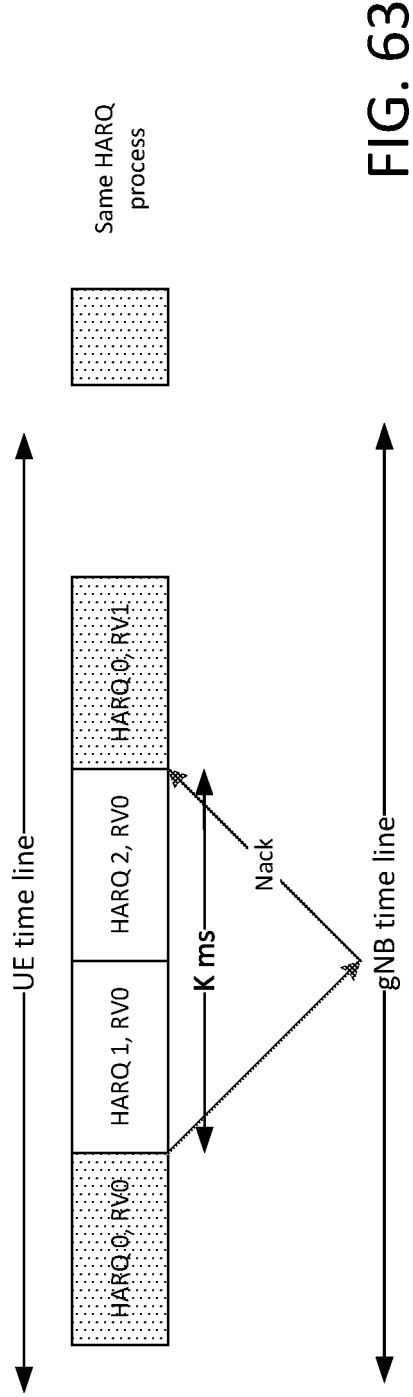
FIG. 63 illustrates example timing relations between the HARQ process A/N for unambiguous interpretation of grant free processes.

Alternatively, because it is possible for the gNB to miss the 1st transmission and not know of its existence, the RV on the subsequent retransmissions can be mistaken as the 1st retransmission and may appear to be the first transmission. Thus, in some cases, the RV alone may be signaled implicitly or explicitly using the schemes described above. Similarly, predefined timing relations between the HARQ transmission and A/N can unambiguously resolve the HARQ process number I a series of grant free transmissions. FIG. 63 gives an example where the A/N response arrives from the gNB within a predetermined timing window, which is K ms from a grant free transmission, so that the UE can unambiguously associate that A/N with the specific HARQ process Number 0.

In some examples, the UL grant free HARQ processes may have separate identification from scheduled UL grants. For example, when a UE triggers a grant free transmission, its HARQ processes (scheduled) might be in a mode that requires a retransmission (NDI=0). If the UE picks a HARQ process number from the pool of scheduled HARQ processes, in an example, it will have to set the NDI to 1, which means the gNB will have to flush out the buffer and lose a prior transmission. For example, HARQ processes IDs 0-7 may be used for scheduled transmissions while HARQ process IDs 8 and 9 may be used for grant less transmission.

Figure 64:
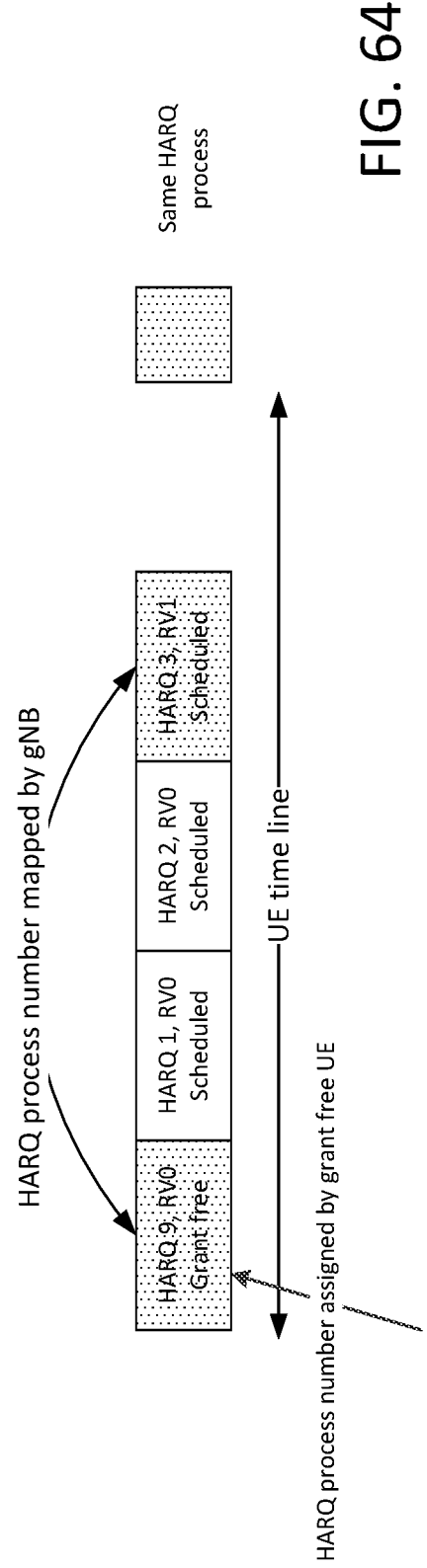
FIG. 64 illustrates example gNB maps grant free HARQ process number to a different HARQ process number for scheduled retransmissions.

The retransmissions of grant less transmission may be scheduled through UL grants. In an example, when the gNB schedules an UL grant for further retransmissions of an UL grant free transmission, the gNB may map the identification of the grant free process to a scheduled process. For example, an UL grant free HARQ transmission may be mapped to a scheduled HARQ process number for a retransmission of a grant free HARQ process so that the grant free HARQ process number does not collide with the HARQ process numbers for the scheduled transmissions. Further references to the retransmissions occur using this mapped HARQ process number (from the scheduled pool). For this purpose, for example, the scheduled UL grant for the retransmission carries information assigning the mapped HARQ process number. An example is shown in FIG. 64. The RV for the scheduled retransmission may be optionally specified by the gNB. If it is not specified, the UE may continue to cycle through a preconfigured sequence of RVs.

If a UE has to send a low latency transmission or has to send a grant free retransmission (such as UL URLLC transmission) but coincidentally receives a scheduled UL grant for an eMBB TB, it may prioritize the URLLC transmission. For example, the UE may use the scheduled resources for the URLLC transmission by overriding the scheduled UL eMBB grant. When an UL grant is scheduled for an eMBB transmission, the grant may specify the HARQ process ID, RV, numerology, etc. To divert these resources fully or partially for a URLLC transmission, the UE may indicate an override without which the gNB may make errors in detecting the UL numerology HARQ process, etc. The UE may indicate the override through one various ways, in accordance with various embodiments.

Figure 65:
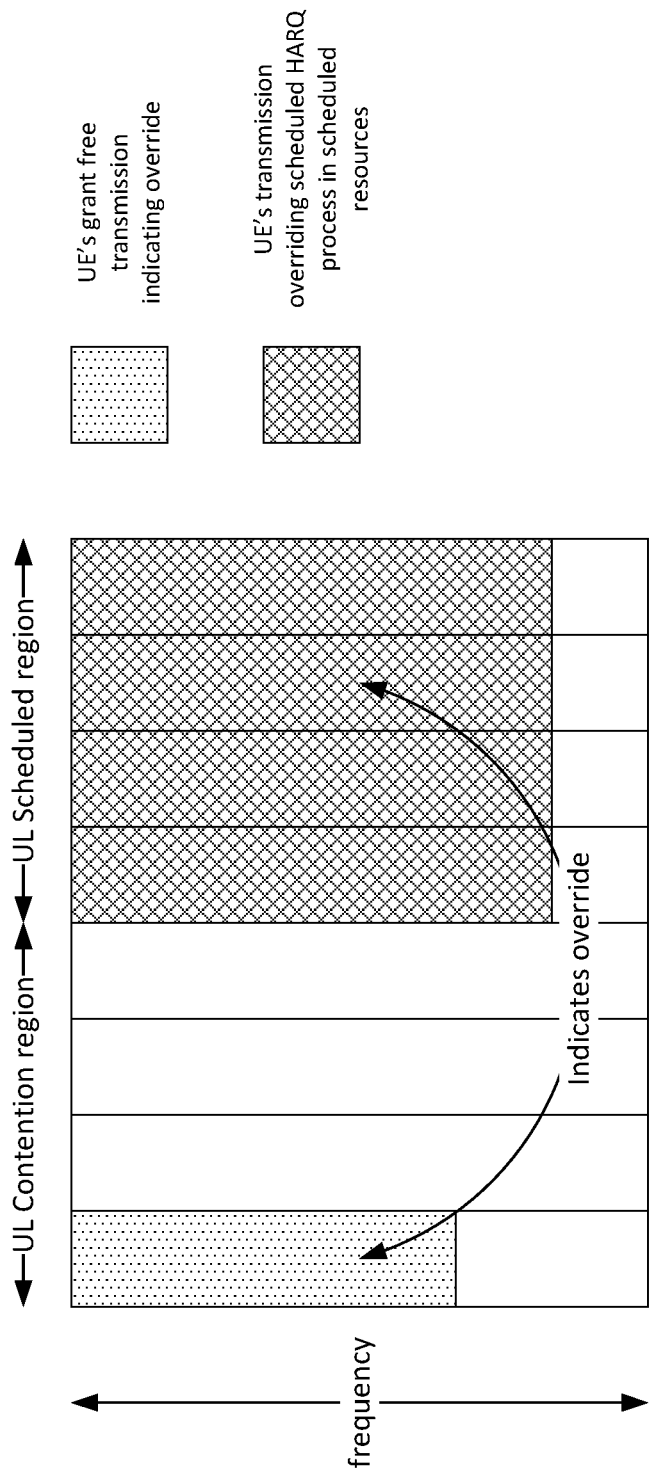
FIG. 65 illustrates URLLC transmission overrides scheduled eMBB resources in the UL.

Referring to FIG. 65, in accordance with one embodiment, the UE transmits the information about the override in the grant free contention based resources and concurrently transmits the information payload intended for URLLC TB on the UL scheduled resources. Although a grant free transmission occurs, it has a small payload indicating the override and is less resource constraining.

Figure 66:
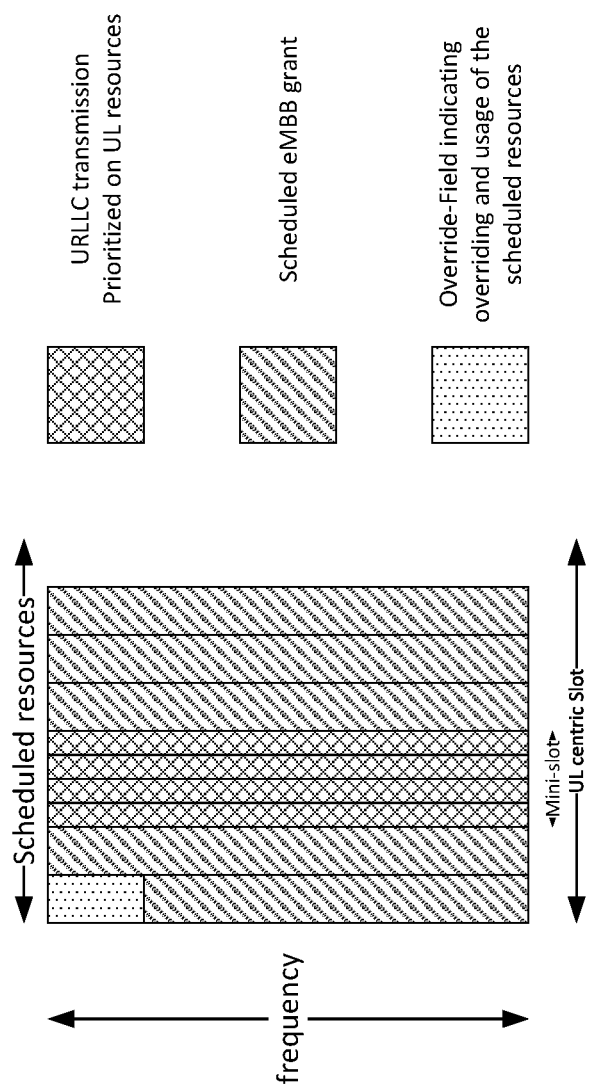
FIG. 66 illustrates a retransmission of a grant free process shares resources with a scheduled transmission with an override filed indicating the sharing between the resources, in accordance with an example embodiment.

Referring to FIG. 66, the payload in the scheduled resources consists of an override-field, which is a field indicating that the UE over rides the resources with a transmission planned originally for grant free resources. This field may be located in predefined resources so that the gNB can blindly decode it. Upon detecting it, the gNB recognizes that some scheduled resources were diverted for another transmission. If the scheduled resources are sufficiently large but the URLLC transmission is relatively small, the UE may use some scheduled resources for the URLLC transmission and the remaining for the gNB-scheduled transmission. The override field may indicate this split of resources. The override field may be encoded and protected by CRC. The numerology, coding, modulation etc. may be different for the two transmissions sharing the UL grant. In some cases, if a UE is scheduled for an UL URLLC transmission on some resources and it has ongoing grant less retransmissions on the UL contention channel, the UE may prioritize the retransmissions over the UL URLLC grant.

Figure 67:
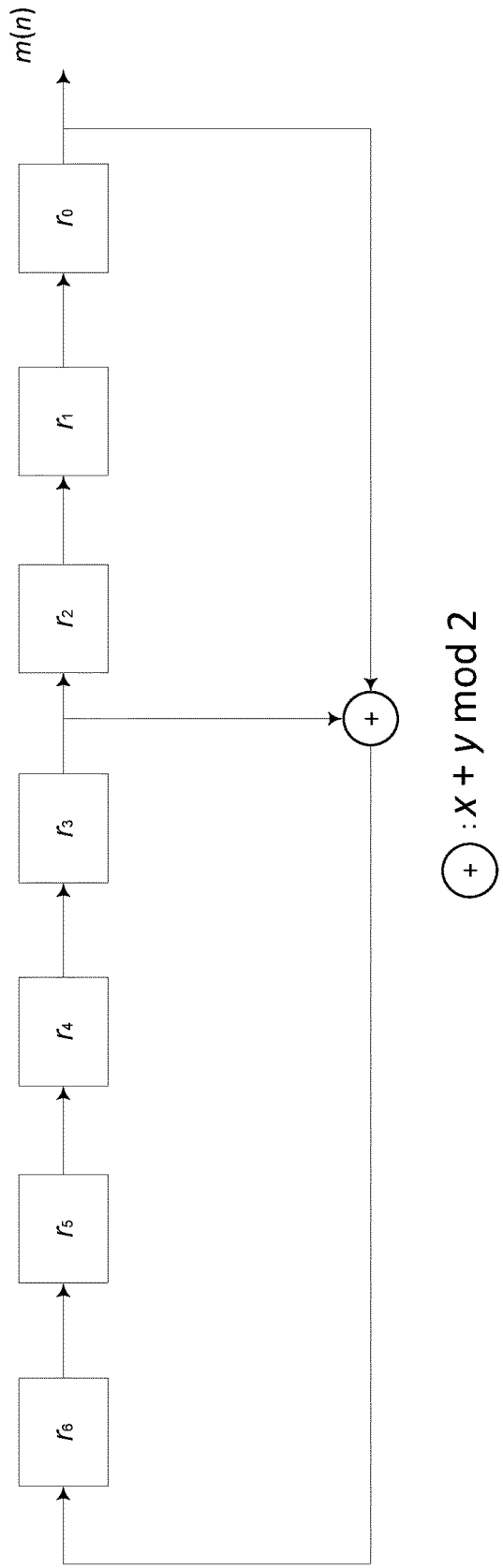
FIG. 67 illustrates an example M-sequence design for polynomial $x^7+x^3+1$.

Turning now to peak to average power ratio (PAPR) designs for NR-PSS, in an example, lower PAPR M-sequences with length 127 are used for an NR-PSS. The lower PAPR property comes from setting of M-sequence's polynomial and initial status of linear feedback shift register (LFSR). For an example, a M-sequence for length 127 x(n), n=0, . . . , 126 with polynomial $x^7+x^3+1$ and initial LFSR status can be constructed as the following, depicted in FIG. 67. The 3 frequency domain, length 127 BPSK modulated NR-PSS sequences can be generated by using a circular shift version of x(n): $x_i$ (n)=1−2x(circular(n, 43×i)), n=0, . . . , 126, i=0, 1, 2. Examples of lower PAPR M-sequences are provided in Table 7 for M-sequence polynomial and initial LFSR for length 127.

TABLE 7

Example M-sequences

| M-sequence | Polynomial | LFSR initial status ($r_0$, $r_1$, $r_2$, $r_3$, $r_4$, $r_5$, $r_6$) | PAPR [$x_0$ (n) $x_1$ (n) $x_2$ (n)] |
|---|---|---|---|
| 1 | $x^7 + x^3 + 1$ | 1 0 0 0 0 0 0 | [2.4835 2.3634 2.3138] |
|  |  | 0 1 0 0 0 0 0 | [2.2756 2.4172 2.3336] |
|  |  | 1 0 1 0 1 0 0 | [2.2793 2.2756 2.4172] |
|  |  | 1 1 0 1 1 1 0 | [2.1118 2.4773 2.0551] |
|  |  | 0 0 0 0 0 0 1 | [2.2383 2.2368 2.2793] |
|  |  | 0 0 0 1 1 0 1 | [2.2368 2.2793 2.2756] |
|  |  | 0 1 0 0 1 1 1 | [2.4773 2.0551 2.1161] |
| 2 | $x^7 + x^6 + x^4 + x^2 + 1$ | 1 1 1 0 0 0 0 | [2.5214 2.8945 2.8245] |
|  |  | 1 1 1 1 0 0 1 1 | [2.7503 2.8425 2.6475] |
| 3 | $x^7 + x^6 + 1$ | 1 1 1 0 1 1 1 | [2.4632 2.8683 2.6017] |
|  |  | 0 0 1 1 0 1 0 | [2.5114 2.7713 2.9281] |
| 4 | $x^7 + x^4 + 1$ | 0 1 1 0 0 0 0 | [2.2756 2.2793 2.2368] |
|  |  | 0 0 1 1 0 1 0 | [2.4172 2.2756 2.2793] |
|  |  | 1 1 0 0 1 1 0 | [2.0551 2.4773 2.1118] |
|  |  | 0 0 1 0 0 1 1 | [2.1161 2.0551 2.4773] |
|  |  | 1 0 0 1 0 1 1 | [2.2793 2.2368 2.2383] |
|  |  | 0 0 1 0 1 1 1 | [2.3138 2.3634 2.4835] |
|  |  | 0 1 0 1 1 1 1 | [2.3336 2.4172 2.2756] |

Figure 68:
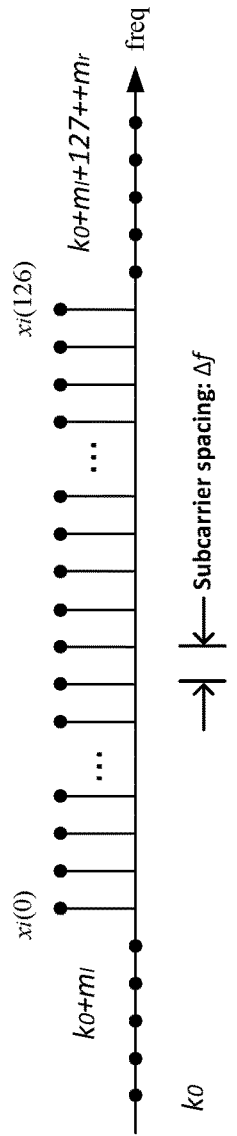
FIG. 68 illustrates an example subcarrier allocation method for NR-PSS.

The subcarrier allocation for NR-PSS can be expressed, for example, as: the $k_0$ is the starting subcarrier; the $m_l$ denotes the number of padding zeros (or reserved) subcarriers before the first starting location of the m-sequence; and $m_r$ denotes the number of padding zeros (or reserved) subcarriers after the last symbol of the m-sequence. FIG. 68 depicts an example NR-PSS subcarrier allocation.

Turning to CSI feedback, in an example aspect, a CSI feedback scheme for a beam sweeping burst set is implemented. By way of example, assume there are N beams (or N sweeping blocks) are swept during a beam sweeping burst set. Once those best $N_B$ training beams are identified, in general, $N_B \ll N$, and the UE can proceed to calculate the estimated effective MIMO channel vectors with the detected beams for auto-covariance matrix calculation. The estimated effective time-domain MIMO channel vector at the 1-th multipath (Note: without losing the generality, it can be assumed that the 1 is the best detected multipath among 1, 2, . . . , L paths) with received antennas can be expressed as equation (1):

$$x_l(n) = \underbrace{\begin{bmatrix} h_{1,1}(l, n) & \cdots & h_{1,N_t}(l, n) \\ h_{2,1}(l, n) & \cdots & h_{2,N_t}(l, n) \\ \vdots & \vdots & \vdots \\ h_{N_r,1}(l, n) & \cdots & h_{N_r,N_t}(l, n) \end{bmatrix}}_{H_l(n)} v(n) + w_l(n), \quad (1)$$

where $H_l$ (n) is the l-th path of the MIMO channel at the n-th sweeping block (or beam), v is the beamforming weight at n-th beam sweeping block, and $w_l$(n) is the noise vector. The UE collects the detected beamformed vectors during a beam training period. Here, a beam training period is equivalent to a period of beam sweeping burst set. The UE can calculate the channel covariance matrix and feedback to the base station with detected beams ID. From (1), the effective MIMO channel covariance matrix for the l-th multipath can be expressed as equation (2) below:

$$R_x = ([x(n_1) \ldots x(n_{N_B})])^H ([x(n_1) \ldots x(n_{N_B})]) \quad (2)$$

In an example, the underscript of $x_l$ is dropped because the base station does not need to distinguish the desired multipath. The UE may feedback the following terms to eNB, by way of example without limitation: Detected Beam IDs: the beam ID or beam timing indication of the detected beam block in a beam burst set, i.e., $n_1, n_2, \ldots, n_{N_B}$; and the transmit covariance matrix defined in equation (2).

When the eNB receives the CSI feedback form UE, the eNB can use the feedback information to calculate the direction of departure (DoD). For example, the eNB can calculate the DoD based on the feedback auto-covariance matrix and beam IDs. The effective channel covariance matrix equation (2) can be equivalent to equation (3) below:

$$R_x = V^H (\Sigma_{b=1}^{N_B} (H(n_b))^H H(n_b)) V = V^H R_H V, \quad (3)$$

where $V=[v(n_1) \ldots v(n_{N_B})]$ is the beamformed matrix and $R_H \triangleq \Sigma_{b=1}^{N_B} (H(n_b))^H H(n_b)$ is the channel covariance matrix. In the example, it can be assumed that the number of DoD needs to be estimated in the MIMO channel covariance matrix $R_H$ is equal to $N_S$ and $N_S < N_B$. Thus, the channel covariance matrix $R_H$ can be factorized by the singular value decomposition (SVD) operation as shown in equation (4) below:

$$R_H = U_s D_s U_s^H + U_w D_w U_w^H, \quad (4)$$

where $U_s$ denotes the signal sub-space or the primary component eigenvectors of DoD, and $U_w$ denotes the noise sub-space. In an example, the DoD need to be estimated in a beam training period can be formed by a transmit antenna steering matrix of equation (5) below:

$$A_t = [a_t(\bar{\phi}(n_1)) \ldots a_t(\bar{\phi}(N_s))] \quad (5)$$

where the vector $a_t(\bar{\phi}(n_1))$ is the transmit antenna steering vector and the matrix $A_t$ is a Vandermonde matrix. Hence, the primary component eigenvectors $u_1 \ldots u_{N_s}$ in the signal subspace $U_s$ may have the following relationship with the transmit antenna steering matrix $A_t$ shown in equation (6) below:

$$U_s = A_t B \quad (6)$$

where B is a non-singular square matrix with size $N_s \times N_s$. Since B is a non-singular matrix, every column in matrix B is linear independent. Therefore, the most significant eigenvector $u_1$ can be represented as the summation of all frequency components with the amplitude vector $b_1$, and therefore the most significant eigenvector $u_1$ can be expressed as equation (7) below:

$$u_1 = \Sigma_{i=1}^{N_s} b_i a_t(\bar{\phi}(n_i)), \quad (7)$$

where $b_i$ is i-th element in the vector $b_1$. From (7), we can use the atomic norm minimization to find the best DoD as shown in equation (8) below.

$$\min_u \|u\|_A, \text{ subject to } V^H u = u_x, \quad (8)$$

where $\|u\|_A$ is the atomic norm or total variation norm for a vector uv, and $u_x$ is the most significant eigenvector from the SVD of effective channel covariance matrix $R_x$. The minimization of (8) can be solved by an alternating direction method of multipliers (ADMM) algorithm. The estimated vector u can be obtained from (8), and then the best DoD can be estimated via the matrix pencil method.

In another aspect of the application, the NR-PDSCH may use some or NR-PDCCH resources when unused for control signaling. For example, control resource sets (CORESETs) may be configured through MIB or RRC, and may be dynamically disabled, thereby freeing control resources when unused. For example, if a CORESET in a particular slot is not required to carry DCI, its resources can be used for carrying NR-PDSCH.

Figure 69:
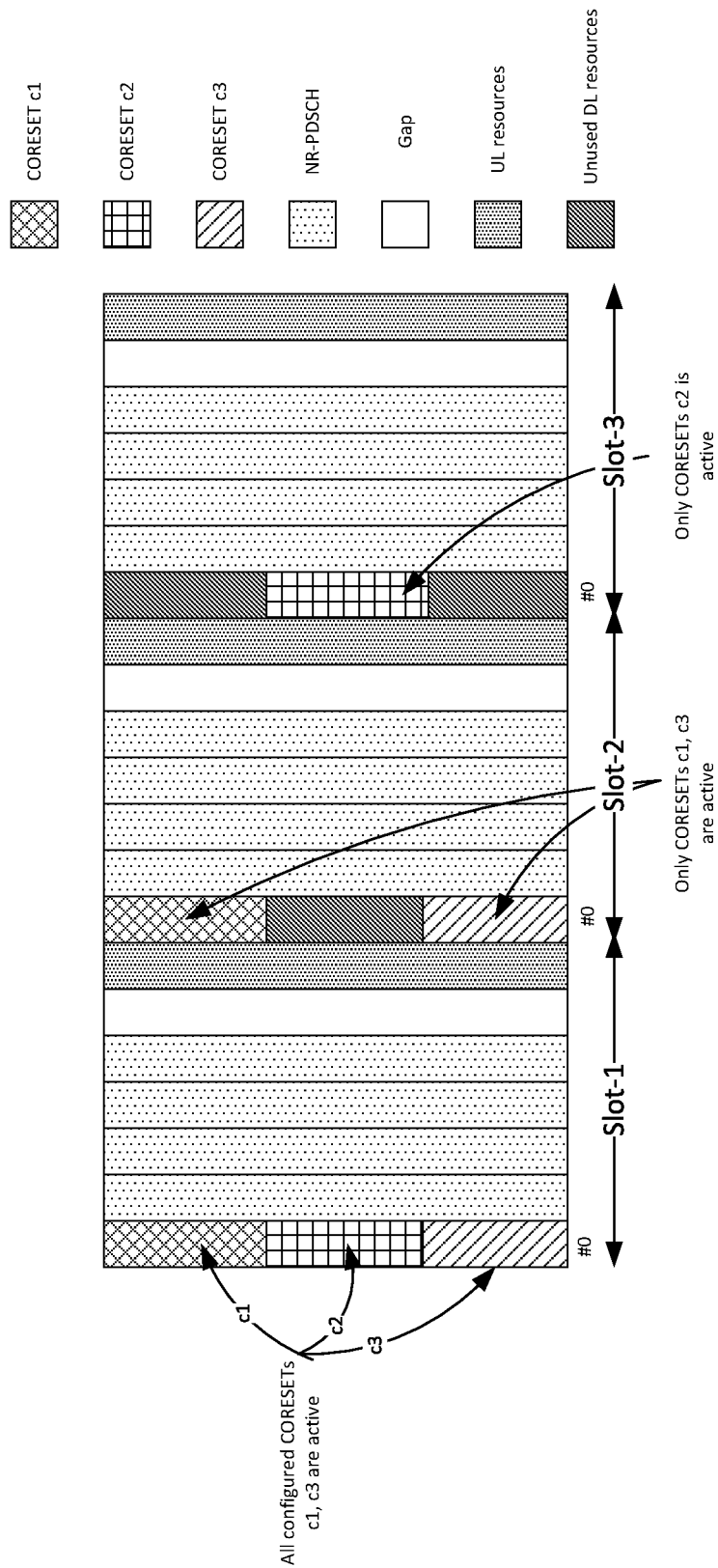
FIG. 69 illustrates an example CORESET configuration and active/inactive CORESETs.

Referring to FIG. 69, in accordance with the illustrated example, three (3) CORESETs c1, c2, c3 are configured, but in a given slot only a subset of CORESETs may be enabled. In slot 2, only CORESETs c1, c3 are enabled and resources of CORESET c2 are unused. In slot 3, only CORESETs c2 is enabled and resources of CORESETs c1 and c3 are unused.

Figure 70:
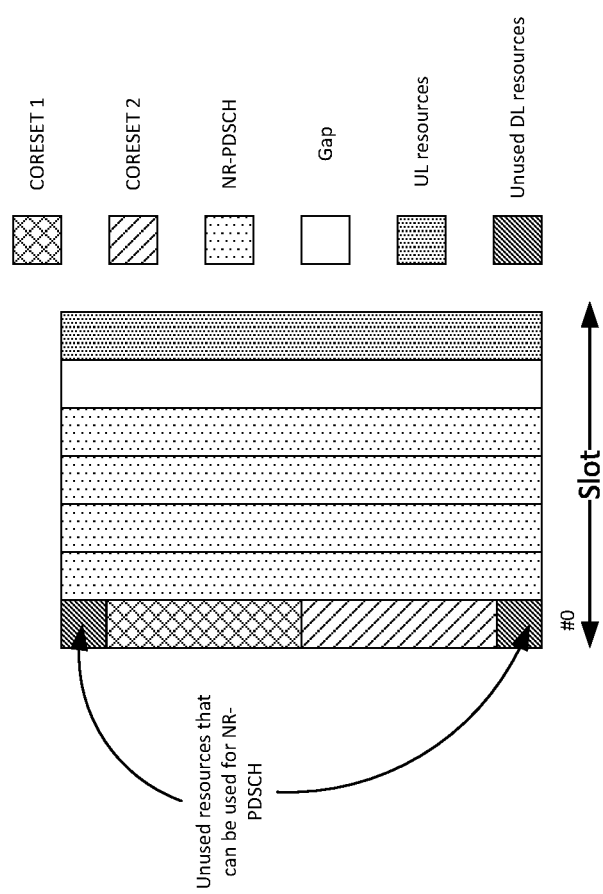
FIG. 70 illustrates example unused resources in a leading symbol used for NR-PDSCH.

Referring to FIG. 70, in accordance with illustrated example, the CORESETs do not fully occupy the resources in the leading symbols. In this case, again, NR-PDSCH may be configured to use these resources. However, for allowing NR-PDSCH to occupy the unused resources in the use cases discussed in FIGS. 69 and 70, the gNB may indicate the availability of those resources to the UE. This indication may be performed in various ways in accordance with various embodiments.

Figure 71:
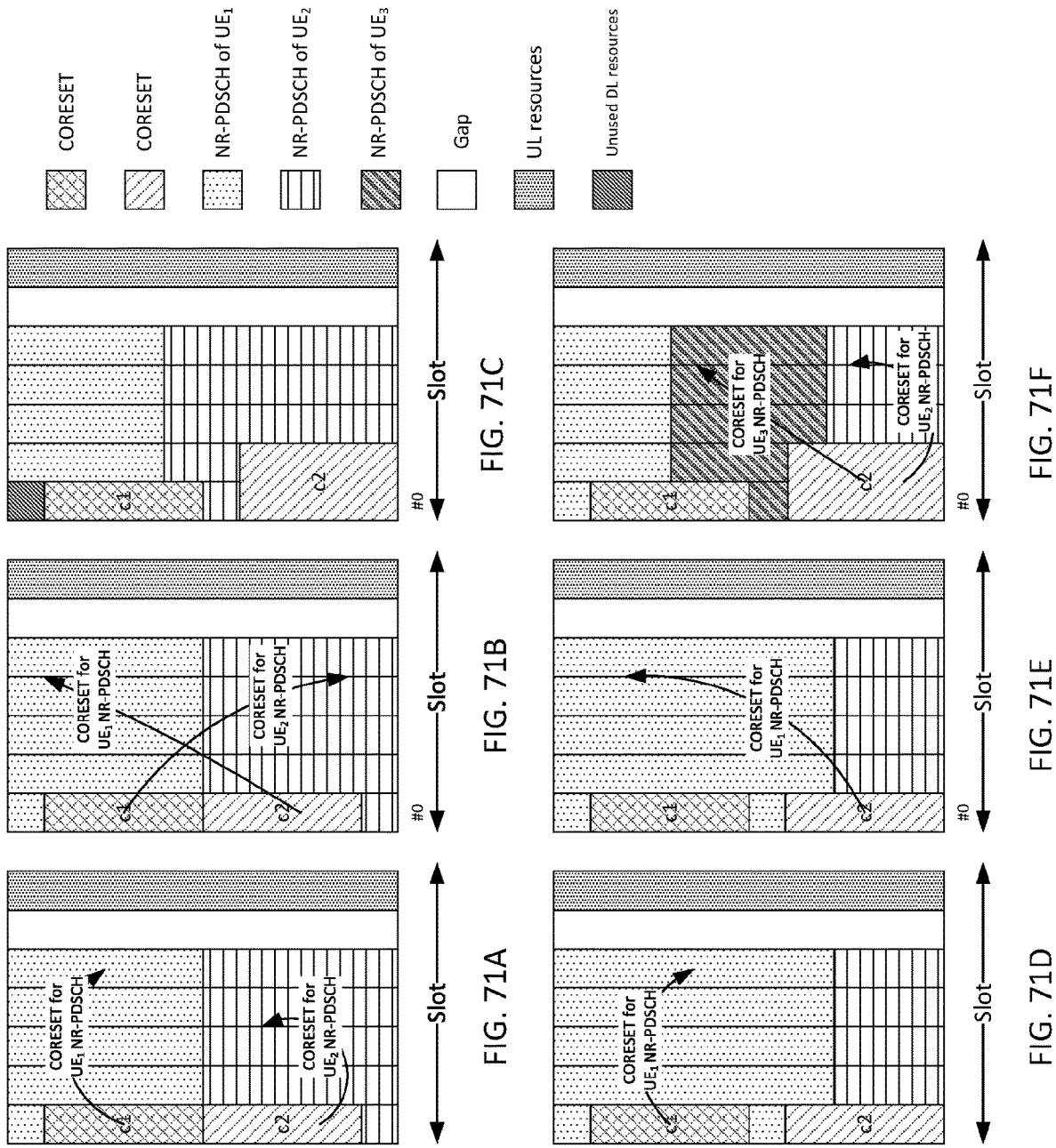
FIG. 71A-F illustrate example resource sharing mechanisms between NR-PDCCH and NR-PDSCH.

For example, if a UE knows the resources of the currently active CORESETs within its allocated frequency resources, providing an indication of the starting symbol within a slot or mini-slot may be sufficient for a UE to identify all its resources. For example, referring to FIG. 71A, two CORESETs c1 and c2 are active. The CORESET c1 assigns DL grant for $UE_1$ and c2 assigns DL grant for $UE_2$. The gNB configures resources of c1 to $UE_1$ and resources of c2 to $UE_2$ through RRC for receiving their respective DCI. If a DCI indicates the starting location as symbol #0, in some examples, it is sufficient for $UE_1$ and $UE_2$ to recognize their resources for the DL grant without ambiguity as their NR-PDSCH frequency range does not span any other CORESET. Thus, in accordance with the example, the $UE_1$ and $UE_2$ do not need to know the configuration of other CORESETs. Referring to FIG. 71B, c1 assigns DL grant for $UE_2$ and c2 assigns DL grant for $UE_1$. If $UE_1$ is given knowledge of CORESET c1, and $UE_2$ is given knowledge of CORESET c2, the DCI may indicate the starting location of NR-PDSCH resources as symbol #0 for the UEs to unambiguously recognize their resources. If the frequency region spans other CORESETs, in an example, UEs may need to know their configuration.

Referring to FIG. 71C, the CORESET regions may span different numbers of symbols. If this is the case, the starting symbol may be different for different UEs at different frequencies. Here, for $UE_2$ some resources start at symbol #1, some start at symbol #0, and the rest at symbol #2. In some cases, as long as $UE_2$ knows the configuration of the CORESETs falling within the frequency range of its grant, it is sufficient to signal the very first symbol where some resource occurs (symbol #0 in this example). $UE_1$ has resources starting at symbol #1, so this may need to be indicated to $UE_1$.

Referring to FIG. 71D, the CORESET c1 assigns DCI to UE1. UE1 requires only partial knowledge of resource of c2. For example, it requires knowing about c2 resources only within its frequency range. Referring to FIG. 71E, the CORESET c2 assigns DCI to UE1. UE1 may require full knowledge of resources of c2. Referring to FIG. 71F, the CORESET c2 assigns DCI to UE2 and UE3. In the example, UE2 does not need knowledge of CORESET c1, whereas UE3 may need at least partial knowledge of c2. For example, the range overlapping with UE3's frequency resources may need to be known by UE3. This implies that not all UEs belonging to the same CORESET have to have the same knowledge of other CORESET configurations, in some cases.

Figure 72:
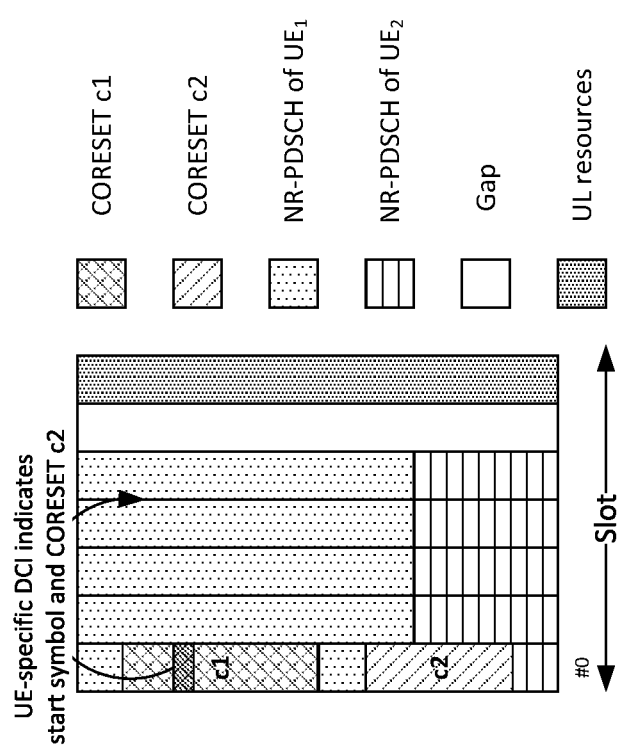
FIG. 72 illustrates a shared resource and starting symbol fully indicated through UE-specific DCI, in accordance with an example embodiment.

Depending on the use case, partial or full information on CORESET configuration may be required at the UE. This indication may be provided through various means. For example, a UE-specific DCI may indicate the starting symbol and active CORESET resources that impact the UE. Either partial or entire CORESET configuration information may be provided. FIG. 72 shows this example where the UE-specific DCI in CORESET c1 makes the DL grant for UE1.

Figure 73:
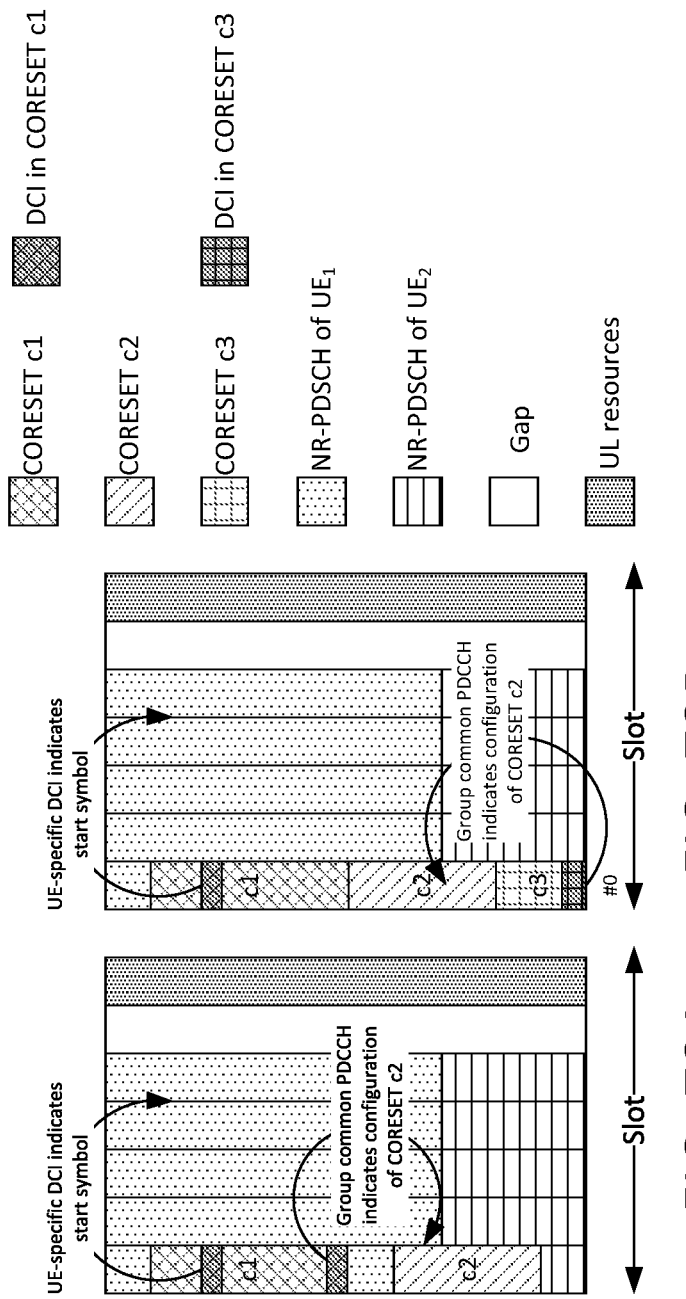
FIGS. 73A and 73B illustrates an example shared resource indicated by a group common PDCCH and starting symbol indicated by UE-specific DCI, respectively.

In some cases, a group common DCI may carry configurations of multiple CORESETs. A UE-specific DCI makes a DL grant and indicates the starting symbol. FIGS. 73A and 73B shows an example where the group common PDCCH provides configuration of c2. In FIG. 73A, the UE received the UE-specific DCI and group common PDCCH in CORESET c1 whereas in FIG. 73B, the UE is configured to receive the UE-specific DCI in c1 and common control information in c3.

Figure 74:
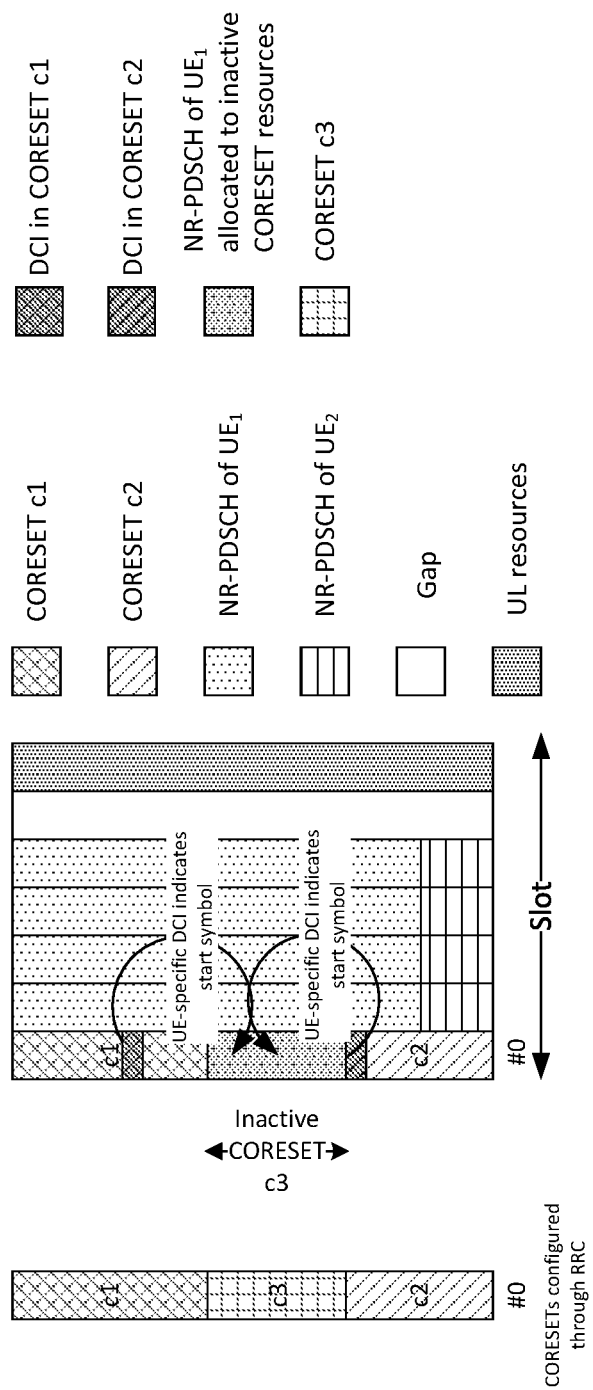
FIG. 74 illustrates an example configuration of all CORESETs.

In an example, some or all CORESETs may be configured by RRC for the UEs. A group common PDCCH may dynamically indicate the active CORESETs within a slot/mini-slot. Further, the UE-specific DCI indicates the starting location. FIG. 74 shows an example where the CORESET 3 is inactive in the given slot. This is indicated by a group common PDCCH configured in CORESET c2. The UE-specific DCI in c1 indicates the starting symbol #0 for the DL grant to UE1.

Figure 75:
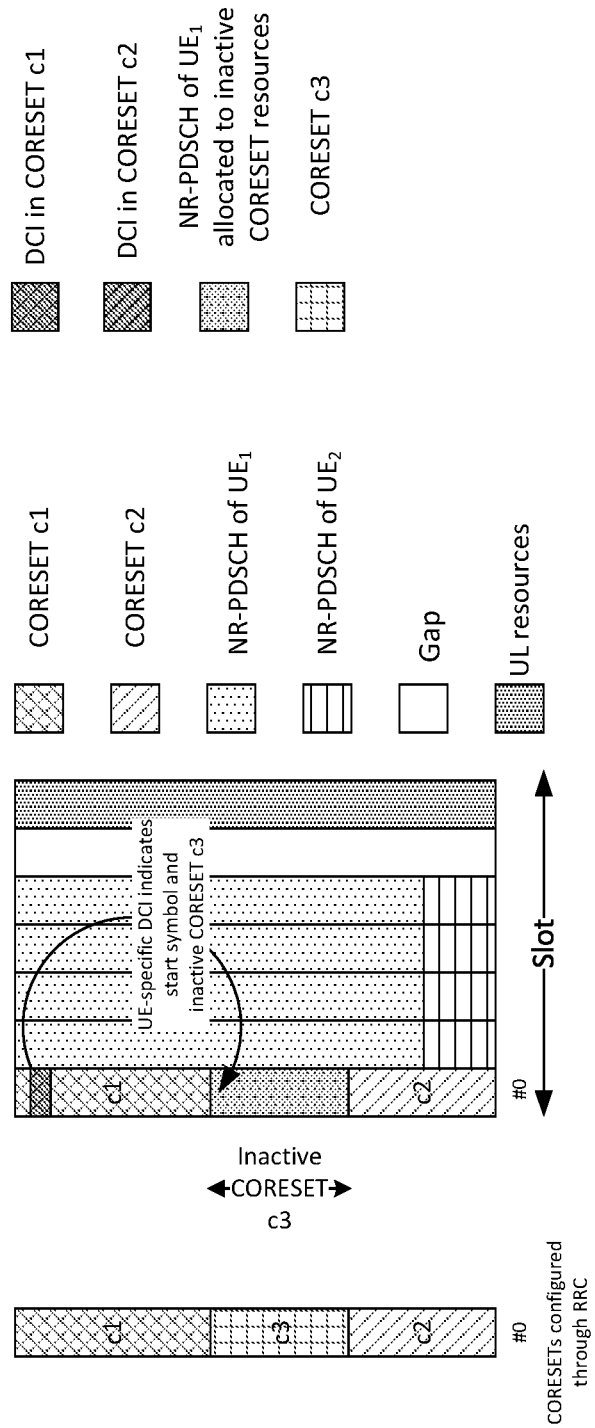
FIG. 75 illustrates example RRC configurations of all CORESETS.

Referring to FIG. 75, in another example, some or all configured CORESETs may be configured by RRC for the UEs. The UE-specific DCI indicates the relevant active CORESETs (either partial or full resources of the CORESETs) within a slot/mini-slot and also indicates the starting location.

Figure 76:
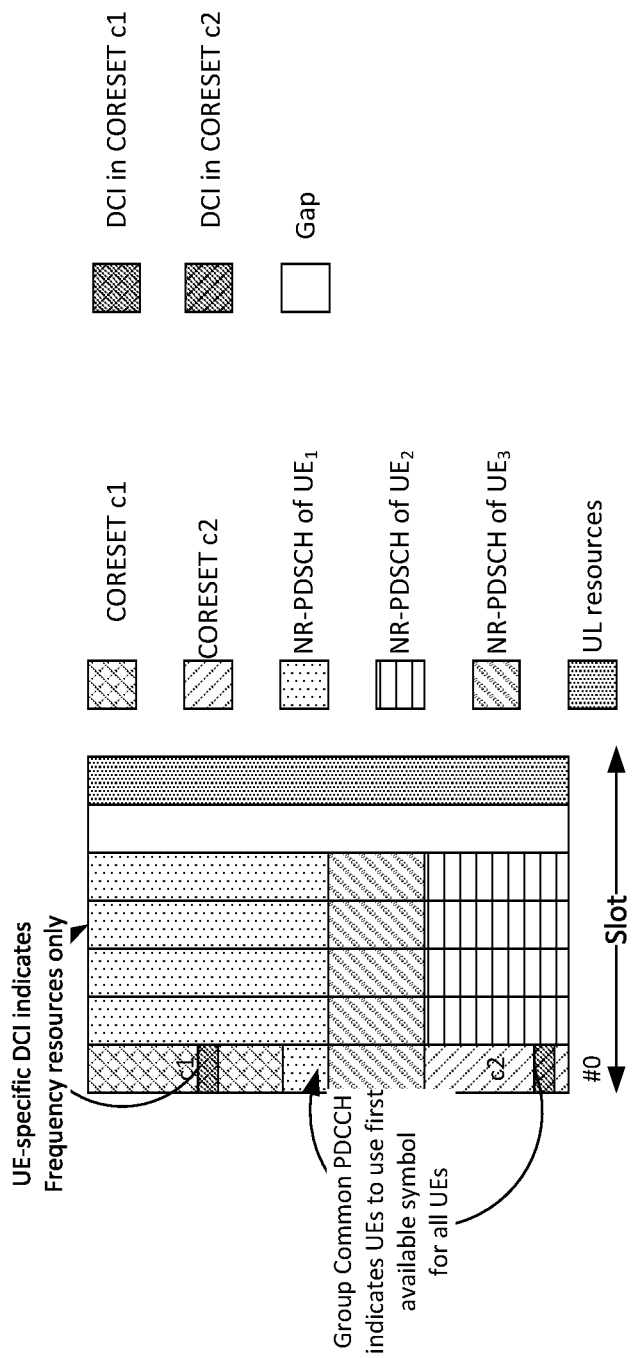
FIG. 76 illustrates group common PDCCH signals that are first available resources used by all UEs, in accordance with an example.

In some cases, if the starting location is by default the first available symbol within a set of frequency resources, a group common PDCCH may indicate this for all the UEs in the group so that every DCI need not carry bits to indicate the starting symbol. The UE-specific DCI might only indicate the frequency resources. FIG. 76 shows an example where the group common PDCCH in CORESET c2 indicates that all UEs in that group should use the first available symbol, given that they have the CORESETs configured via RRC. UE1 and UE3 use symbol #0 as the starting symbol while UE2 uses symbol #1 as it starting symbol.

In some examples, CORESETs themselves might not be fully utilized by the gNB. If there are unused resources within the CORESETs, they may be made available to NR-PDSCH. FIGS. 77A-C show examples of unused resources within CORESETs with localized and distributed resources in frequency and time. If the unused resources can be indicated to the UE, they can be used for carrying NR-PDSCH. The unused resources may be indicated at some level of granularity, for example in RBs or RBGs (RB groups). In some cases, smaller granularity implies better utilization of the unused resources but significant overhead in indicating the resources.

Figure 78:
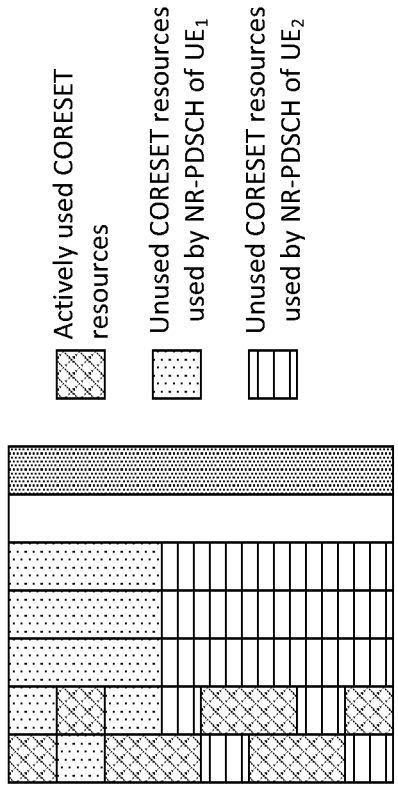
FIG. 78 illustrates NR-PDSCH resources using unused resources within a CORESET, in accordance with an example.

Referring to FIG. 78, the unused resources are allocated to NR-PDSCH of 2 users. In order to indicate the NR-PDSCH resources obtained from unused CORESET resources, in an example, a UE-specific DCI indicates the resources at some granularity such as RB or RBGs for each symbol of the CORESET duration. If the unused resources are the same in both symbols, in an example, then the indication might be provided only once.

Figure 79:
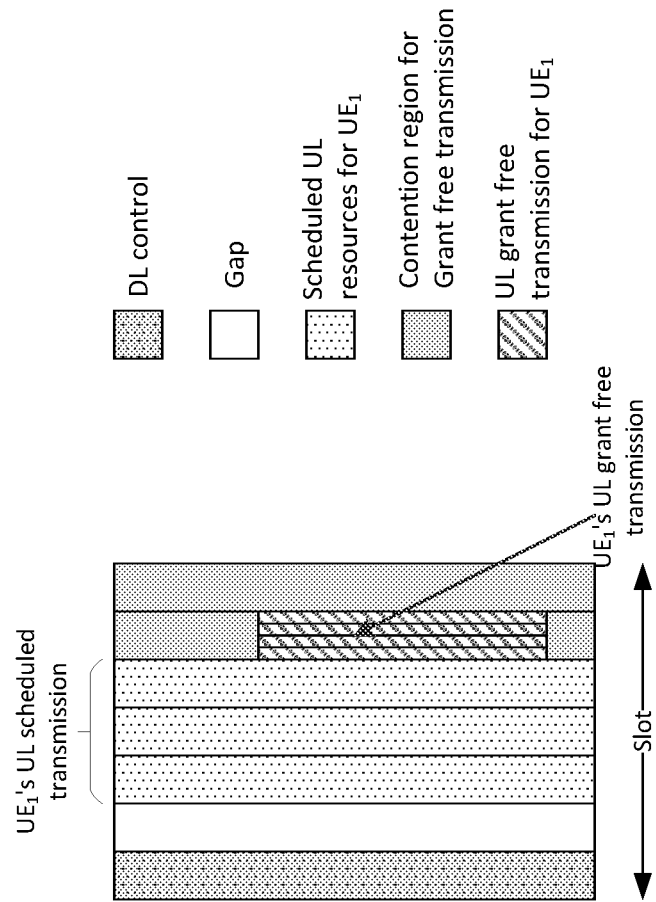
FIG. 79 illustrates UL Scheduled and UL grant free transmission for a UE in the same slot.

According to even a further aspect, simultaneous transmission of grant free transmissions and scheduled transmissions may occur. For example, referring to FIG. 79, within one slot, two HARQ processes may be transmitted; one for grant free and one for the scheduled transmission.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

FIG. 1A illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 1A-1E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a in the RAN 103/104/105 and the WTRUs 102a, 102b, 102c, or RRHs 118a, 118b and TRPS 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 1A may be configured to communicate with the base station 114a, which may employ a cellular-based radio technology, and with the base station 114c, which may employ an IEEE 802 radio technology.

Figure 1B:
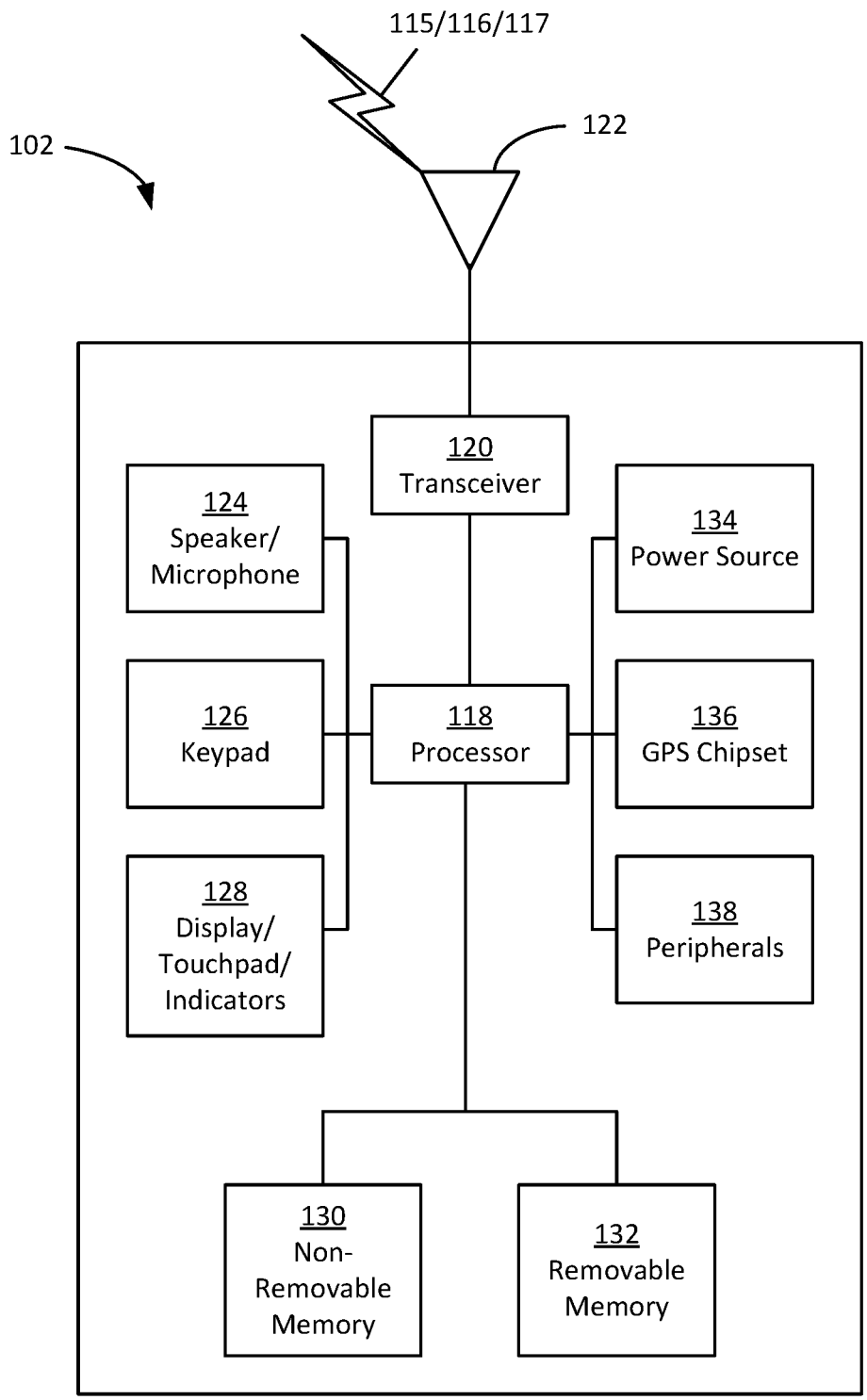
FIG. 1B is a block diagram of an example apparatus or device configured for wireless communications in accordance with the embodiments illustrated herein.

FIG. 1B is a block diagram of an example apparatus or device configured for wireless communications in accordance with the embodiments illustrated herein, such as for example, a WTRU 102. As shown in FIG. 1B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to, transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

FIG. 1B is a block diagram of an example apparatus or device configured for wireless communications in accordance with the embodiments illustrated herein, such as for example, a WTRU 102. As shown in FIG. 1B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 1C:
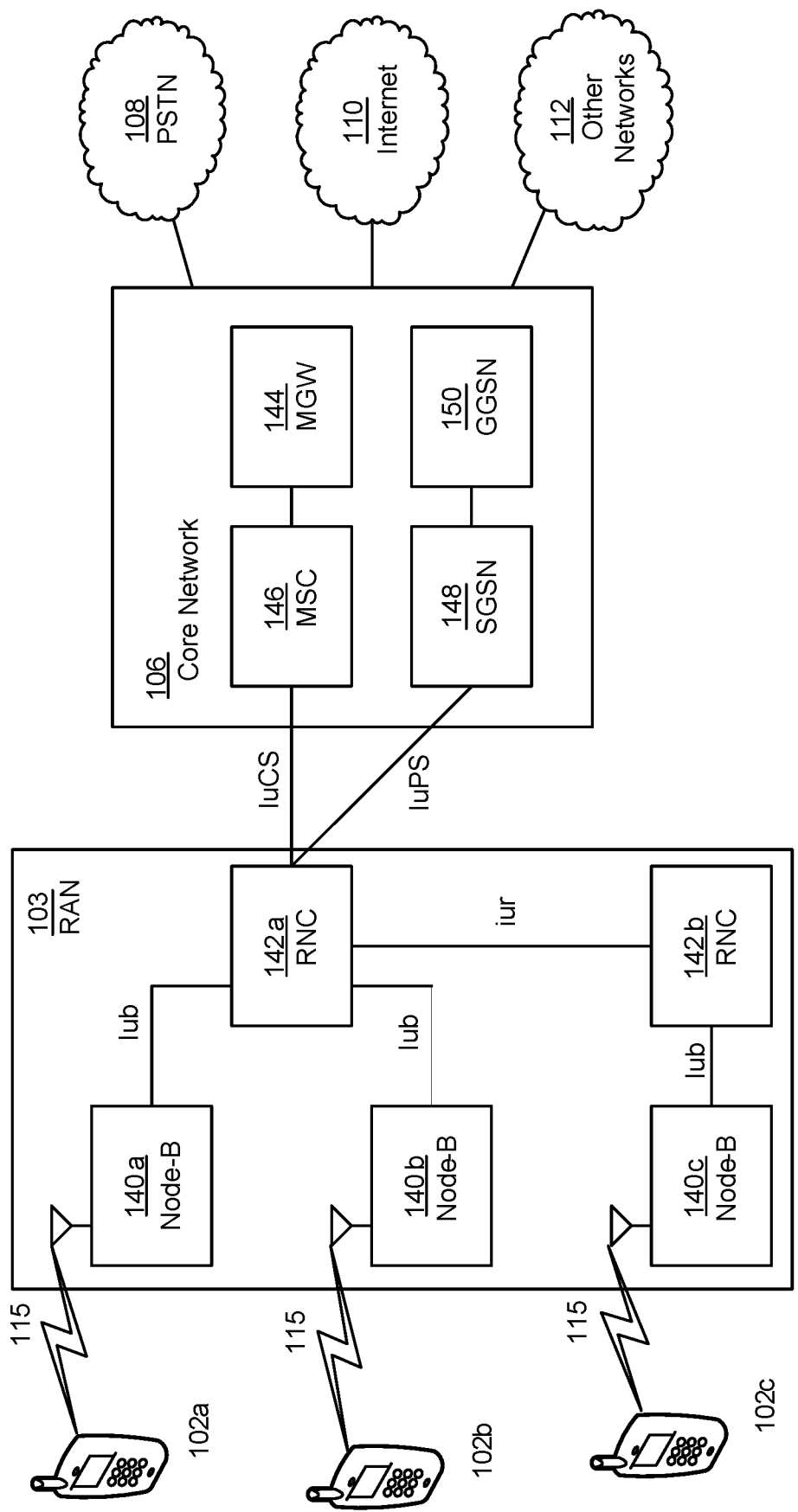
FIG. 1C is a system diagram of an example radio access network (RAN) and core network in accordance with an example embodiment.

FIG. 1C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between the and the WTRUs 102a, 102b, 102c and IP-enabled devices.

As noted above, the core network 106 may also be connected to the networks 112, which may include other wired or wireless networks that are owned and/or operated by other service providers.

Figure 1D:
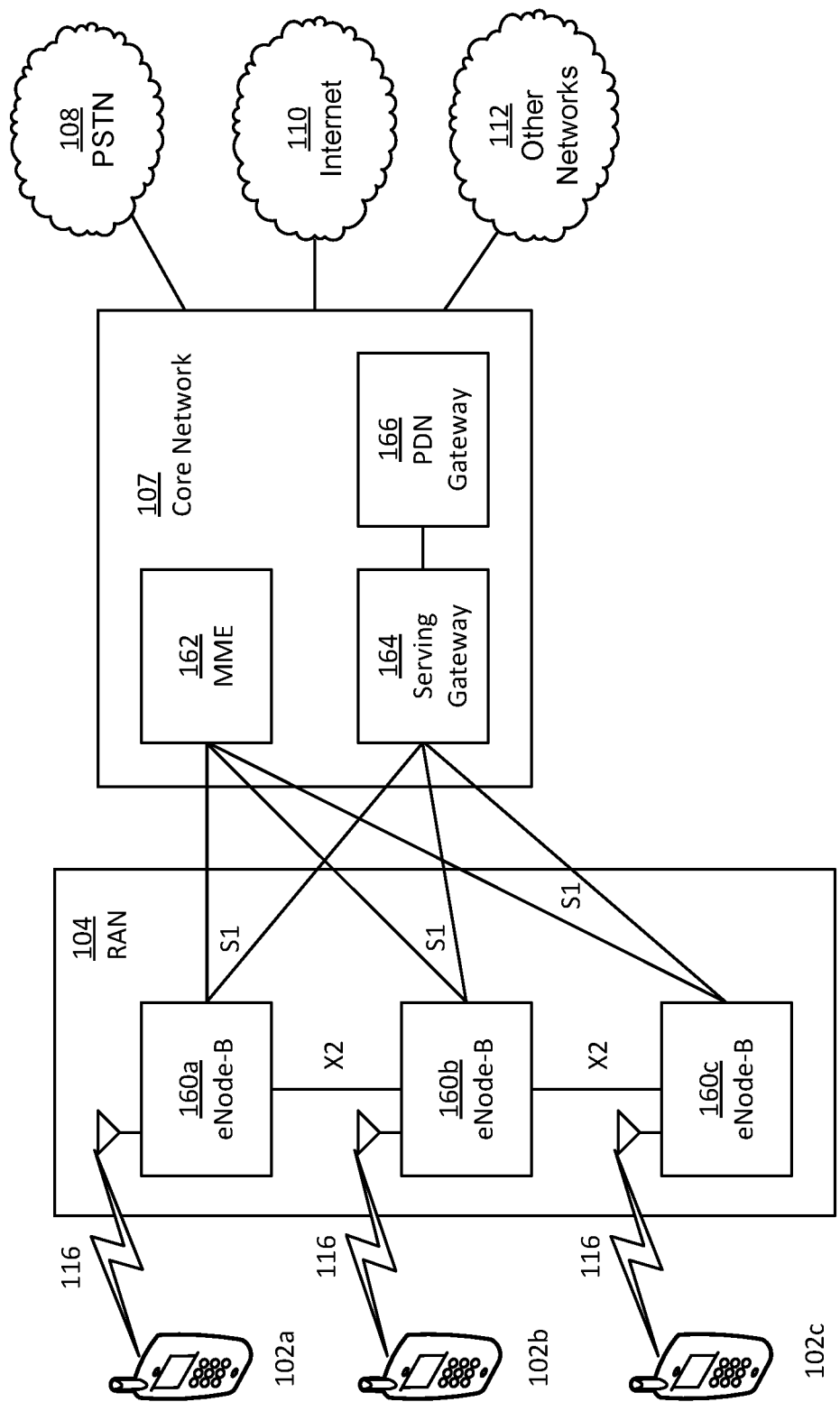
FIG. 1D is another system diagram of a RAN and core network according to another embodiment.

FIG. 1D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
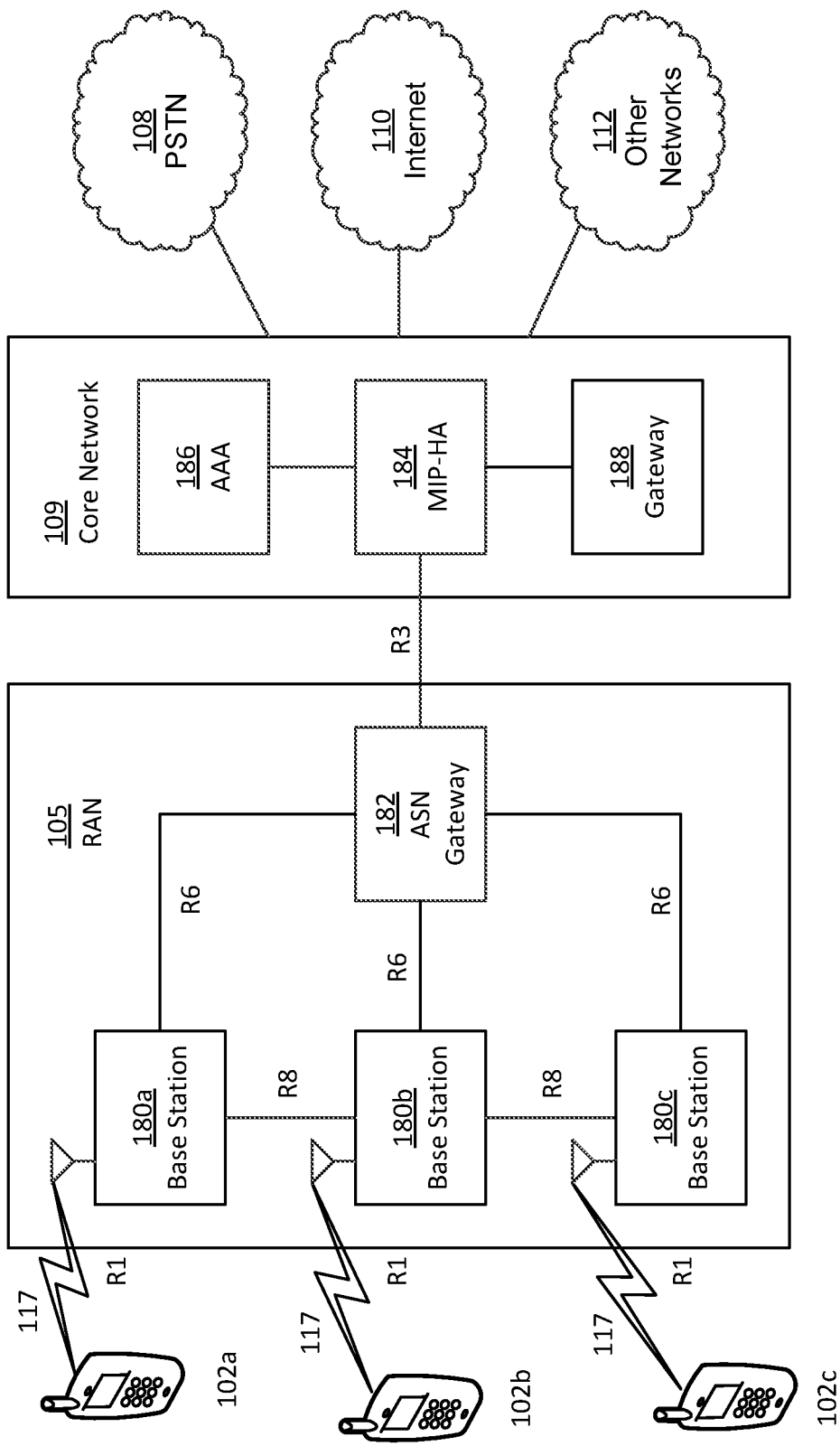
FIG. 1E is another system diagram of a RAN and core network according to another embodiment.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1F:
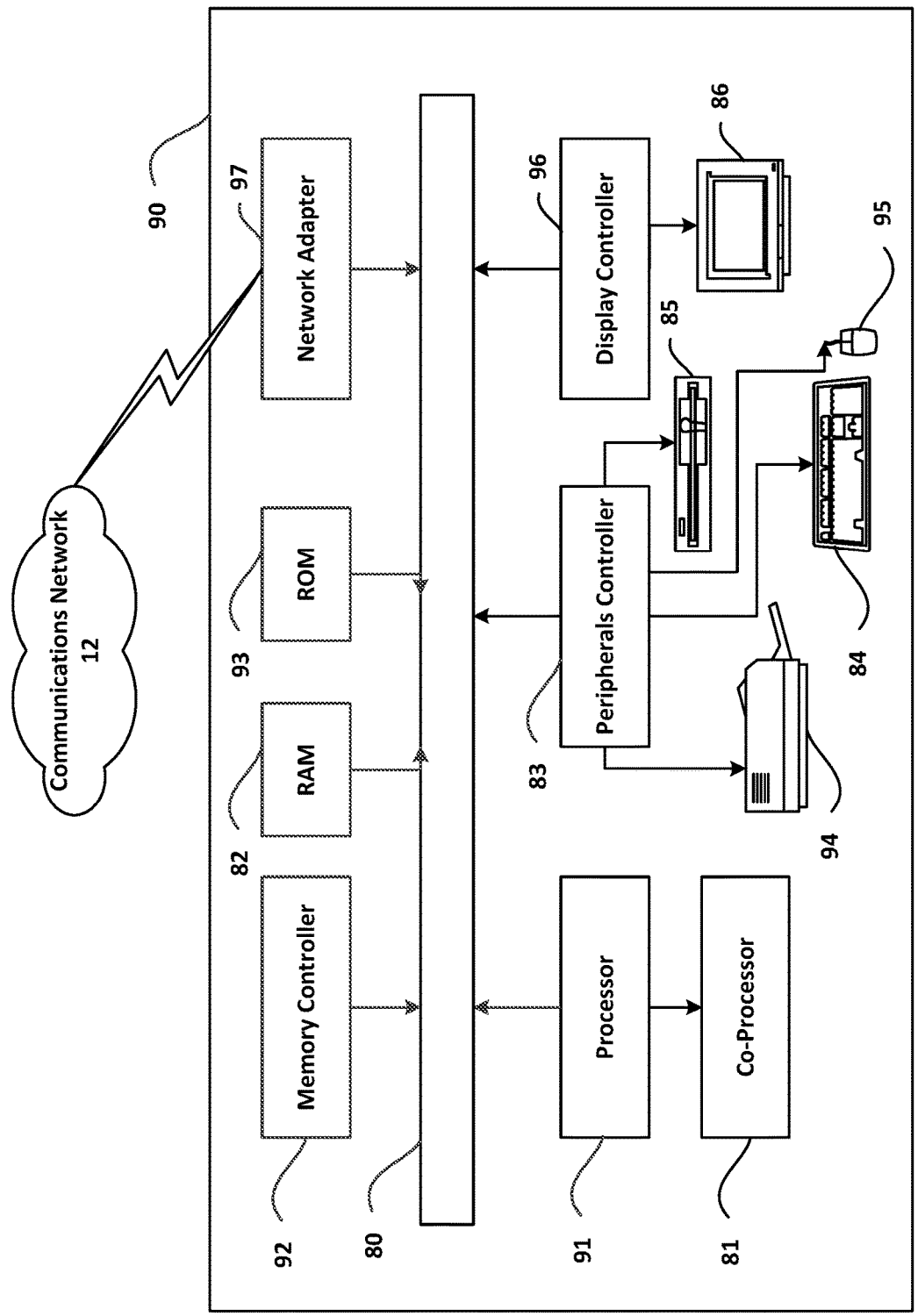
FIG. 1F is a block diagram of an exemplary computing system 90 in which one or more apparatuses of the communications networks illustrated in FIGS. 1A, 1C, 1D and 1E may be embodied.

FIG. 1F is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91.

Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

The following is a list of acronyms relating to NR technologies that may appear in the above description. Unless otherwise specified, the acronyms used herein refer to the corresponding term listed below.

A/N Ack/Nack
BF-RS BeamForm Reference Signal
BPL Beam Pair Link
BT-RS Beamformed Training Reference Signal
CCE Control Channel Elements
CB Code Block
CBG Code Block group
CE Control Element
CN Core Network
CP Cyclic Prefix
CRC Cyclic Redundancy Check
C-RNTI Cell Radio-Network Temporary Identifier
DL Downlink
DL-SCH Downlink Shared Channel
eCell Extended Cell
eMBB enhanced Mobile Broadband
ENB Evolved Node B
EPDCCH Enhanced Physical Downlink Control Channel
E-UTRA Evolved Universal Terrestrial Radio Access
E-UTRAN Evolved Universal Terrestrial Radio Access Network
GP Guard Period
HARQ Hybrid Automatic Repeat Request
IE Information element
IMT International Mobile Telecommunications
KPI Key Performance Indicators
LC-MTC Low Cost or Low Complexity Machine-Type Communications
LTE Long term Evolution
MAC Medium Access Control
MBB Mobile Broadband
MIB Master Information Block
MTC Machine-Type Communications
mMTC massive Machine Type Communication
NACK Non-ACKnowledgement
NB-IOT Narrow band IoT
NGMN Next Generation Mobile Networks
NR New Radio
NR-DCI NR Downlink control information
NR-A/N NR A/N
NR-BID NR Beam Index
OFDM Orthogonal frequency division multiplexing
PDCCH Physical Downlink Control Channel
PBCH Physical Broadcast Channel
PCFICH Physical Control Format Indicator Channel
PDCCH Physical Downlink Control Channel PDNICH Physical Downlink Numerology Indication Channel
PDSCH Physical Downlink Shared Data Channel
PDU Protocol Data Unit
PHICH Physical Hybrid ARQ Indicator Channel
PUSCH Physical Uplink Shared Channel
PUCCH Physical Uplink Control Channel
PRACH Physical Random Access Channel
PRB Physical Resource Block
RAN Radio Access Network
RAT Radio Access Technology
RB Resource block
RE Resource Element
RNTI Radio Network Temporary Identifier
RRC Radio Resource Control
RV Redundancy Version
SC-FDMA Single carrier frequency division multiple access
SDU Service Data Unit
SFN System Frame Number
SI System Information
SIB System Information Block
SR Scheduling Request
TBS Transport Block Size
TB Transport Block
TDD Time Division Duplex
TRP Transmission and Reception Point
TTI Transmission Time Interval
UE User Equipment
UL Uplink
UR/LL Ultra Reliable—Low Latency
URLLC Ultra-Reliable and Low Latency Communications This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. An apparatus comprising a processor and a memory, the apparatus further including computer-executable instructions stored in the memory of the apparatus which, when executed by the processor of the apparatus, cause the apparatus to:
   receive a configuration for monitoring potential preemption occasions;
   receive a URLLC Preemption Radio Network Identifier (UP-RNTI) for identifying a preemption indication message, wherein the UP-RNTI is assigned to a group of devices;
   monitor at least one preconfigured occasion for a preemption indication on a group-common physical DL control channel;
   determine that the apparatus is a valid recipient of the preemption indication upon detecting the preemption indication with the UP-RNTI;
   based on the preemption indication, identify a second resource out of first resources for a first transmission, the second resource being preempted for a second transmission; and
   receive retransmission resources for a retransmission of one or more preempted resources for the first transmission.

2. The apparatus as recited in claim 1, wherein the preemption indication indicates preemption of a downlink transmission to the apparatus, wherein the preemption indication for preemption of the first transmission is received after the apparatus transmits acknowledgement for the first transmission.

3. The apparatus as recited in claim 1, wherein the preemption indication indicates preemption of an uplink transmission from the apparatus.

4. The apparatus as recited in claim 3, wherein the first and second transmissions are from the same apparatus.

5. The apparatus as recited in claim 3, wherein the second transmission is a control signal.

6. The apparatus as recited in claim 3, wherein the first transmission is a dynamic grant received through DL control signaling and the second transmission is a configured grant.

7. The apparatus as recited in claim 6, wherein the configured grant transmission's HARQ ID is derived from its transmission timing.

8. The apparatus as recited in claim 7, wherein a HARQ process of the configured grant transmission is repeated M times, where M is obtained though radio resource configuration, the repetitions of the HARQ process having different redundancy versions, wherein the HARQ process ID and redundancy version are indicated through the uplink control information multiplexed with the second transmission.

9. The apparatus as recited in claim 1, wherein the preemption occasions are configured with a monitoring periodicity through Radio Resource Configuration.

10. The apparatus as recited in claim 1, wherein the preemption indication indicates the physical resource blocks in frequency domain and symbols in time domain of the preempted resources.

11. The apparatus as recited in claim 1, wherein the retransmission comprising preempted code block groups (CBGs), the number of CBGs in the transport block of the first transmission being preconfigured through radio resource configuration.

12. The apparatus as recited in claim 11, wherein the retransmission comprising a bitmap indicating the retransmitted code block groups (CBGs).

13. The apparatus as recited in claim 1, wherein the code blocks (CBs) are mapped in a frequency first manner in the time-frequency resource grid of the transmission.

14. A network apparatus for communicating with a terminal device, the network apparatus comprising a processor and a memory, the apparatus further including computer-executable instructions stored in the memory of the apparatus which, when executed by the processor of the apparatus, cause the apparatus to:
   transmit a configuration for monitoring potential preemption occasions;
   transmit a URLLC Preemption Radio Network Identifier (UP-RNTI) for identifying a preemption indication message, wherein the UP-RNTI is assigned to a group of devices;
   transmit a group-common physical DL control channel to the terminal device, wherein the terminal device is configured to determine that the terminal device is a valid recipient of the preemption indication upon detecting the preemption indication with the UP-RNTI by monitor at least one preconfigured occasion for a preemption indication on the group-common physical DL control channel and identify a second resource out of first resources for a first transmission, the second resource being preempted for a second transmission, based on the preemption indication; and transmit retransmission resources for a retransmission of one or more preempted resources for the first transmission.

15. A wireless communication method for communicating with a terminal device, the wireless communication method comprising:

transmitting a configuration for monitoring potential preemption occasions;

transmitting a URLLC Preemption Radio Network Identifier (UP-RNTI) for identifying a preemption indication message, wherein the UP-RNTI is assigned to a group of devices;

transmitting a group-common physical DL control channel to the terminal device, wherein the terminal device is configured to determine that the terminal device is a valid recipient of the preemption indication upon detecting the preemption indication with the UP-RNTI by monitor at least one preconfigured occasion for a preemption indication on the group-common physical DL control channel and identify a second resource out of first resources for a first transmission, the second resource being preempted for a second transmission, based on the preemption indication; and transmitting retransmission resources for a retransmission of one or more preempted resources for the first transmission.

\* \* \* \* \*